(12) United States Patent
Ishiguro et al.

(10) Patent No.: US 6,697,945 B2
(45) Date of Patent: *Feb. 24, 2004

(54) INFORMATION PROCESSING APPARATUS, INFORMATION PROCESSING METHOD, INFORMATION PROCESSING SYSTEM AND RECORDING MEDIUM

(75) Inventors: Ryuji Ishiguro, Tokyo (JP); Yoshitomo Osawa, Kanagawa (JP); Yoshio Osakabe, Kanagawa (JP); Makoto Sato, Tokyo (JP); Hisato Shima, Saratoga, CA (US); Tomoyuki Asano, Kanagawa (JP); Takehiko Nakano, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/059,812

(22) Filed: Apr. 14, 1998

(65) Prior Publication Data

US 2002/0083319 A1 Jun. 27, 2002

(30) Foreign Application Priority Data

| Apr. 23, 1997 | (JP) | 9-106104 |
| Jun. 2, 1997 | (JP) | 9-143699 |
| Aug. 5, 1997 | (JP) | 9-210899 |

(51) Int. Cl.$^7$ .............................. H04L 9/00; H04L 9/32
(52) U.S. Cl. ............................. 713/171; 703/189
(58) Field of Search ........................... 713/168, 169, 713/189, 170, 171, 178

(56) References Cited

U.S. PATENT DOCUMENTS

| 4,549,075 A | * | 10/1985 | Saada et al. ............... 713/169 |
| 4,720,859 A | | 1/1988 | Aaro et al. |
| 4,799,061 A | * | 1/1989 | Abraham et al. ......... 713/168 X |
| 4,866,707 A | * | 9/1989 | Marshall et al. ............ 714/749 |
| 5,117,458 A | | 5/1992 | Takaragi et al. |
| 5,148,479 A | * | 9/1992 | Bird et al. ................... 713/155 |
| 5,225,664 A | * | 7/1993 | Iijima ..................... 713/169 X |
| 5,883,958 A | * | 3/1999 | Ishiguro et al. .............. 705/57 |

OTHER PUBLICATIONS

Schneier, Bruse, Applied Cryptography 1996, John Wiley & Sons, Inc., 2$^{nd}$ ed., p. 33.*
Schneier Bruce: "Applied Cryptography Second Edition: protocols, algorithms, and source code in C" 1996, John Wiley & Sons, USA XP002104180, pp. 180–181; 265–301; 30–31; 429–459; and 351–354.
Encryption for Open VMS, Version 1.3" Digital Software Product Descriptions, Updated: Apr. 30, 1996, Retrieved From Internet: May 27, 1999 Via http://www.digital.com/info/SP2674/, XP002104179.

* cited by examiner

*Primary Examiner*—Gilberto Barron
*Assistant Examiner*—Douglas J. Meislahn
(74) *Attorney, Agent, or Firm*—Frommer Lawrence & Haug LLP; William S. Frommer; Bruno Polito

(57) ABSTRACT

An information processing apparatus and an information processing method are capable of preventing information from being copied illegally.

To put it in detail, a hash function and a service key are stored in advance in an EEPROM of a DVD player serving as a source. In an EEPROM of a personal computer (PC) serving as a sink, on the other hand, its ID and a license key are stored beforehand. The DVD player requests the PC to transmit the ID. The DVD player then applies the hash function to data resulting from concatenation of the ID with the service key to generate a license key (=hash (ID || service-key)). Subsequently, the DVD player generates a source side common session key and encrypts the session key by using the generated license key. Then, the DVD player transmits the encrypted source side common session key to the PC. The PC decrypts the encrypted source side common session key by using the license key stored in its EEPROM to produce a sink side common session key which has a value equal to that of the source side common session key.

7 Claims, 39 Drawing Sheets

INFORMATION PROCESSING APPARATUS, INFORMATION PROCESSING METHOD, INFORMATION PROCESSING SYSTEM AND RECORDING MEDIUM

BACKGROUND OF THE INVENTION

1. Field of the Invention

In general, the present invention relates to an information processing apparatus, an information processing method, an information processing system and a recording medium. More particularly, the present invention relates to an information processing apparatus, an information processing method an information processing system and a recording medium that allow data to be exchanged with a higher degree of security.

2. Description of the Invention

In recent years, there has been proposed a system comprising pieces of electronic equipment such as AV apparatuses and personal computers connected to each other by typically IEEE1394 serial buses wherein data can be exchanged among the pieces of equipment.

In such a system, for example, the ordinary user can play back movie information by using a DVD (Digital Video Disc) player and transmit the movie information to a monitor through the 1394 serial bus to display it on the monitor. The conduct done by the user to display the movie information is automatically permitted by the author of the movie information normally through a license which was obtained when the user purchased the DVD of the movie information. In order to do a conduct to copy the movie information played back from the DVD player to another recording medium such as an optical magnetic disc, however, it is necessary for the user to obtain a special permission from the author of the movie information. In the case of a copy license, typically, the optical magnetic disc apparatus is also used to store a key for indicating whether or not recording movie information into an optical magnetic disc mounted on the apparatus is allowed. That is to say, the key is used for forming a judgment as to whether or not the optical magnetic disc apparatus is a valid apparatus, that is, an apparatus licensed by the author of the movie information. If the optical magnetic disc apparatus is authenticated as a valid apparatus, the act to record the movie information into the apparatus can be judged to be a permitted conduct.

In such a case, it is necessary to verify that the destination apparatus is a valid apparatus in a transfer of information from an apparatus transmitting the information to an apparatus receiving the information, that is, the destination apparatus. It should be noted that the information transmitting apparatus and the information receiving apparatus are referred to hereafter as a source and a sink respectively.

FIG. 41 is a diagram showing the ordinary method for authenticating a destination apparatus. As shown in the figure, the source and the sink are each given a predetermined function f in advance by the author. Stored in a memory of each of the source and sink, the function f is difficult to identify from its input and output. In addition, it is difficult for a person who does not know the function f to infer an output produced by the function f from an input to the function f. The function f is provided to and stored in only an apparatus licensed by the author.

The source generates a random number r and transmits the number r to the sink through a 1394 serial bus. The source also applies the function f to the random number r, generating a number x (=f(r)).

Receiving the random number r from the source, the sink applies the function f to the random number r, generating a number y (=f(r)). The sink then transmits the number y to the source.

The source compares the calculated number x with the number y received from the sink to form a judgment as to whether or not the former is equal to the latter (x=y). If the number x is found equal to the number y, the source judges the sink to be a valid apparatus. In this case, movie information is encrypted by using a predetermined key before being transmitted to the sink.

As the key, a value k generated by applying the function f to the number y received by the source from the sink f is used (k=f(y)). By the same token, the sink also applies the function f to the number y to generate the value k (=f(y)). The value k is then, on the contrary, used as a key for decrypting the encrypted movie information.

In this method, however, it is necessary for all pieces of electronic equipment used as sources and sinks for transmitting and receiving information respectively to hold a uniform function f in strict confidence.

As a result, when the function f held in a piece of electronic is stolen by an unauthorized user, for example, the unauthorized user is capable of generating a key k by monitoring data exchanged by way of a 1394 serial bus and is, hence, capable of interpreting or decrypting encrypted data. In this way, the unauthorized user is capable of illegally stealing information by posing as an authorized user using a desired piece of electronic equipment.

OBJECT AND SUMMARY OF THE INVENTION

The present invention addresses the problems described above. It is an object of the present invention to further improve security of transmitted information by preventing an unauthorized user from posing as an authorized user using a desired piece of electronic equipment even if data required for encrypting or decrypting the information is stolen by the unauthorized user.

The above and other objects, features as well as many of the attendant advantages of the present invention will become more apparent and will hence be more readily appreciated as the same becomes better understood from a study of the following detailed description of some preferred embodiments with reference to accompanying diagrams showing the embodiments.

BRIEF DESCRIPTION OF THE DRAWINGS

Preferred embodiments of the present invention will be described by referring to diagrams wherein.

DETAILED DESCRIPTION OF THE PREFERRED EMBODIMENTS

Figure 1:
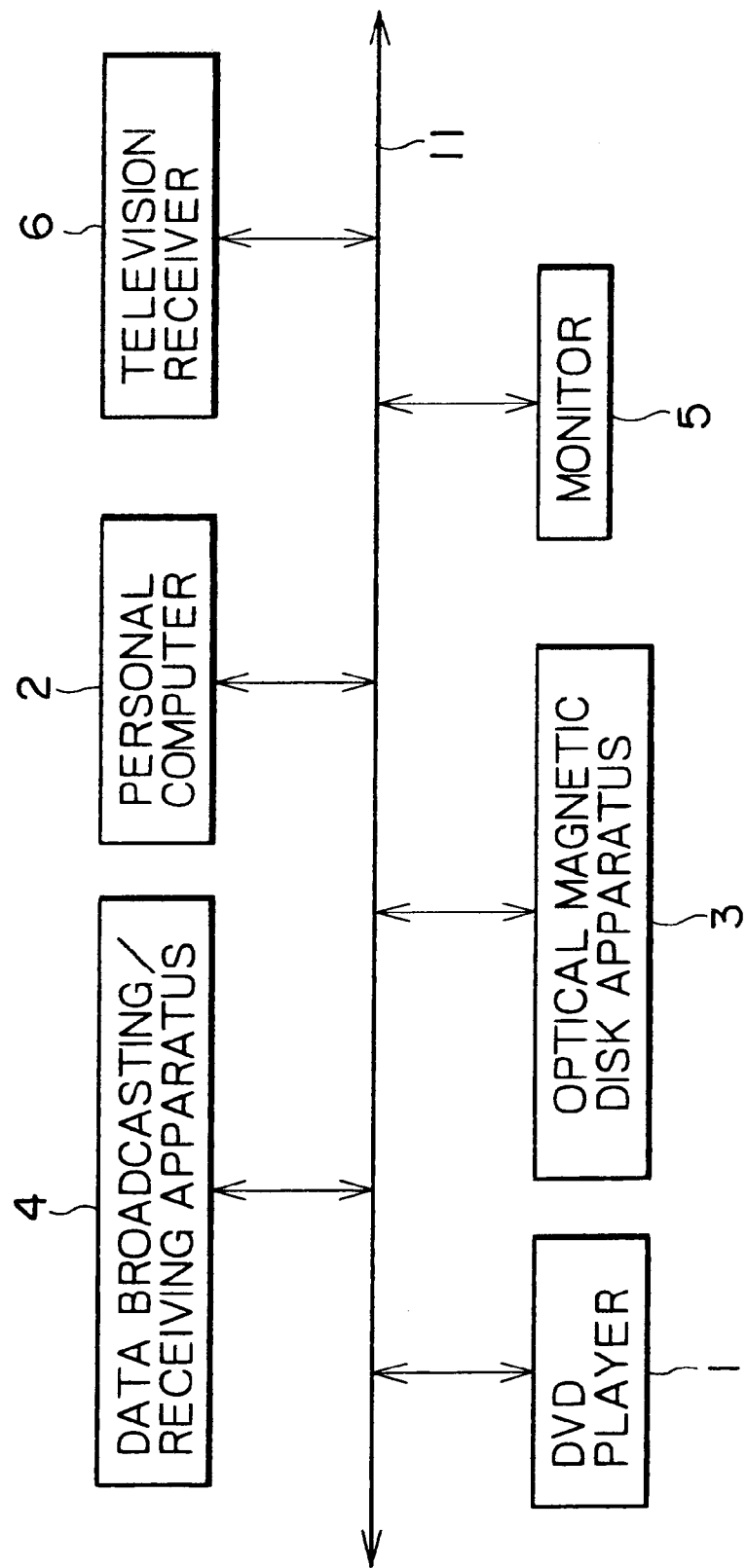
FIG. 1 is a block diagram showing a typical configuration of an information processing system to which the present invention is applied.

FIG. 1 is a block diagram showing a typical configuration of an information processing system to which the present invention is applied. As shown in the figure, in the configuration, a DVD player 1, a personal computer 2, an optical magnetic disc apparatus 3, a data broadcasting/receiving apparatus 4, a monitor 5 and a television receiver 6 are connected to each other by an IEEE1394 serial bus 11.

Figure 2:
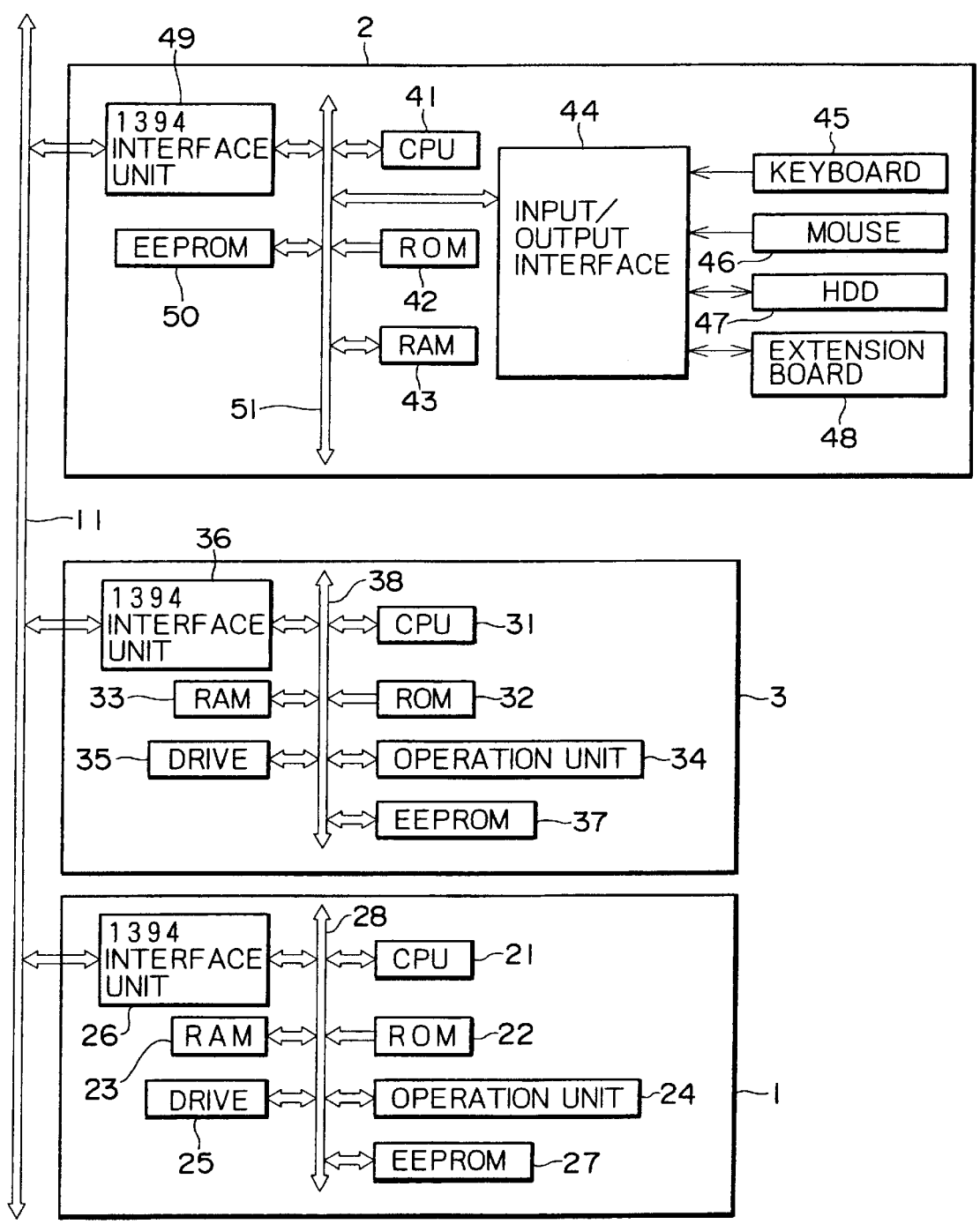
FIG. 2 is a block diagram showing detailed typical configurations of a DVD player 1, a personal computer 2 and an optical magnetic disc apparatus 3 in the information processing system shown in FIG. 1.

FIG. 2 is a block diagram showing detailed typical configurations of the DVD player 1, the personal computer 2 and the optical magnetic disc apparatus 3 in the information processing system shown in FIG. 1. The DVD player 1 comprises a CPU 21, a ROM unit 22, a RAM unit 23, an operation unit 24, a drive 25, a 1394 interface unit 26 and an EEPROM unit 27 which are connected to each other by an internal bus 28. As shown in the figure, the DVD player 1 is connected to the 1394 serial bus 11 through a 1394 interface unit 26. The CPU 21 carries out various kinds of processing by execution of a program stored in the ROM unit 22. The RAM unit 23 is used for properly storing information such as data and the program which are required by the CPU 21 in carrying out the processing. The operation unit 24 comprises components such as buttons, switches and a remote controller. When the user operates the operation unit 24, a signal representing the operation is generated. The driver 25 drives a DVD which is not shown in the figure, playing back data recorded on the DVD. The EEPROM unit 27 is used for storing information which needs to be stored even after the power supply of the DVD player 1 is turned off. In the case of the present embodiment, an example of such information is an encryption/decryption key. The internal bus 28 is used for connecting the CPU 21, the ROM unit 22, the RAM unit 23, the operation unit 24, the drive 25, the 1394 interface unit 26 and the EEPROM unit 27 to each other.

Much like the DVD player 1, the optical magnetic disc apparatus 3 comprises a CPU 31, a ROM unit 32, a RAM unit 33, an operation unit 34, a drive 35, a 1394 interface unit 36 and an EEPROM unit 37 which are connected to each other by an internal bus 38. Since the CPU 31 to the internal bus 38 have the same functions of the CPU 21 to the internal bus 28 employed in the DVD player 1 respectively, their explanation is not repeated. The only exception is that the driver 35 drives an optical magnetic disc which is not shown in the figure instead of a DVD. The driver 35 records and plays back data into and from the optical magnetic disc.

In addition to a CPU 41, a ROM unit 42, a RAM unit 43, a 1394 interface unit 49 and an EEPROM unit 50 which are connected to each other by an internal bus 51, the personal computer 2 also includes an input/output interface unit 44, a keyboard 45, a mouse 46, an HDD (Hard Disc Drive) 47 and an expansion board 48. The personal computer 2 is connected to the 1394 serial bus 11 through the 1394 interface unit 49. The CPU 41 carries out various kinds of processing by execution of a program stored in the ROM unit 42. The RAM unit 43 is used for properly storing information such as data and the program which are required by the CPU 41 in carrying out the processing. Connected to the internal bus 51, the input/output interface unit 44 serves as an interface between the CPU 41 and the keyboard 45, the mouse 46, the HDD 47 and the expansion board 48. The input/output interface unit 44 passes on signals input from the keyboard 45 and the mouse 46 connected to the interface unit 44 to the CPU 41 by way of the internal bus 51. Connected to the HDD 47, the input/output interface unit 44 allows data and a program coming from the internal bus 51 to be stored into the HDD 47 and, on the contrary, data and a program stored in the HDD 47 to be read out and forwarded to the internal bus 51. The expansion board 48 is connected to the input/output interface unit 44, if needed, allowing necessary functions to be added to the personal computer 2. The EEPROM unit 50 is used for storing information which needs to be stored even after the power supply of the personal computer 2 is turned off. In the case of the present embodiment, an example of such information is a variety of encryption/decryption keys. The internal bus 51 is a local bus typically implemented by a PCI (Peripheral Component Interconnect) bus for connecting the CPU 41, the ROM unit 42, the RAM unit 43, the 1394 interface unit 49, the EEPROM unit 50 and the input/output interface unit 44 to each other.

It should be noted that the internal bus 51 is designed in an architecture open to the user through the input/output interface unit 44. That is to say, the user is allowed to connect an additional board as an expansion board 48 to the input/output interface unit 44, if required, and to write a custom program for the additional board to be installed in the personal computer 2. The CPU 41 then executes the custom program, properly exchanging data with the expansion board 48 by way of the internal bus 51 in order to implement a desired function.

In the case of a consumer electronic (CE) apparatus such as the DVD player 1 and the optical magnetic disc apparatus 3, on the contrary, their internal buses 28 and 38 are not designed in an architecture open to the user. Thus, the user is not capable of acquiring data transmitted by way of the internal bus 28 or 38 unless the internal bus 28 or 38 is redesigned specially.

Figure 3:
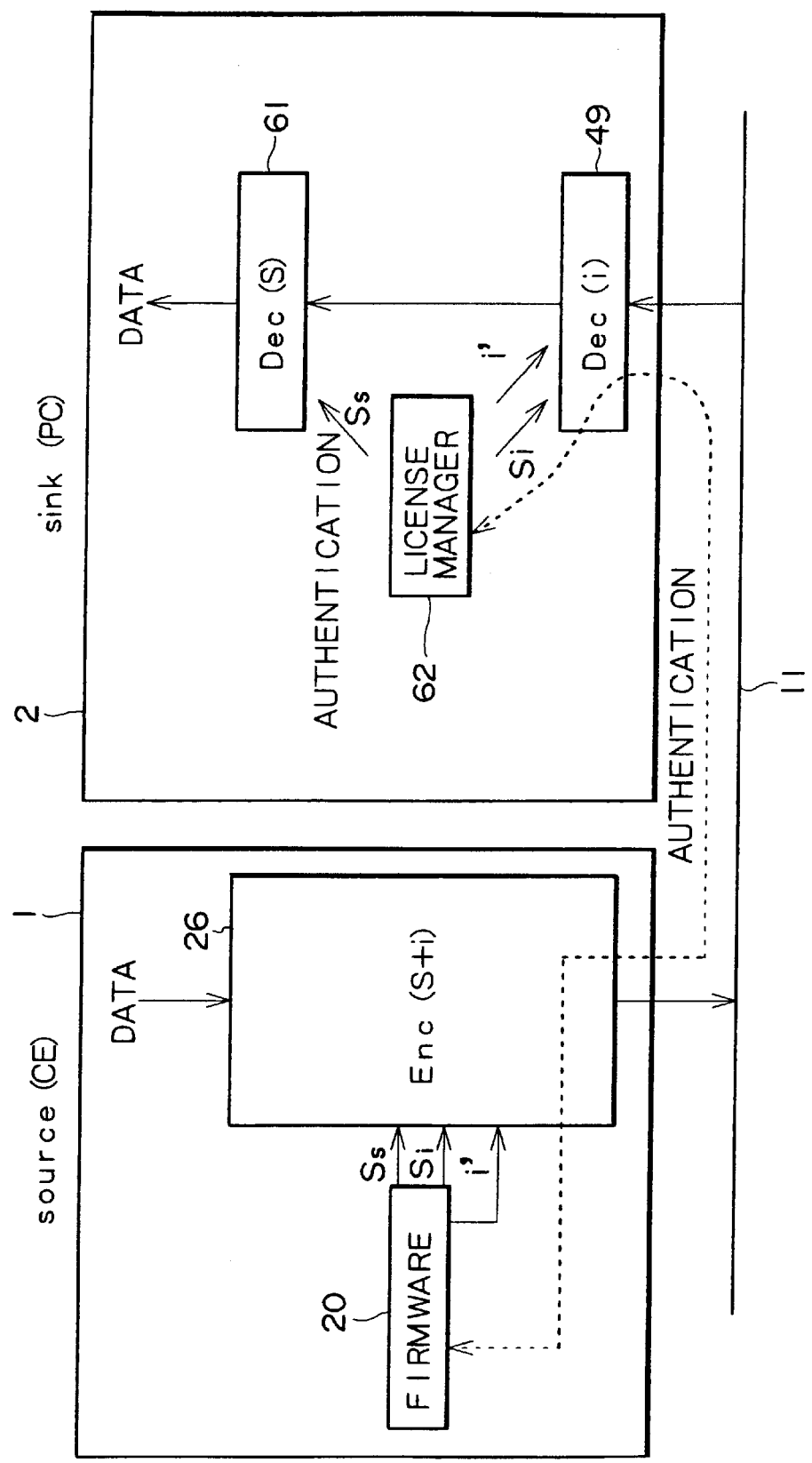
FIG. 3 is an explanatory diagram used for describing authentication processing.
Figure 4:
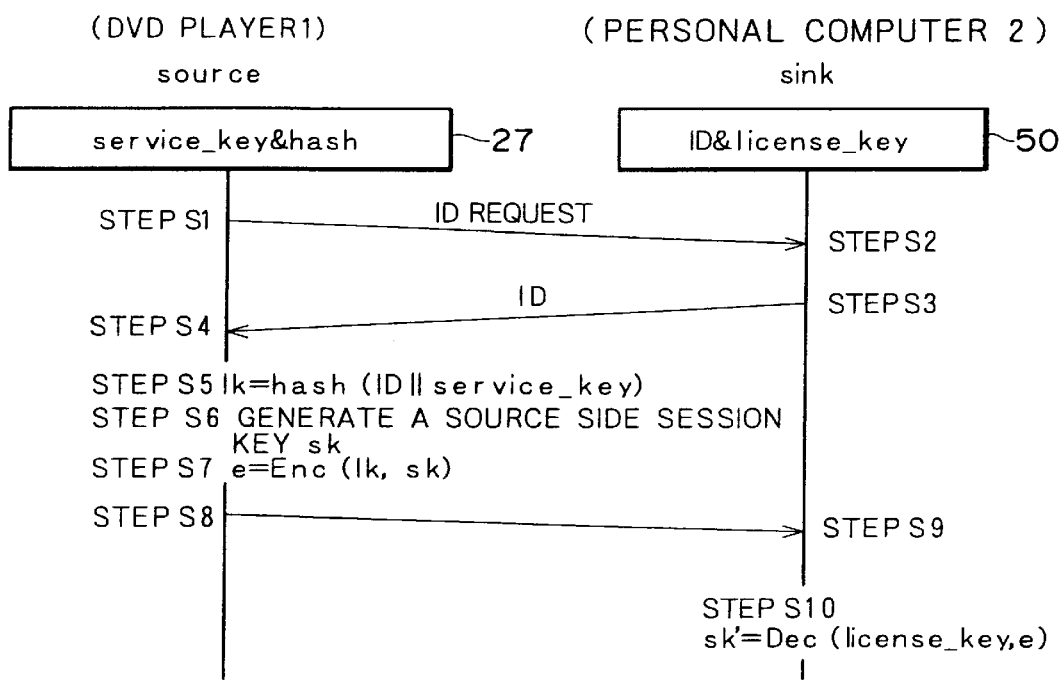
FIG. 4 is a diagram showing an embodiment implementing an authentication procedure for carrying out the authenticating processing shown in FIG. 3.

The following is a description of processing of authentication of a sink carried out by a source with reference to FIGS. 3 and 4. FIG. 3 is an explanatory diagram used for describing the authentication processing. As shown in the figure, the processing is typically carried out by firmware 20 stored as a program in advance in the ROM unit 22 employed in the DVD player 1 serving as the source to authenticate a license manager 62 stored in the ROM unit 42 to be executed as a program by the CPU 41 employed in the personal computer 2 serving as the sink.

FIG. 4 is a diagram showing an embodiment implementing a procedure whereby the source implemented typically by the DVD player 1 authenticates the sink implemented typically by the personal computer 2 by allowing the sink to generate a sink side common session key having the same value as a source side common session key generated by the source only if the sink is a valid sink. In the EEPROM unit 27 employed in the DVD player 1, a service key and a hash function are stored in advance. The service key and the hash function are given by an author of information to the user of the DVD player 1 who has to keep them in the EEPROM unit 27 in strict confidence.

The author provides the user with a service key for each piece of information created by the author. The service key is used as a key common to all apparatuses connected to each other by the 1394 serial bus 11 to compose a system. It should be noted that, in the present specification, the term system is used to imply the whole system comprising a plurality of apparatuses.

The hash function is used for transforming an input with an arbitrary length into output data with a fixed length such as 64 bits or 128 bits. Let the transformation be expressed by y=hash (x) where the symbol x is the input to the hash function and the symbol y is the data output by the function. In this case, the hash function is such a complex function that it is difficult to find the value of x from a given value of y. The hash function is such a complicated function that it is difficult to find a pair of x1 and x2 that satisfies the equation hash (x1)=hash (x2). MD5 and SHA are each the name of a function known as a representative one-way hash function. For details of the one-way hash function, refer to a reference with a title "Applied Cryptography" authored by Bruce Schneier, a second edition published by Wiley.

In the personal computer 2 used as a typical sink in the example shown in FIG. 4, on the other hand, an ID unique to the electronic apparatus, that is, the personal computer 2 in this case, and a license key provided in advance by the author of information are stored in strict confidence in the EEPROM unit 50. This node (apparatus) unique ID is normally assigned to the electronic apparatus by the manufacturer of electronic equipment as will be described later. The license key is a value resulting from application of the hash function to (n+m)-bit data which is obtained by concatenating the n-bit ID with the m-bit service key. Thus, the license key can be expressed by the following equation:

license_key=hash (ID∥service_key)

where the notation "ID ∥ service_key" represents a concatenation of the ID with the service key.

Figure 5:
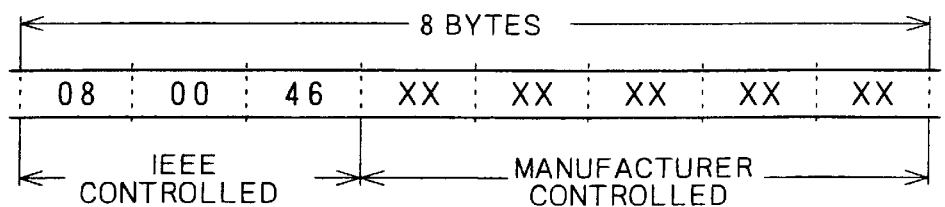
FIG. 5 is a diagram showing the format of a node unique ID.

A node unique_ID determined by specifications of the 1394 bus 11 can be typically used as an ID. FIG. 5 is a diagram showing the format of the node unique ID. As shown in the figure, the node unique ID comprises 8 bytes (or 64 bits). The first 3 bytes are controlled by the IEEE and given by the IEEE to a manufacturer of electronic equipment as a number unique to the manufacturer. On the other hand, the low-order 5 bytes can be assigned by the manufacturer of electronic equipment itself to an electronic apparatus sold to the user. Typically, each value of the whole low-order 5 bytes are assigned by the electronic equipment maker to an electronic apparatus as a serial number of the apparatus. Since the high-order 3 bytes have a value unique to the manufacturer of electronic equipment, the node_unique_ID is unique to each of electronic apparatuses without regard to whether the apparatuses are produced by the same manufacturer or different manufacturers.

As shown in FIG. 4, the procedure begins with a Step S1 at which the firmware 20 in the DVD player 1 controls the 1394 interface unit 26 to make a request to the personal computer 2 for the ID thereof to be transmitted by way of the 1394 serial bus 11. Then, the procedure goes on to a step S2 at which the license manager 62 of the personal computer 2 receives the request for the ID. To put it in detail, the 1394 interface unit 49 employed in the personal computer 2 passes on the request for the ID transmitted by the DVD player 1 by way of the 1394 serial bus 11 to the CPU 41. The procedure then proceeds to a step S3 at which the license manager 62 being executed by the CPU 41 reads out the ID from the EEPROM unit 50 in accordance with the request forwarded thereto by the 1394 interface unit 49 and transmits the ID to the DVD player 1 by way of the 1394 interface unit 49 and the 1394 serial bus 11.

Then, the procedure continues to a step S4 at which the 1394 interface unit 26 employed in the DVD player 1 receives the ID and passes on it to the firmware 20 being executed by the CPU 21.

Subsequently, the procedure goes on to a step S5 at which the firmware 20 concatenates the ID received from the personal computer 2 with a service key stored in the EEPROM unit 27 to form data (ID ∥ service_key). Then, a license key lk is computed by applying the hash function to the data (ID ∥ service_key) as shown in the following equation:

$$lk = hash\ (ID \| service\_key)$$

The procedure then proceeds to a step S6 at which the firmware 20 generates a source side common session key sk, details of which will be described later. The source side common session key sk will be used as a common session key S by both the DVD player 1 to encrypt a clear text to be transmitted and by the personal computer 2 to decrypt an encrypted text received from the DVD player 1.

Then, the procedure continues to a step S7 at which the firmware 20 encrypts the source side common session key sk generated at the step S6 by using the license key lk computed at the step S5 as a key to produce an encrypted source side common session key e in accordance with the following equation:

$$e = Enc(lk, sk)$$

It should be noted that the expression Enc (A, B) on the right hand side of the above equation represents a common session key encryption/decryption technique whereby data B is encrypted by using a key A to produce an encrypted source side common session key e on the left hand side of the equation.

Subsequently, the procedure goes on to a step S8 at which the firmware 20 transmits the encrypted source side common session key e generated at the step S7 to the personal computer 2. To put it in detail, the encrypted source side common session key e is transmitted by the 1394 interface unit 26 employed in the DVD player 1 to the personal computer 2 by way of the 1394 serial bus 11. The procedure then proceeds to a step S9 at which the 1394 interface unit 49 employed in the personal computer 2 receives the encrypted source side common session key e. Then, the license manager 62 decrypts the encrypted source side common session key e passed on thereto by the 1394 interface unit 49 by using a license key provided in advance by the author of information and stored in the EEPROM unit 50 as a key to produce a sink side common session key sk' in accordance with the following equation:

$$sk' = Dec(license\_key, e)$$

It should be noted that the expression Dec (A, B) on the right hand side of the above equation represents the common session key encryption/decryption technique whereby encrypted data B is in this case decrypted by using a key A to produce a sink side common session key sk' on the left hand side of the equation.

It is also worth noting that a DES algorithm is known as a data encrypting/decrypting algorithm adopted in the common session key encryption/decryption technique which is also described in detail in the second edition of the reference with the title "Applied Cryptography" cited above.

The license key provided by the author of information and stored in the EEPROM unit 50 employed in the personal computer 2 in advance has a value which was computed by the author by using the same hash function as license the key lk was generated by the DVD player 1 at the step S5. That is to say, the following equation holds true:

$$lk = license\_key$$

Thus, based on the common source side common session key encryption/decryption technique using the same (license) key, the decryption carried out by the personal computer 2 at the step S10 is just a reversed process of the encryption performed by the DVD player 1 at the step S7. As a result, since e is the encrypted data of the source side common session key sk generated by the DVD player 1 at the step S6, the sink side common session key sk' computed by the personal computer 2, that is, a result of the decryption of the encrypted source side common session key e, is equal to the source side common session key sk. That is to say, the following equation holds true:

$$sk' = sk$$

In this way, since the source and sink side common session keys sk and sk' have the same value, the source implemented typically by the DVD player 1 and the sink implemented typically by the personal computer 2 can share a common session key S. For this reason, the DVD player 1 can use the key sk as an encryption key as it is to encrypt a clear text created by the author to be transmitted to the personal computer 2. By the same token, the personal computer 2 can use the sink side common session key sk' as a decryption key as it is to decrypt an encrypted text received from the DVD player 1. As an alternative, the DVD player 1 generates a pseudo random number to be used as an encryption key by using the source side common session key sk as a base as will be described later. Likewise, the personal computer 2 generates a random number to be used as a decryption key by using the sink side common session key sk' as a base as will also be described later.

As described above, the license key lk is generated at the step S5 of the procedure shown in FIG. 4 by applying the hash function to a concatenation of an ID unique to a particular electronic apparatus and a service key provided for a text created by the author. Thus, in a pair of electronic apparatuses wherein the source does not have the service key for the text and/or the sink does not have the ID unique to the legal owner, it is impossible to generate the correct license key lk (Refer to the step S5 of the procedure shown in FIG. 4). In addition, an electronic apparatus not authenticated by the author is not provided with a license key and, thus, not capable of generating the session key sk' (Refer to the step S10 of the procedure shown in FIG. 4). In a normal case, after the procedure shown in FIG. 4 is completed, the DVD player 1 encrypts reproduced data or a clear text by using the source side common session key sk and transmits the encrypted data or the encrypted text to the personal computer 2. Provided with a correct license key, the personal computer 2 is capable of generating the sink side common session key sk' (Refer to the step S10 of the procedure shown in FIG. 4). The personal computer 2 is thus capable of decrypting the encrypted playback data or the encrypted text received from the DVD player 1 by means of the sink side common session key sk'. If the personal computer 2 is not a licensed electronic apparatus, however, it will be impossible to generate the sink side common session key sk' because the correct license key is not available. As a result, the unlicensed personal computer 2 is not capable of decrypting the encrypted playback data or the encrypted text received from the DVD player 1. In other words, only a sink capable of generating a sink side common session key sk' having the same value as the source side common session key sk generated by the source is authenticated in the end. This is because only a particular electronic apparatus serving as an authorized source which has a service key provided by an author for information or a text created by the author and receives a correct ID from an authorized sink is capable of generating the correct license key lk. By the same token, only a particular electronic apparatus serving as an authorized sink which is provided with the correct license key by the author is capable of generating the correct sink side common session key sk' for use as a decryption key to decrypt encrypted data or an encrypted text.

Assume that a license key granted to a personal computer 2 is stolen by any chance. In this case, nevertheless, the stolen license key can not be used in another electronic apparatus to generate a valid sink side common session key sk' because the other apparatus has an ID different from that assigned to the personal computer 2. Since the ID varies from apparatus to apparatus as such, another electronic apparatus will not be capable of decrypting the encrypted playback data or the encrypted text received from the DVD player 1 by means of the stolen license key. As a result, the security of transmitted information can be enhanced.

By the way, an unauthorized user may know both the encrypted source side common session key e and the source side common session key sk by any chance for some reasons. In this case, since the encrypted source side common session key e is a kind of text resulting from encryption of the source side common session key sk using the license key lk, it is quite within the bounds of possibility that the unauthorized user is capable of obtaining the correct value of the license key lk by using all values of the license key lk in the encryption of the source side common session key sk using the license key lk to calculate the encrypted source side common session key e on a trial-and-error basis provided that the algorithm of the encryption is disclosed.

In order to prevent an unauthorized user from launching such a kind of attack, the process to reversely derive a license key from a known encrypted source side common session key e and a known source side common session key sk can be made difficult by keeping the algorithm of the encryption in strict confidence, that is, by not disclosing part or all of the encryption algorithm to the public.

By the same token, a process to reversely derive a service key from a known license key and an ID by using all values of the service key and the known ID in a hash function to produce the known license key on a trial-and-error basis can be made complicated by keeping the hash function in strict confidence, that is, by not disclosing part or all of the hash function to the public.

Figure 6:
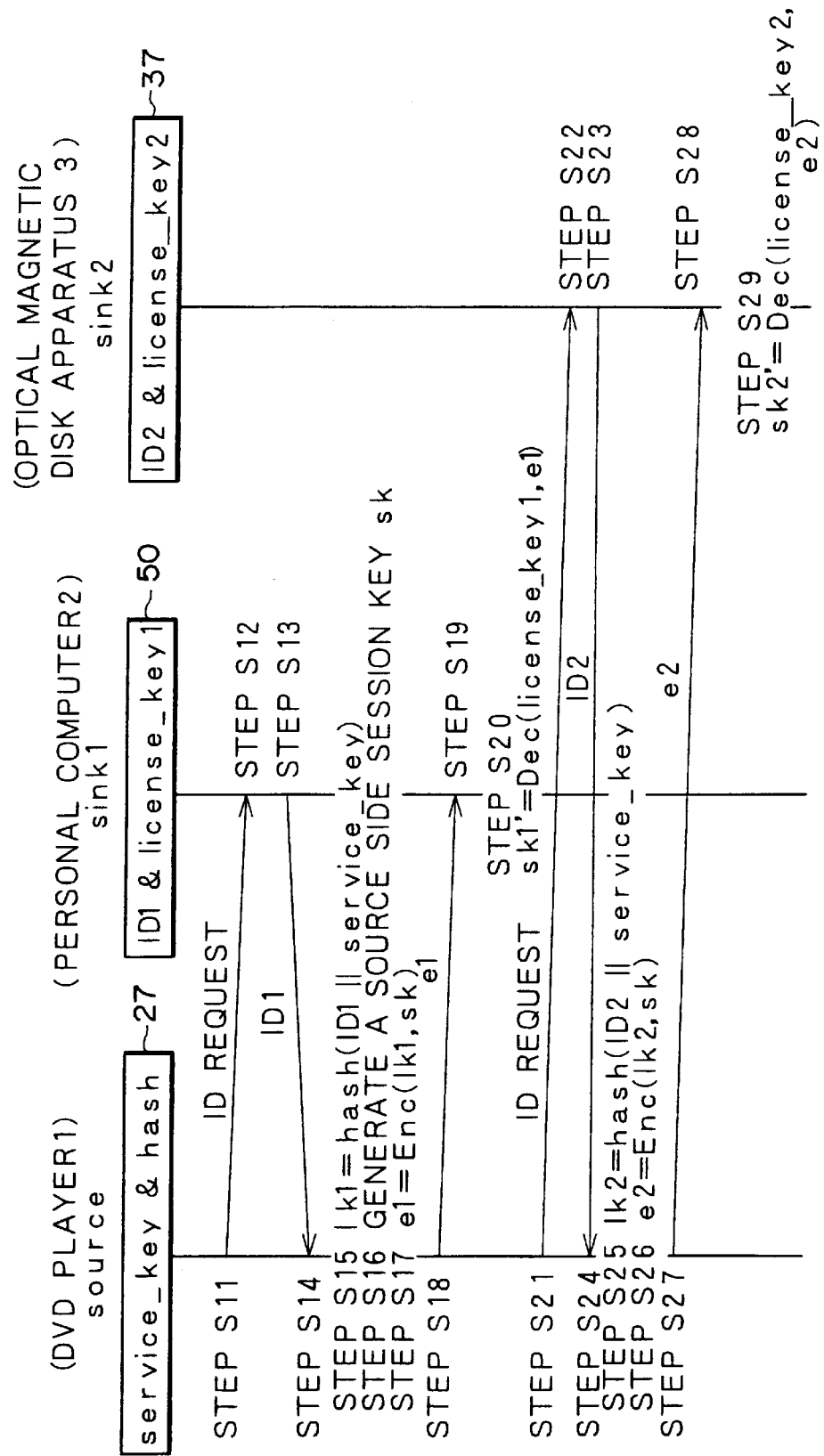
FIG. 6 is a diagram showing another embodiment implementing the authentication procedure.

FIG. 6 is a diagram showing another embodiment implementing an authentication procedure whereby a source implemented typically by the DVD player 1 authenticates two sinks implemented typically by the personal computer 2 and the optical magnetic disc apparatus 3 respectively by allowing each of the sinks to generate a sink side common session key having the same value as a source side common session key generated by the source only if the sinks are valid sinks.

In the EEPROM unit 50 employed in the personal computer 2 serving as the first sink, ID 1, an identification assigned in advance uniquely by a manufacturer of electronic equipment to the personal computer 2, and License Key 1, a license key provided in advance by an author of information to the computer 2 are stored. By the same token, in the EEPROM unit 37 employed in the optical magnetic disc apparatus 3 serving as the second sink, ID 2, an ID assigned in advance uniquely by a manufacturer of electronic equipment to the disc apparatus 3, and License Key 2, a license key provided in advance by the author of information to the disc apparatus 3 are stored.

Since pieces of processing carried out at the steps S11 to S20 by the DVD player 1 serving as the source and the personal computer 2 serving as the first sink are in essence the same as those of the steps S1 to S10 of the procedure shown in FIG. 4, their explanation is not repeated.

In brief, the personal computer 2 generates a valid sink side common session key sk1' from an encrypted source side common session key e1 received from the DVD player 1 at the step S20 as described above. The procedure then goes on to a step S21 at which the firmware 20 in the DVD player 1 controls the 1394 interface unit 26 to make a request to the optical magnetic disc apparatus 3 for the ID thereof to be transmitted by way of the 1394 serial bus 11. Then, the procedure goes on to a step S22 at which firmware 30 of the optical magnetic disc apparatus 3 shown in FIG. 10 receives the request for the ID. To put it in detail, the 1394 interface unit 36 employed in the optical magnetic disc apparatus 3 passes on the request for the ID transmitted by the DVD player 1 by way of the 1394 serial bus 11 to the CPU 31. The procedure then proceeds to a step S23 at which the firmware being executed by the CPU 31 reads out the identification ID2 from the EEPROM unit 37 in accordance with the request forwarded thereto by the 1394 interface unit 36 and transmits the identification ID2 to the DVD player 1 by way of the 1394 interface unit 36 and the 1394 serial bus 11.

Then, the procedure continues to a step S24 at which the 1394 interface unit 26 employed in the DVD player 1 receives the identification ID2 and passes on it to the firmware 20 being executed by the CPU 21.

Subsequently, the procedure goes on to a step S25 at which the firmware 20 concatenates the identification ID2 received from the optical magnetic disc apparatus 3 with a service key stored in the EEPROM unit 27 to form data (ID2 ∥ service_key). Then, a license key lk2 is computed by applying the hash function to the data (ID2 ∥ service_key) as shown in the following equation:

$lk2$=hash (ID2∥service_key)

Then, the procedure continues to a step S26 at which the firmware 20 encrypts the source side common session key sk generated at the step S16 by using the license key lk2 computed at the step S25 as a key to produce an encrypted source side common session key e2 in accordance with the following equation:

$$e2=Enc(lk2, sk)$$

Subsequently, the procedure goes on to a step S27 at which the firmware 20 transmits the encrypted source side common session key e2 generated at the step S26 to the optical magnetic disc 3. To put it in detail, the encrypted source side common session key e2 is transmitted by the 1394 interface unit 26 employed in the DVD player 1 to the optical magnetic disc apparatus 3 by way of the 1394 serial bus 11.

The procedure then proceeds to a step S28 at which the 1394 interface unit 36 employed in the optical magnetic disc 3 receives the encrypted source side common session key e2. Then, the procedure proceeds to a step S29 at which the firmware 30 decrypts the encrypted source side common session key e2 passed on thereto by the 1394 interface unit 36 by using a license key (license_key 2) stored in the EEPROM unit 37 as a key to produce a sink side common session key sk2' in accordance with the following equation:

$$sk2'=Dec(license\_key\ 2, e2)$$

As described above, the personal computer 2 and the optical magnetic disc apparatus 3 generate the sink side common session keys sk1' and sk2' at the steps S20 and S29 respectively. Normally, the sink side common session keys sk1' and sk2' have the same value as the source side common session key sk generated by the DVD player 1 at the step S16.

Figure 7:
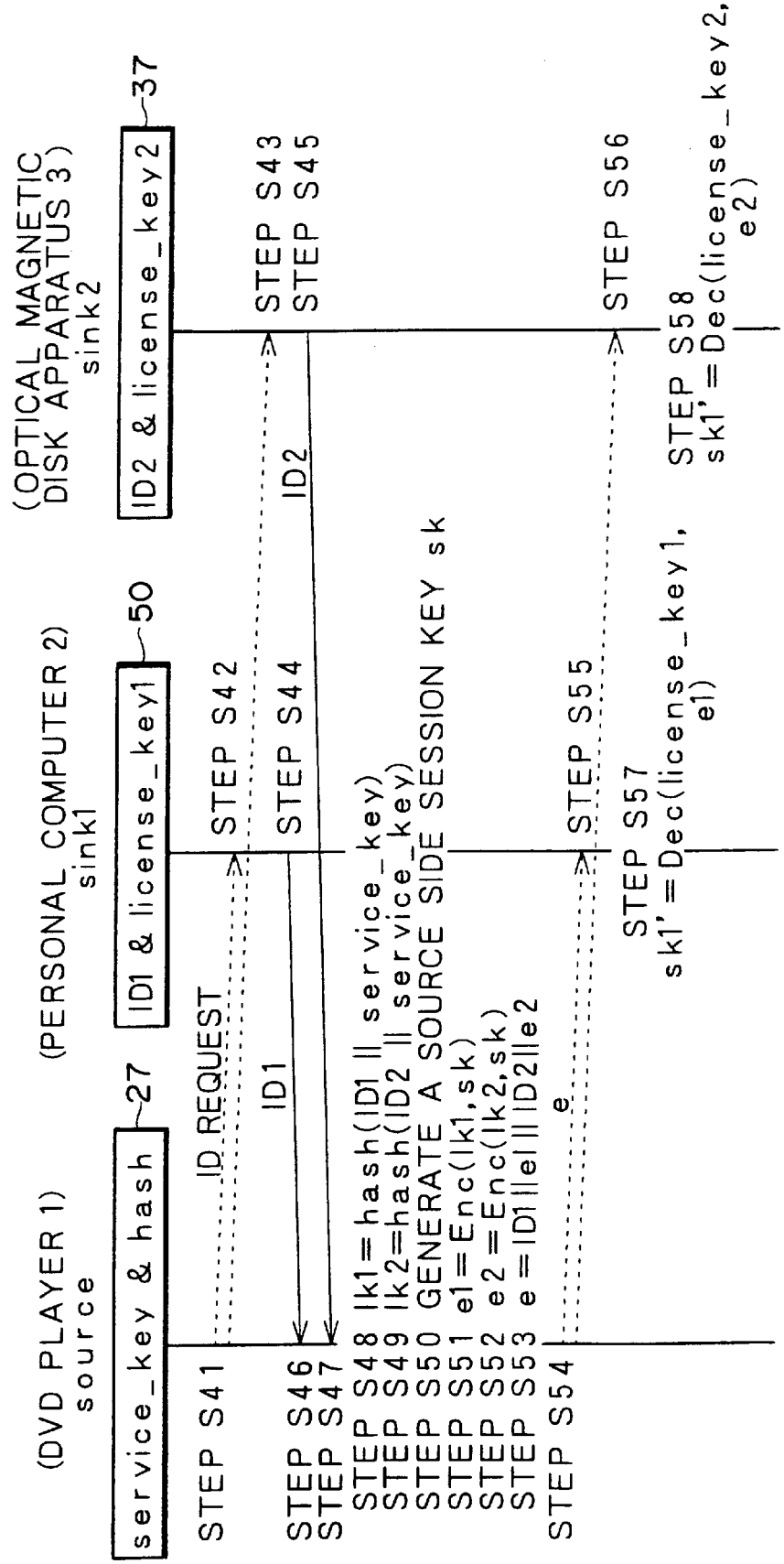
FIG. 7 is a diagram showing a further embodiment implementing the authentication procedure.

In the procedure shown in FIG. 6, the DVD player 1 makes requests for an ID to the personal computer 2 and the optical magnetic disc apparatus 3 separately. It should be noted, however, that in the case of broadcasting communication wherein requests can be made at the same time, processing according to an embodiment implementing a procedure like one shown in FIG. 7 can be carried out.

As shown in the figure, the procedure begins with a step S41 at which the DVD player 1 transmits requests to all sinks, that is, the personal computer 2 and the optical magnetic disc apparatus 3, for the IDs thereof by broadcasting communication. Then, the procedure goes on to steps S42 and S43 at which the personal computer 2 and the optical magnetic disc apparatus 3 respectively receive the requests for the IDs. The procedure then proceeds to steps S44 and S45 at which the personal computer 2 and the optical magnetic disc apparatus 3 read out the identifications ID1 and ID2 from the EEPROM units 50 and 37 respectively and transmit them to the DVD player 1. Then, the procedure continues to steps S46 and S47 at which the DVD player 1 receives the identifications ID1 and ID2 respectively.

Subsequently, the procedure goes on to a step S48 at which the DVD player 1 concatenates the identification ID1 received from the personal computer 2 with a service key stored in the EEPROM unit 27 to form data (ID1 || service_key). Then, a license key lk1 is computed by applying the hash function to the data (ID1 || service_key) as shown in the following equation:

$$lk1=\text{hash}\ (ID1\|service\_key)$$

Subsequently, the procedure goes on to a step S49 at which the DVD player 1 concatenates the identification ID2 received from the optical magnetic disc apparatus 3 with the service key stored in the EEPROM unit 27 to form data (ID2 || service_key). Then, a license key lk2 is computed by applying the hash function to the data (ID2 || service_key) as shown in the following equation:

$$lk2=\text{hash}\ (ID2\|service\_key)$$

The procedure then proceeds to a step S50 at which the DVD player 1 generates a source side common session key sk. Then, the procedure continues to a step S51 at which the DVD player 1 encrypts the source side common session key sk generated at the step S50 by using the license key lk1 computed at the step S48 as a key to produce an encrypted source side common session key e1 in accordance with the following equation:

$$e1=Enc(lk1, sk)$$

Then, the procedure continues to a step S52 at which the DVD player 1 encrypts the source side common session key sk generated at the step S50 by using the license key lk2 computed at the step S49 as a key to produce an encrypted source side common session key e2 in accordance with the following equation:

$$e2=Enc(lk2, sk)$$

The procedure then goes on to a step S53 at which the identification ID1, the encrypted source side common session key e1, the identification ID2 and the encrypted source side common session key e2 are concatenated to produce an encrypted source side common session key e as follows:

$$e=ID1\|e1\|ID2\|e2$$

Subsequently, the procedure goes on to a step S54 at which the DVD player 1 transmits the encrypted source side common session key e to the personal computer 2 and the optical magnetic disc apparatus 3 by broadcasting communication. The procedure then proceeds to steps S55 and S56 at which the personal computer 2 and the optical magnetic disc apparatus 3 receive the encrypted source side common session key e. Then, the procedure proceeds to steps S57 and S58 at which the personal computer 2 and the optical magnetic disc apparatus 3 decrypt the encrypted source side common session keys e1 and e2 extracted from the encrypted source side common session key e by using the license keys License Key 1 and License Key 2 stored in the EEPROM units 50 and 37 as keys to produce sink side common session keys sk1' and sk2' respectively in accordance with the following equations:

$$sk1'=Dec(License\_key\ 1, e1)$$

$$sk2'=Dec(License\_key\ 2, e2)$$

Figure 8:
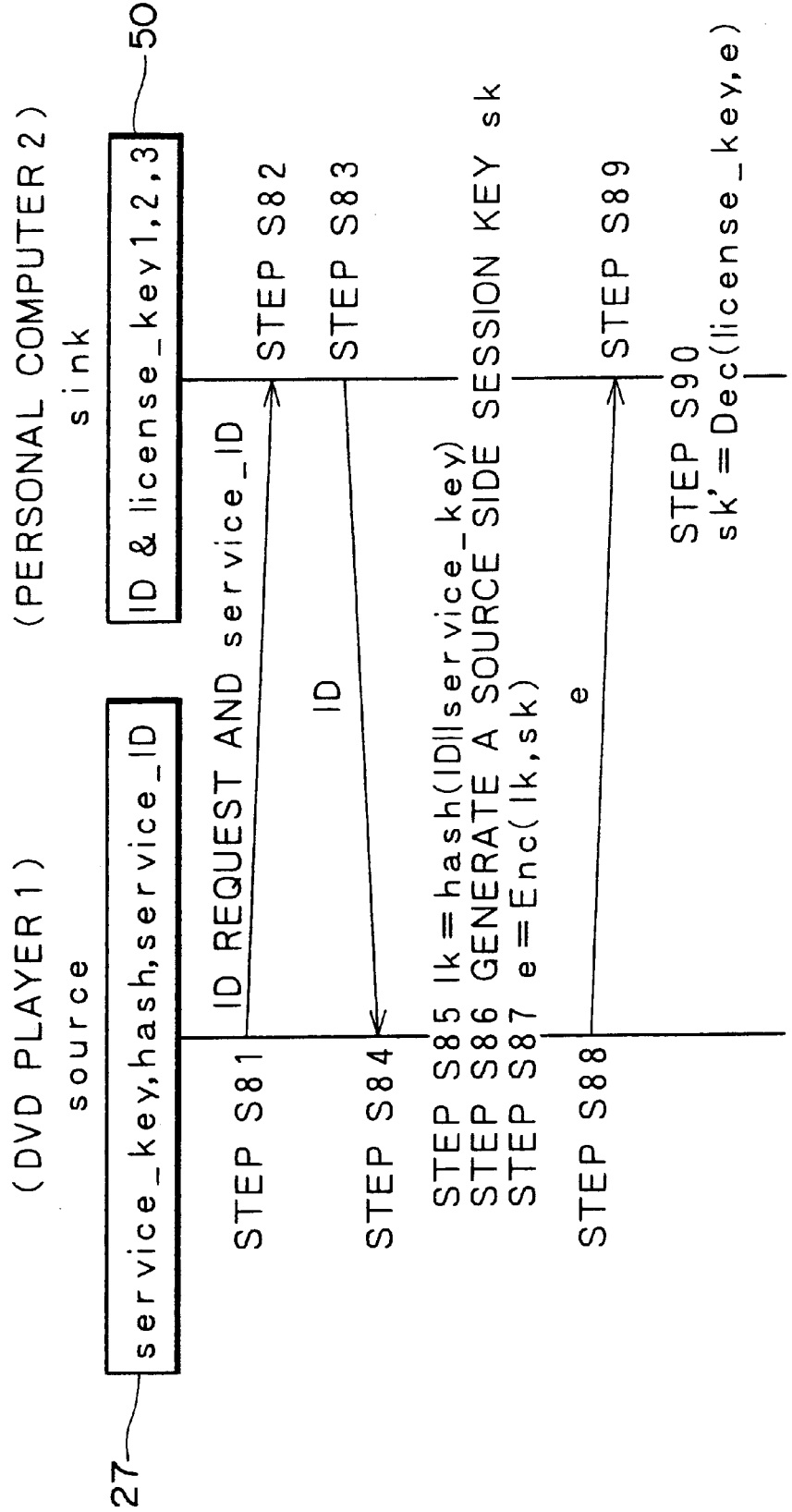
FIG. 8 is a diagram showing a still further embodiment implementing the authentication procedure.

FIG. 8 is a diagram showing an embodiment implementing a procedure of authentication processing whereby only a valid sink will generate a sink side common session key sk' having the same value as a source side common session key sk generated by a source in a system wherein the sink is capable of rendering a plurality of services, that is, decrypting a plurality of kinds of information. To handle the different kinds of information, the personal computer 2 serving as the sink is provided with a plurality of license keys stored in the EEPROM unit 50 such as License_key 1, License_key 2, License_key 3 etc. for the different kinds of information. By the same token, the DVD player 1 serving as a source has information on a plurality of service IDs for identifying which kinds of information to be transmitted to the sink and a plurality of service keys stored in the EEPROM unit 27 such as Service_key 1, Service_key 2, Service_key 3 etc. used for generating License_key 1, License_key 2, License_key 3 etc. respectively. Pieces of processing carried out in the procedure shown in FIG. 8 are similar to those of the procedure shown in FIG. 4 except for the following steps. To begin with, at a step S81, the DVD player 1 transmits a request for an ID along with a service ID for identifying a kind of information, which is to be serviced by the personal computer 2 used as the sink, to the personal computer 2. Then, at a step S85, a license key lk is generated by the DVD player 1 by application of the hash function to an ID received from the personal computer 2 and one of Service_key 1, Service_key 2, Service_key 3 etc. in the EEPROM unit 27 which is associated with the kind of information to be transmitted to the sink, that is, associated with the service ID transmitted to the personal computer 2 at the step S81. Finally, at a step S90, the personal computer 2 generates a sink side common session key sk' from an encrypted source side common session key e received from the DVD player 1 at a step 89 and one of License_key 1, License_key 2, License_key 3 etc. in the EEPROM unit 50 that is associated with the service ID received from the DVD player 1 at the step S82.

Figure 9:
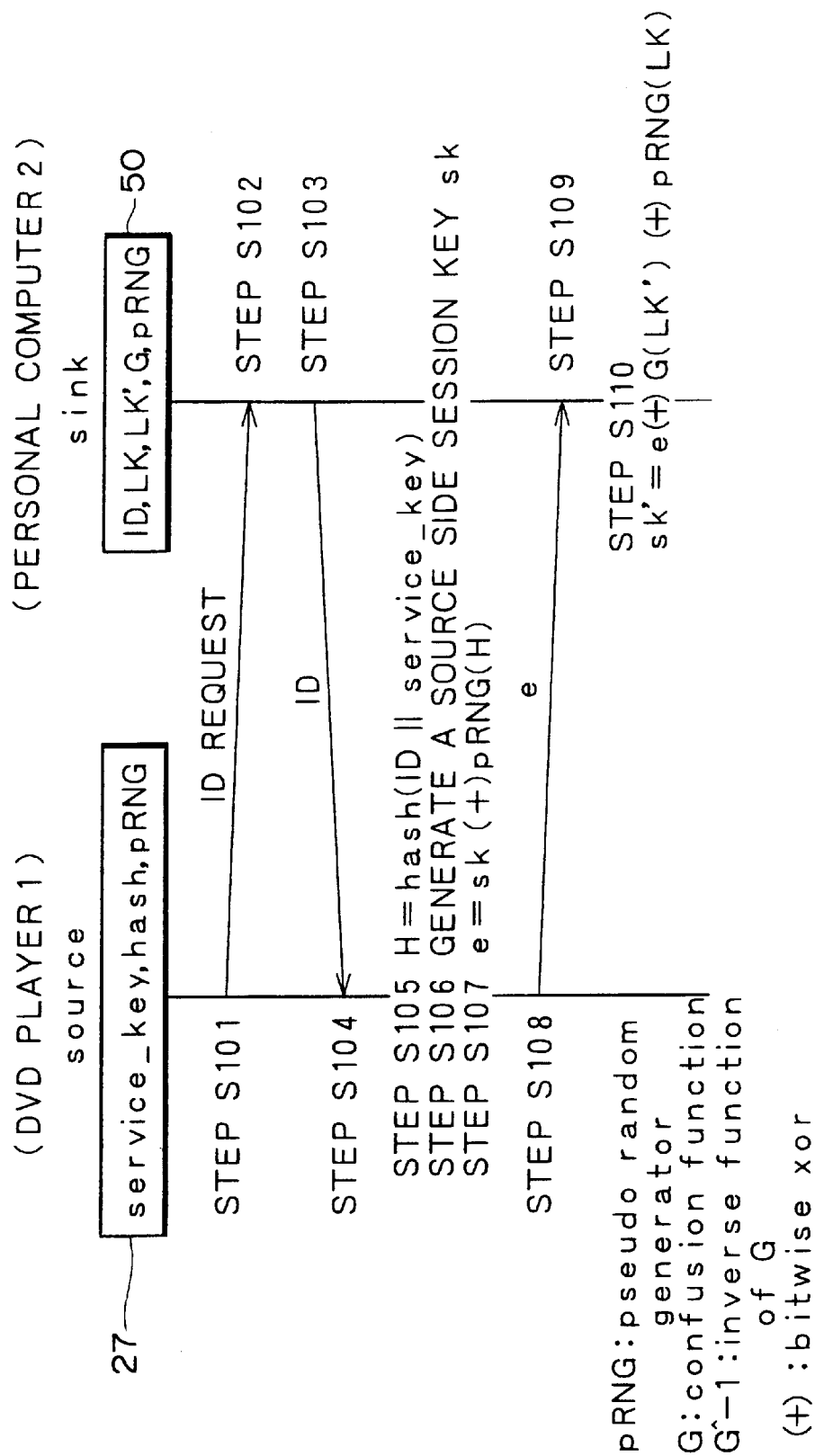
FIG. 9 is a diagram showing still another embodiment implementing the authentication procedure.

FIG. 9 is a diagram showing another embodiment implementing a procedure of authentication whereby only a valid sink will be capable of generating a sink side common session key sk' having the same value as a source side common session key sk generated by a source. In this case, the DVD player 1 used as a source has a service key, a hash function and a pseudo random number generating function pRNG which are stored in the EEPROM unit 27 employed thereby. The service key, the hash function and the pseudo random number generating function pRNG are given by an author of information and kept in strict confidence. On the other hand, stored in the EEPROM unit 50 employed by the personal computer 2 serving as a sink are an ID assigned to the personal computer 2 by the manufacturer of electronic equipment as well as license keys LK and LK', a confusion function G and the pseudo random number generating function pRNG which are given by the author of the information.

The license key LK is a unique random number generated by the author whereas the license key LK' is also generated by the author so as to satisfy the following equation:

$$LK'=G^{-1}(R)$$

where $R=pRNG(H) (+) pRNG(LK)$
where $H=hash((ID \| service\_key))$

It should be noted that, while the symbol ^ alone denotes the power notation, the notation 'G^−1' means the inverse function of the confusion function G. The value of the inverse function G^−1 can be found with ease provided that predetermined rules are known. If the predetermined rules are not known, however, it is difficult to compute the value of the inverse function G^−1. A function used in encryption based on a disclosed key can be utilized as this function.

In addition, the function pRNG for generating a random number can be implemented by hardware.

As shown in FIG. 9, the procedure begins with a step S101 at which the firmware 20 in the DVD player 1 makes a request to the license manager 62 of the personal computer 2 for the ID thereof to be transmitted. Then, the procedure goes on to a step S102 at which the license manager 62 of the personal computer 2 receives the request for the ID. The procedure then proceeds to a step S103 at which the license manager 62 reads out the ID from the EEPROM unit 50 in accordance with the request and transmits the ID to the DVD player 1. Then, the procedure continues to a step S104 at which the DVD player 1 receives the ID.

Subsequently, the procedure goes on to a step S105 at which the firmware 20 concatenates the ID received from the personal computer 2 with a service key stored in the EEPROM unit 27 to form data (ID ∥ service_key). Then, a value H is computed by applying the hash function to the data (ID ∥ service_key) as shown in the following equation:

$$H=hash (ID\|service\_key)$$

The procedure then proceeds to a step S106 at which the firmware 20 generates a source side common session key sk. Then, the procedure continues to a step S107 at which the firmware 20 compute an encrypted source side common session key e from the value H generated at the step S105 and the source side common session key sk generated at the step S106 in accordance with the following equation:

$$e=sk(+)pRNG(H)$$

where the notation (+) used on the right hand side of the above equation is the operator of the operation to compute an exclusive logical sum and, thus, an expression A (+) B represents the exclusive logical sum of A and B.

That is to say, at the step S107, the source side common session key sk generated at the step S106 is encrypted to produce the encrypted source side common session key e by finding the exclusive logical sum of each bit of the key sk and the corresponding bit of pRNG (H), a random number obtained by applying the pseudo random number generating function pRNG to the value H generated at the step S105.

Subsequently, the procedure goes on to a step S108 at which the firmware 20 transmits the encrypted source side common session key e generated at the step S107 to the personal computer 2.

The procedure then proceeds to a step S109 at which the personal computer 2 receives the encrypted source side common session key e. Then, the procedure proceeds to a step S110 at which the license manager 62 decrypts the encrypted source side common session key e by using the license keys LK and LK' stored in the EEPROM unit 50 as keys to produce a sink side common session key sk' in accordance with the following equation:

$$sk'=e(+)G(LK') (+)pRNG(LK)$$

That is to say, at the step S110, the encrypted source side common session key e received from the DVD player 1 is decrypted to produce the sink side common session key sk' by finding the exclusive logical sum of the encrypted source side common session key e, G (LK'), a value obtained by applying the confusion function G stored in the EEPROM unit 50 to the license key LK' also stored in the EEPROM unit 50, and pRNG (LK), a value obtained by applying the pseudo random number generating function pRNG also stored in the EEPROM unit 50 to the license key LK also stored in the EEPROM unit 50.

Much like the procedure shown in FIG. 4, the sink side common session key sk' generated by the personal computer 2 at the step S110 has the same value as the source side common session key sk generated by the DVD player 1 at the step S6. The fact that sk=sk' is proven by the following:

$$sk'=e(+)G(LK') (+)pRNG(LK)$$

Substituting (sk (+) pRNG (H)) for e in the expression on the right hand side of the above equation yields the following equation:

$$sk'=sk(+)pRNG(H)(+)G(LK')\,(+)pRNG(LK)$$

Since $G(LK')=G(G^{-1}(R))=R$, the following equation is obtained:

$$sk'=sk(+)pRNG(H)(+)R(+)pRNG(LK)$$

Substituting (pRNG (H) (+) pRNG (LK)) for R in the expression on the right hand side of the above equation yields the following equation:

$$\begin{aligned}sk' &= sk\ (+)\ pRNG\ (H)\ (+)\ pRNG\ (H)\ (+)\ pRNG\ (LK)\ (+)\ pRNG\ (LK)\\ &= sk\end{aligned}$$

As described above, the source and sink side common session keys sk and sk' are a common key S shared by both the DVD player 1 and the personal computer 2 serving as a source and a sink respectively. In addition, unlike the procedures described previously, it is only an author of information who is capable of generating license keys LK and LK'. Thus, an attempt made by a source to illegally generate the license keys LK and LK' will end in a failure. As a result, the security of transmitted information can be further improved.

In the authentication procedures described above, a source authenticates a sink by allowing the sink to generate a sink side common session key sk' having the same value as a source side common session key sk generated by the source only if the sink is a valid sink. The procedure can also be applied for example to authenticate the ordinary operation to load an application program in the personal computer 2 in order to prevent an application program obtained illegally from being executed. In this case, it is necessary to form a judgment as to whether or not execution of each application program is allowed by the author of the program through the same procedure as those described so far whereby the license manager 62 authenticates an application module 61 as shown in FIG. 3. To be more specific, in the authentication procedure shown in FIG. 3, the license manager 62 serves as a source whereas the application module 61 is used as a sink.

After the authentication process described above has been completed, that is, after the sink has generated a sink side common session key sk' having the same value as a source side common session key sk generated by the source, data or a clear text encrypted by the source by using an encryption key is transmitted to the sink from the source. At the sink, the encrypted data or the encrypted text is decrypted back by using a decryption key. As described above, the source and sink side common session keys sk and sk' can be used as encryption and decryption keys respectively as they are or, as an alternative, a random number generated from the session key sk or sk' is used as an encryption or decryption key instead. The operation carried out by the source to encrypt data and the operation carried out by the sink to decrypt the encrypted data are explained as follows.

Figure 10:
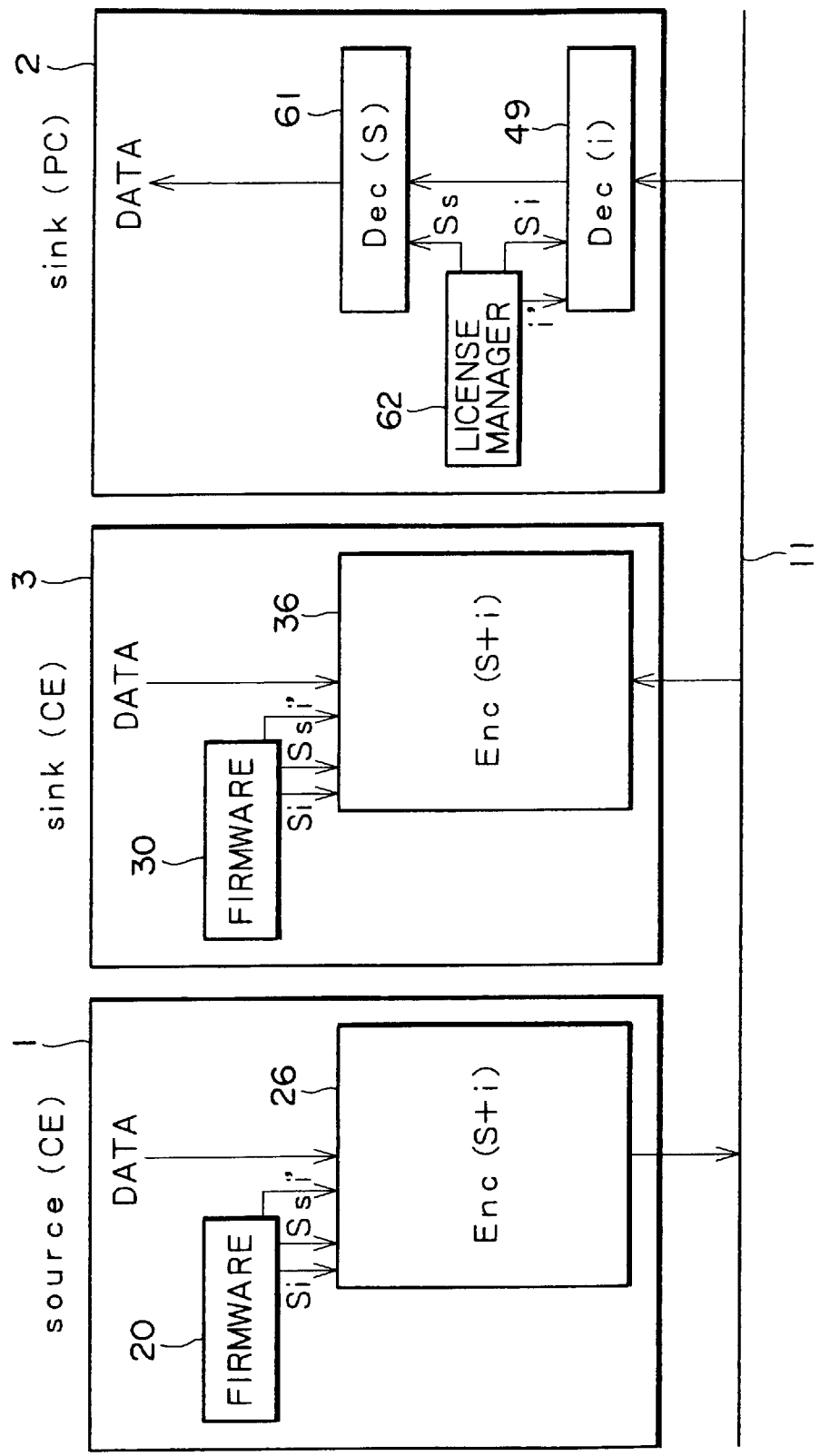
FIG. 10 is a block diagram showing an embodiment implementing an information processing system to which the present invention is applied wherein a source transmits encrypted data to a plurality of sinks.

In an electronic apparatus such as the DVD player 1 and the optical magnetic disc apparatus 3, the internal functions of which are not built in an architecture open to the user, the processing to encrypt and decrypt data transmitted through the 1394 serial bus 11 in a system like one shown in FIG. 10, a block diagram showing a system wherein a source transmits encrypted data to sinks, is carried out by the 1394 interface units 26 and 36 employed in the DVD player 1 and the optical magnetic disc apparatus 3 respectively. Data is encrypted or decrypted by using by using a session key S, that is, the source side common session key sk or the sink side common session key sk' described earlier, and a time variable key i, strictly speaking, a key i' for generating the time variable key i. The session key S and the key i' are supplied by the firmware 20 or 30 to the 1394 interface unit 26 or 36 respectively. The session key S comprises an initial value key Ss used as an initial value and a derangement key Si for deranging the time variable key i. The initial value key Ss and the derangement key Si can be formed respectively from a predetermined number of high order bits and a predetermined number of low order bits of the source side common session key sk or the sink side common session key sk' which has the same value as sk used in the process of authenticating the sink described earlier. The session key S is properly updated in each session, for example, for each movie information or for each playback operation. On the other hand, the time variable key i which is generated from the derangement key Si of the session key S and the key i' is updated a number of times in a session. For example, time information obtained with predetermined timing can be used typically as the key i'.

Assume that movie data played back and output by the DVD player 1 serving as a source is transmitted to the optical magnetic disc apparatus 3 and the personal computer 2 which are used as sinks by way of the 1394 serial bus 11 and is then decrypted by the sinks. In this case, the data is encrypted by the 1394 interface unit 26 employed in the DVD player 1 by using the session key S and the time variable key i, strictly speaking, the key i' and the encrypted data is decrypted back by the 1394 interface unit 36 employed in the optical magnetic disc apparatus 3 by using the session key S and the time variable key i, strictly speaking, the key i'.

In the personal computer 2, on the other hand, the license manager 62 supplies the initial value key Ss of the session key S to the application module 61 and the derangement key Si of the session key S and the time variable key i, strictly speaking, the key i' for generating the time variable key i, to the 1394 interface unit 49 serving as a link unit. In the 1394 interface unit 49, the time variable key i is generated from the derangement key Si and the key i' and used for decrypting the encrypted data. The decrypted data is further decrypted by the application module 61 by using the session key S, strictly speaking, by using the initial value key Ss of the session key S.

As described above, in the personal computer 2 having an architecture wherein the internal bus 51 is designed in an architecture open to the user, the 1394 interface unit 49 carries out only a 1st stage of the decryption on the encrypted data, leaving the data still in an encrypted state. Then, the application module 61 further performs a 2nd stage of the decryption on the data decrypted by the 1394 interface unit 49 to produce the clear text. In this way, the personal computer 2 is prohibited from copying data (that is, a clear text) transferred by way of the internal bus 51 to another medium such as a hard disc mounted on the hard disc drive 47 through the use of a proper function added to the internal bus 51.

As described above, according to the embodiment of the present invention, in a CE apparatus with an architecture wherein an internal bus is not open to the user, encrypted data is decrypted only once by using a session key S and a time variable key i, strictly speaking, a key i'. In the case of a CE apparatus such as the personal computer 2 with an architecture wherein an internal bus is open to the user, on the other hand, encrypted data is decrypted by using a time variable key i, which is generated by using the derangement key Si of a session key S and the key i', at a 1st stage of decryption, and then further decrypted by using the initial value Ss of the session key S at a 2nd stage of decryption. The 1st and 2nd stages of the decryption processing are represented by the following equation:

Dec(Ss, Dec(i, Enc(algo (S+i'), Data)))=Data where the term algo (S+i') appearing on the left hand side of the above equation represents a value resulting from application of a predetermined algorithm to the session key S and the time variable key i, strictly speaking, the key i', the notation Dec appearing at the left end of the equation represents the 2nd stage of the decryption, the other Dec notation denotes the 1st stage of decryption and the notation Enc indicates the encryption carried out by the source.

Figure 11:
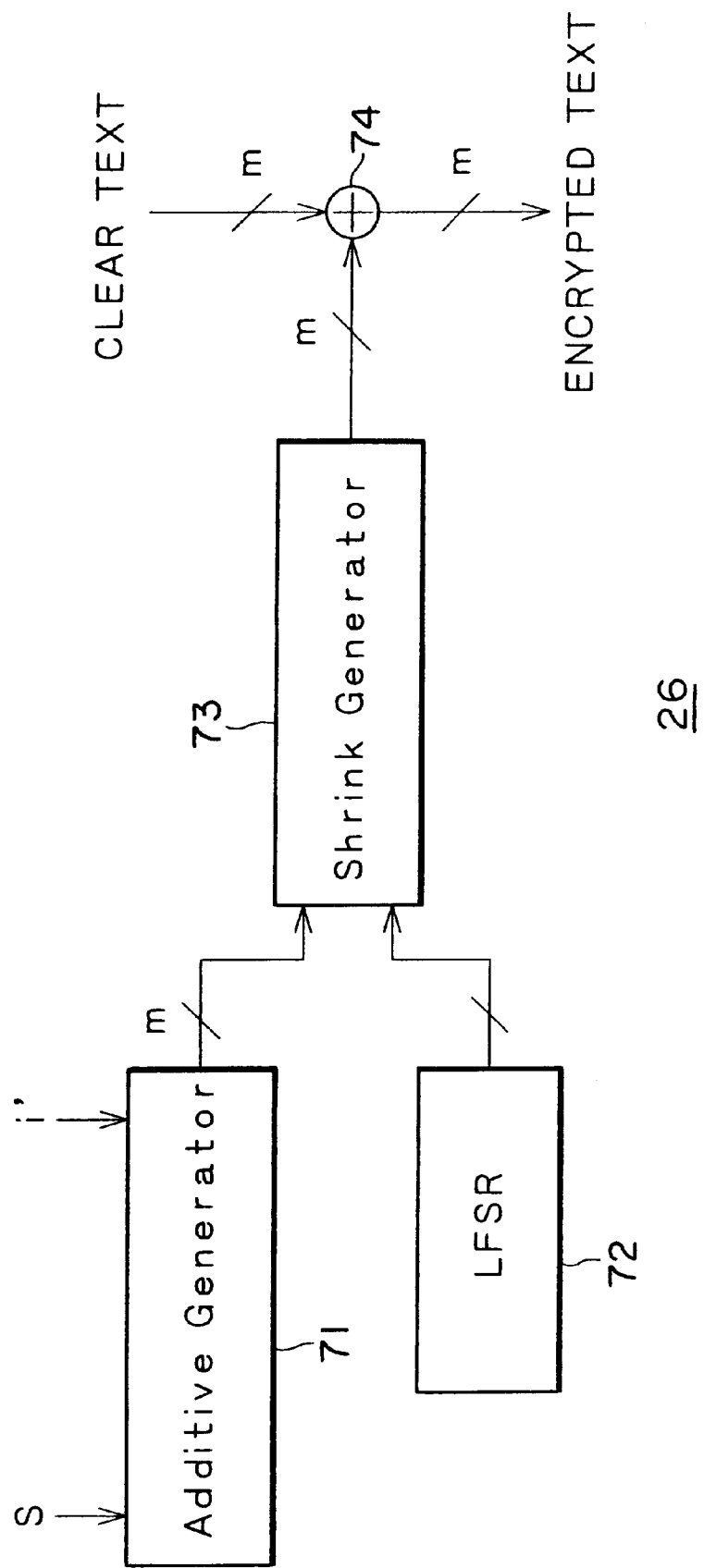
FIG. 11 is a block diagram showing a typical configuration of a 1394 interface unit 26 employed in a DVD player 1 serving as the source in the system shown in FIG. 10.

FIG. 11 is a block diagram showing a typical configuration of the 1394 interface unit 26 that satisfies the term Enc appearing in the equation given above to represent the encryption carried out by the DVD player 1 employing the 1394 interface unit 26. As shown in the figure, the configuration comprises an additive generator 71, an LFSR (Linear Feedback Shift Register) 72, a shrink generator 73 and an adder 74. m-bit data generated by the additive generator 71 and 1-bit data generated by the LFSR are supplied to the shrink generator 73. The shrink generator 73 selects some pieces of m-bit data received from the additive generator 71 in accordance with the value of the 1-bit data supplied by the LFSR 72 and outputs the selected m-bit data to the adder 74 as an encryption key. It should be noted that the m-bit encryption key, a random number generated by the shrink generator 73, corresponds the key (S+i') in the equation given above. The adder 74 adds the m-bit encryption key received from the shrink generator 73 to an input clear text, that is, m-bit data to be transmitted to the 1394 serial bus 11, to produce an encrypted text or encrypted data.

The addition carried out by the adder 74 is a mod 2 ^ m process, where the symbol ^ is the power notation, meaning addition of the encryption key generated by the shrink generator 73 to the clear text. In other words, the process is addition of an m-bit key to m-bit data with a carry-over ignored.

Figure 12:
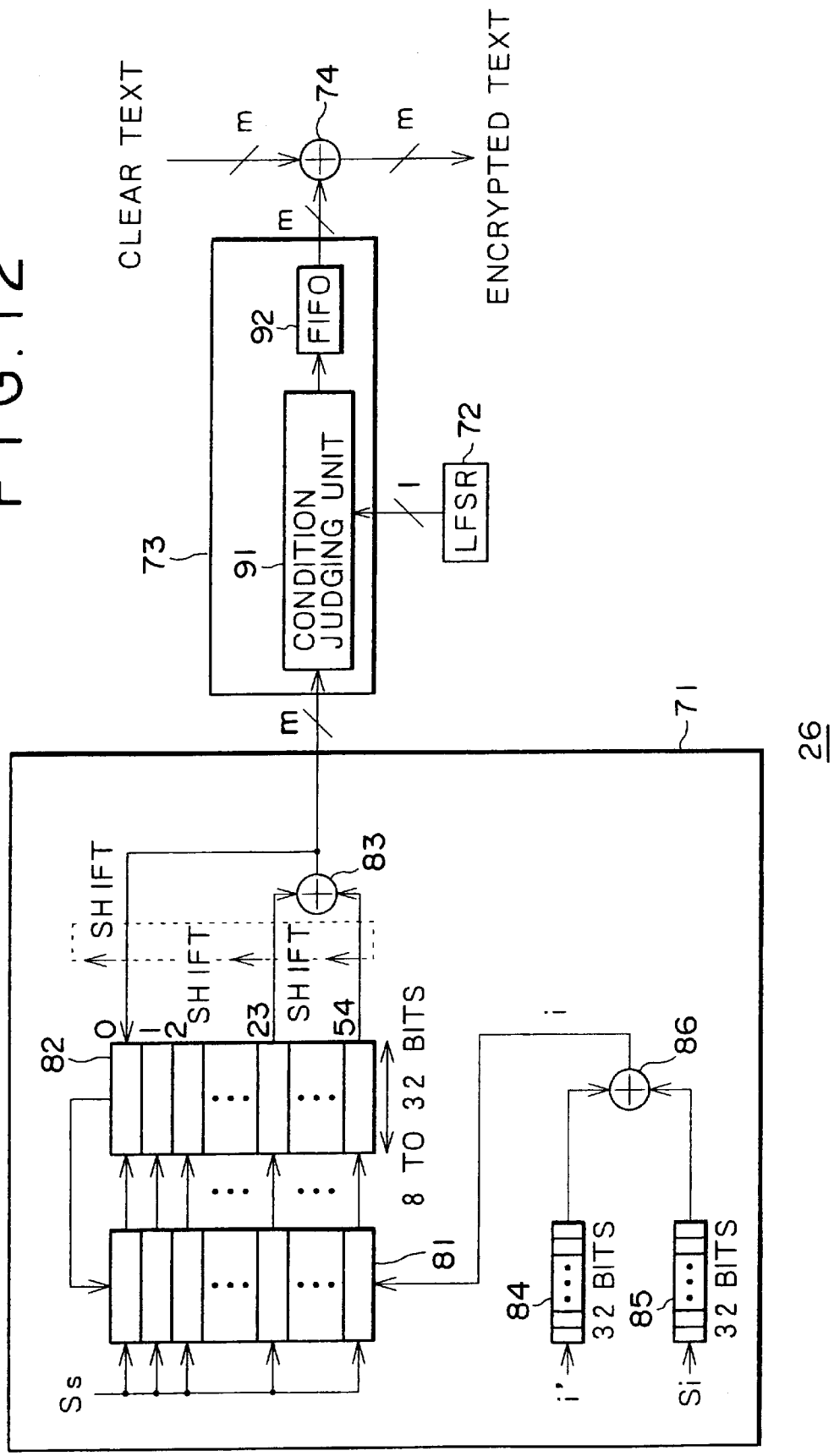
FIG. 12 is a block diagram showing a typical detailed configuration of the 1394 interface unit 26 shown in FIG. 11.

FIG. 12 is a block diagram showing a detailed configuration of the 1394 interface unit 26 which is shown in FIG. 11 in a simple and plain manner. As shown in FIG. 12, the initial value key Ss of the session key S received from the firmware 20 is supplied to and held in a register 82 by way of the adder 81. Typically, the initial value key Ss comprises 55 words each having a length in the range 8 to 32 bits. On the other hand, the derangement key Si of the session key S is held in a register 85. Typically, the derangement key Si is the low order 32 bits of the session key S.

The key i' is held in a 32-bit register 84. The key i' is created in a process of accumulation of bits. To put it in detail, each time a packet is transmitted through the 1394 serial bus 11, typically, two bits used for forming the key i' are supplied to the register 84. The creation of the 32-bit key i' is completed as 16 packets are transmitted. At that time, the 32-bit key i' is added to the derangement key Si held in the register 85 by an adder 86 to finally generate a time variable key i which is supplied to the adder 81. The adder 81 adds the time variable key i output by the adder 86 to the initial value key Ss held in the register 82, storing the result of the addition back in the register 82.

Assume that the number of bits per word in the register 82 is 8. In this case, since the time variable key i output by the adder 86 is 32 bits in width, the time variable key i is divided into 4 portions each comprising 8 bits. Each of the 4 portions is then added to a word in the register 82 at a predetermined address, that is, at one of the addresses 0 to 54.

As described above, the initial value key Ss is held initially in the register 82. Each time 16 packets of an encrypted text are transmitted thereafter, however, the initial value Ss is updated by adding the time variable key i thereto.

An adder 83 selects predetermined two words among the 55 words of the register 82 and adds the selected two words to each other. With timing shown in FIG. 12, words at addresses 23 and 54 are selected by the adder 83. The adder 83 supplies the result of the addition to the shrink generator 73 and a word in the register 82. With the timing shown in FIG. 12, the adder 83 supplies the result of the addition to the word of the register 82 at an address 0 to replace the data currently stored in the word.

At the next timing, the two words selected by the adder 83 are changed from the addresses 54 and 23 to addresses 53 and 22, being shifted in the upward direction shown in the figure by 1 word. By the same token, the destination of the result of the addition output by the adder 83 is also shifted upward. Since there is no word above address 0, however, the destination is changed from the word at address 0 to the word at address 54 at the bottom of the register 82.

It should be noted that, in each of the adders 81, 83 and 86, processing to compute an exclusive logical sum can be carried out instead.

Figure 13:
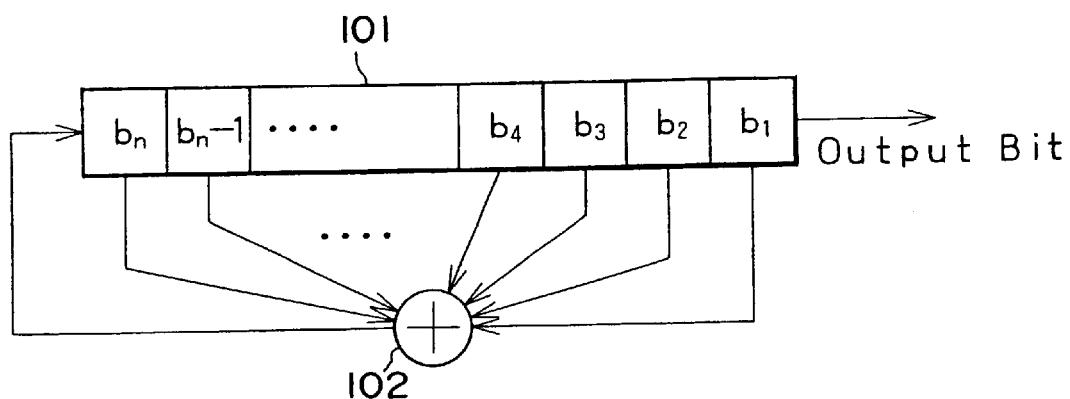
FIG. 13 is a block diagram showing a typical detailed configuration of an LFSR 72 employed in the 1394 interface unit 26 shown in FIG. 12.

FIG. 13 is a block diagram showing a typical configuration of the LFSR 72. As shown in the figure, the LFSR 72 comprises an n-bit shift register 101 and an adder 102 for summing up the values of a predetermined number of bits among the n bits. A bit resulting from the addition by the adder 102 is stored in the left most bit $b_n$ of the n-bit shift register 101 shown in the figure and, at the same time, the previous value of the bit $b_n$ is shifted to a bit $b_{n-1}$ on the right hand side of the bit $b_n$. By the same token, the bit shifting to the right is applied to the previous values of bits $b_{n-1}$, $b_{n-2}$, - - -, etc. whereas the previous value of the right most bit $b_1$ shown in the figure is output. At the next timing, a bit resulting from the addition by the adder 102 is again stored in the left most bit $b_n$ of the n-bit shift register 101 and, at the same time, the previous value of the bit $b_n$ is again shifted to a bit $b_{n-1}$ on the right hand side of the bit $b_n$. By the same token, the bit shifting to the right is gain applied to the previous values of bits $b_{n-1}$, $b_{n-2}$, - - -, etc. whereas the previous value of the right most bit $b_1$ is again output. These operations are carried out repeatedly, sequentially outputting bits from the right most bit $b_1$ one bit after another.

Figure 14:
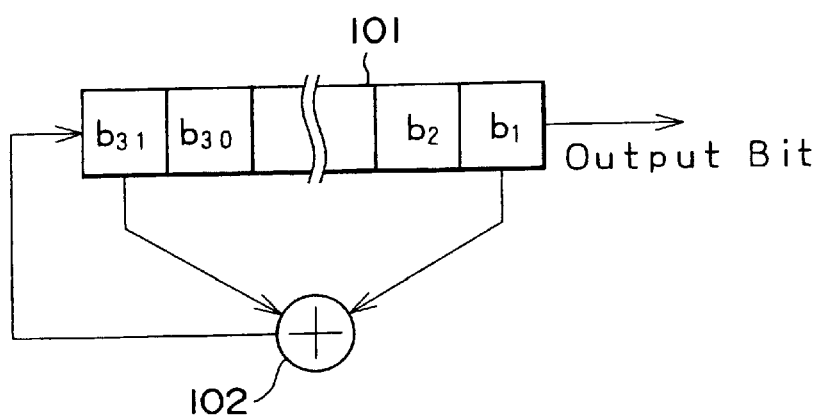
FIG. 14 is a block diagram showing a more concrete configuration of the LFSR 72 shown in FIG. 13.

FIG. 13 is a diagram showing a typical configuration of the LFSR 72 in general terms. On the other hand, FIG. 14 is a diagram showing a typical configuration of the LFSR 72 in more concrete terms. In the configuration shown in FIG. 14, the shift register 101 comprises 31 bits. The adder 102 is used for adding the value of the left most bit $b_{31}$ to the value of the right most bit $b_1$ and storing the result of the addition in the left most bit 31 of the shift register 101.

As shown in FIG. 12, the shrink generator 73 comprises a condition judging unit 91 and a FIFO unit 92. The condition judging unit 91 passes on m-bit data supplied by the adder 83 employed in the additive generator 71 to the FIFO unit 92 to be held therein as it is when the LFSR 72 outputs a bit having the logic value "1". When the LFSR 72 outputs a bit having the logic value "0", on the other hand, the condition judging unit 91 does not pass on m-bit data supplied by the adder 83 employed in the additive generator 71 to the FIFO unit 92, suspending the encryption process. In this way, the condition judging unit 91 employed in the shrink generator 73 selects only pieces of m-bit data which are each generated by the additive generator 71 while the LFSR 72 is outputting a bit with the logic value "1" and stores the selected piece of m-bit data in the FIFO unit 92 of the generator 73.

Each piece of m-bit data held in the FIFO unit 92 is supplied as an encryption key to the adder 74 for generating an encrypted text by adding the encryption key to data representing a clear text to be transmitted to a sink, that is, data played back from a DVD in the source.

The encrypted data is then transmitted from the DVD player 1 to the optical magnetic disc apparatus 3 and the personal computer 2 by way of the 1394 serial bus 11.

Figure 15:
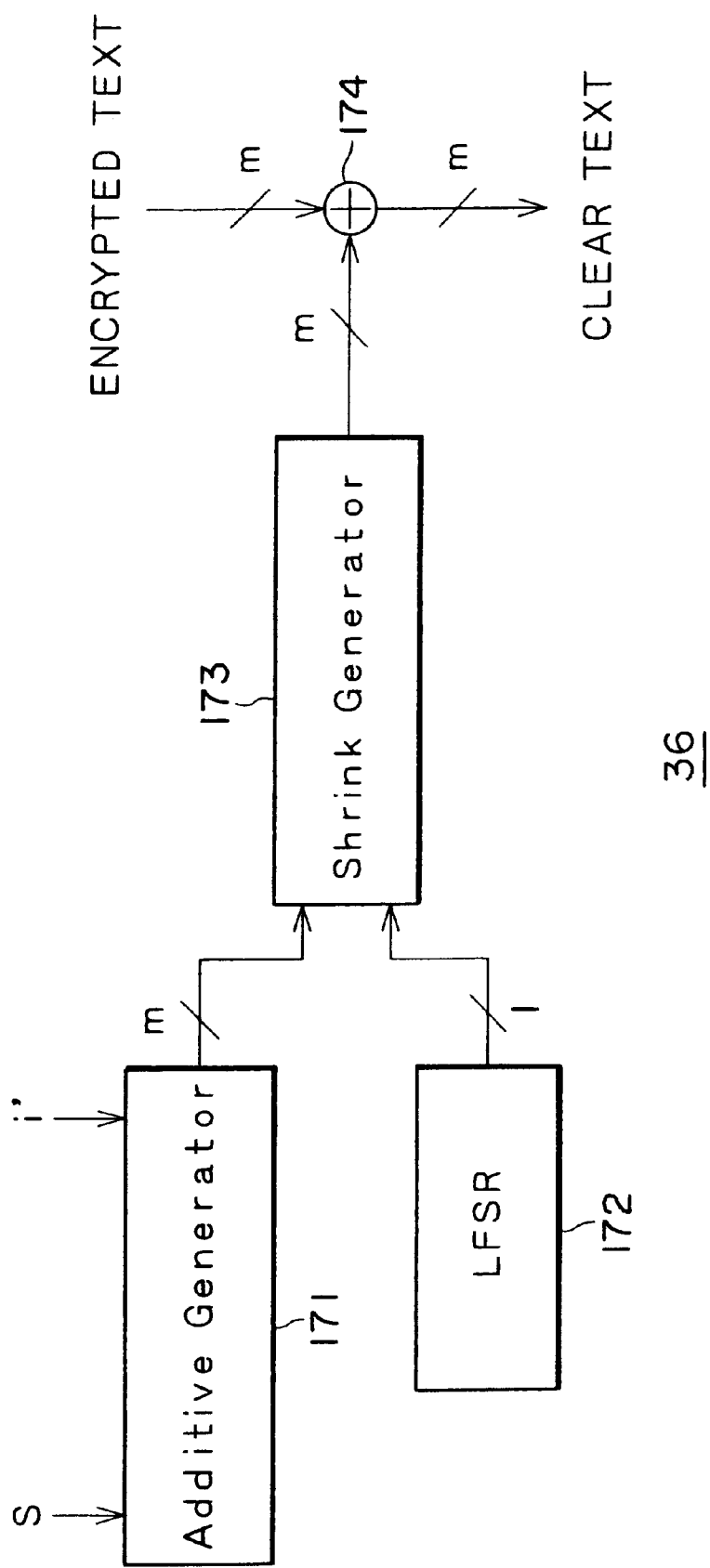
FIG. 15 is a block diagram showing a typical configuration of a 1394 interface unit 36 employed in an optical magnetic disc apparatus 3 serving as a sink in the system shown in FIG. 10.

FIG. 15 is a diagram showing a typical configuration of the 1394 interface unit 36 employed in the optical magnetic disc apparatus 3 for decrypting the encrypted data received from the DVD player 1 by way of the 1394 serial bus 11. As shown in the figure, much like the 1394 interface unit 26 employed in the DVD player 1 shown in FIG. 11, the configuration comprises an additive generator 171, an LFSR (Linear Feedback Shift Register) 172, a shrink generator 173 and a subtractor 174. m-bit data generated by the additive generator 171 and 1-bit data generated by the LFSR 172 are supplied to the shrink generator 173. The shrink generator 173 selects some pieces of m-bit data received from the additive generator 171 in accordance with the value of the 1-bit data supplied by the LFSR 172 and outputs the selected m-bit data to the subtractor 174 as a decryption key. The subtractor 174 subtracts the m-bit decryption key received from the shrink generator 173 from an encrypted text, that is, m-bit data received from the DVD player 1 by way of the 1394 serial bus 11, to decrypt the encrypted text back into the clear text.

It is obvious that the configuration of the 1394 interface unit 36 employed in the DVD player 1 shown in FIG. 15 is basically identical with that of the 1394 interface unit 26 employed in the optical magnetic disc apparatus 3 shown in FIG. 11 except that the subtractor 174 employed by the former is used as a substitute for the adder 74 of the latter.

Figure 16:
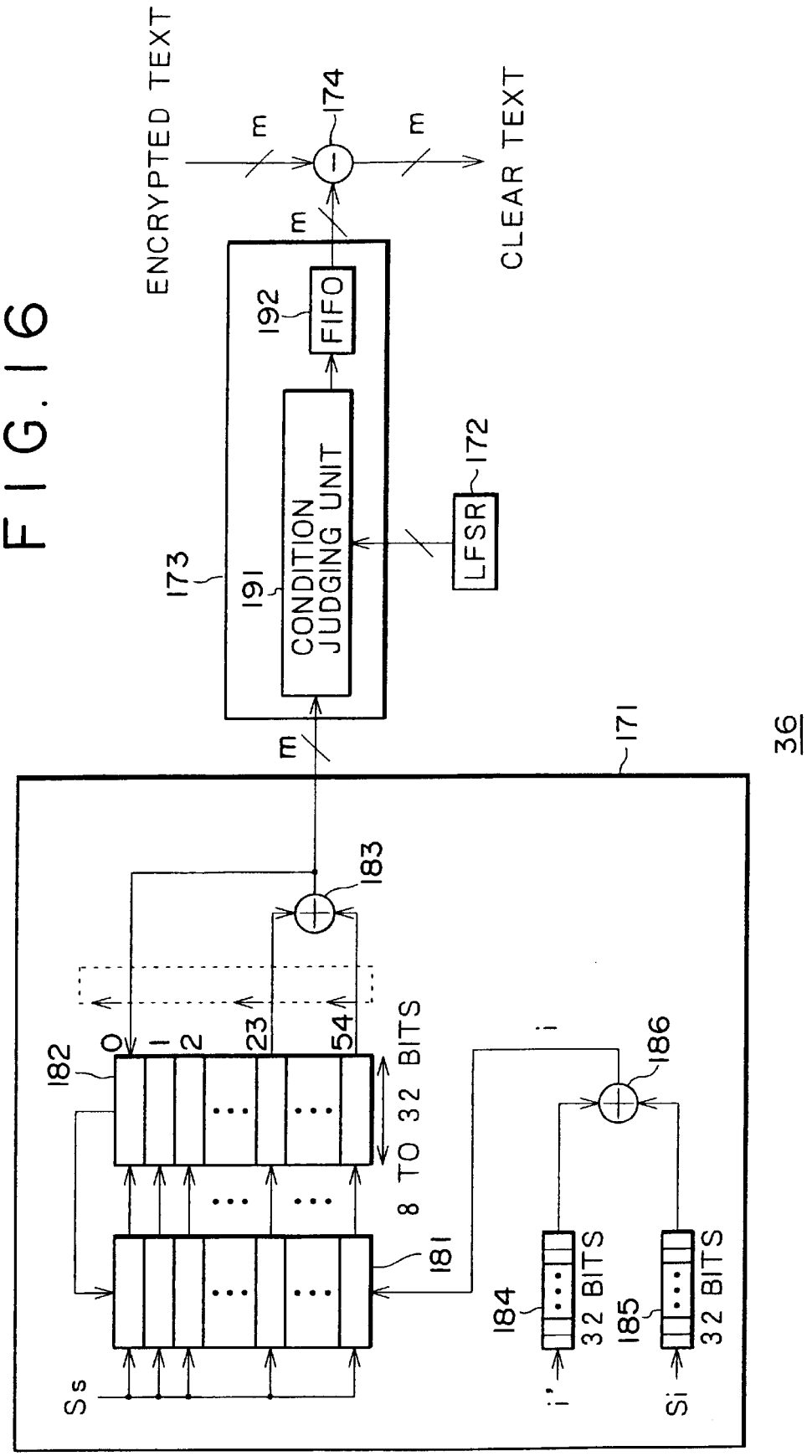
FIG. 16 is a block diagram showing a typical detailed configuration of the 1394 interface unit 36 shown in FIG. 15.

FIG. 16 is a diagram showing a detailed configuration of the 1394 interface unit 36 which is shown in FIG. 15 in a simple and plain manner. It is also obvious that the configuration of the 1394 interface unit 36 employed in the DVD player 1 shown in FIG. 16 is basically identical with that of the 1394 interface unit 26 employed in the optical magnetic disc apparatus 3 shown in FIG. 12 except that the subtractor 174 employed by the former is used as a substitute for the adder 74 of the latter. An additive generator 171, an LFSR 172, a shrink generator 173, an adder 181, a register 182, an adder 183, a register 184, a register 185, an adder 186, a condition judging unit 191 and a FIFO unit 192 employed in the 1394 interface unit 36 of the optical magnetic disc apparatus 3 shown in FIG. 16 correspond to the additive generator 71, the LFSR 72, the shrink generator 73, the adder 81, the register 82, the adder 83, the register 84, the register 85, the adder 86, the condition judging unit 91 and a FIFO unit 92 employed in the 394 interface unit 26 of the DVD player 1 shown in FIG. 12 respectively.

Thus, since the operation of the 1394 interface unit 36 employed in the optical magnetic disc apparatus 3 shown in FIG. 16 is basically the same as that of the 394 interface unit 26 employed in the DVD player 1 shown in FIG. 12, its explanation is not repeated. It should be noted, however, that the former is different from the latter in that, in the case of the former, the subtractor 174 subtracts the m-bit decryption key received from the FIFO unit 192 employed in the shrink generator 173 from an encrypted text, that is, m-bit data received from the DVD player 1 by way of the 1394 serial bus 11, to decrypt the encrypted text into the clear text.

In the 1394 interface unit 36 employed in the optical magnetic disc apparatus 3, encrypted data is decrypted only once by using a session key S, which comprises an initial value key Ss and a derangement key Si, and a time variable key i, strictly speaking, the key i', as described above.

In the case of the personal computer 2, on the other hand, encrypted data is decrypted by the 1394 interface unit 49 using a time variable key i which is generated by the derangement key Si of the session key S and a key i' at a 1st stage of decryption and then further decrypted by the application unit 61 using an initial value key Ss of the session key S at a 2nd stage of decryption.

Figure 17:
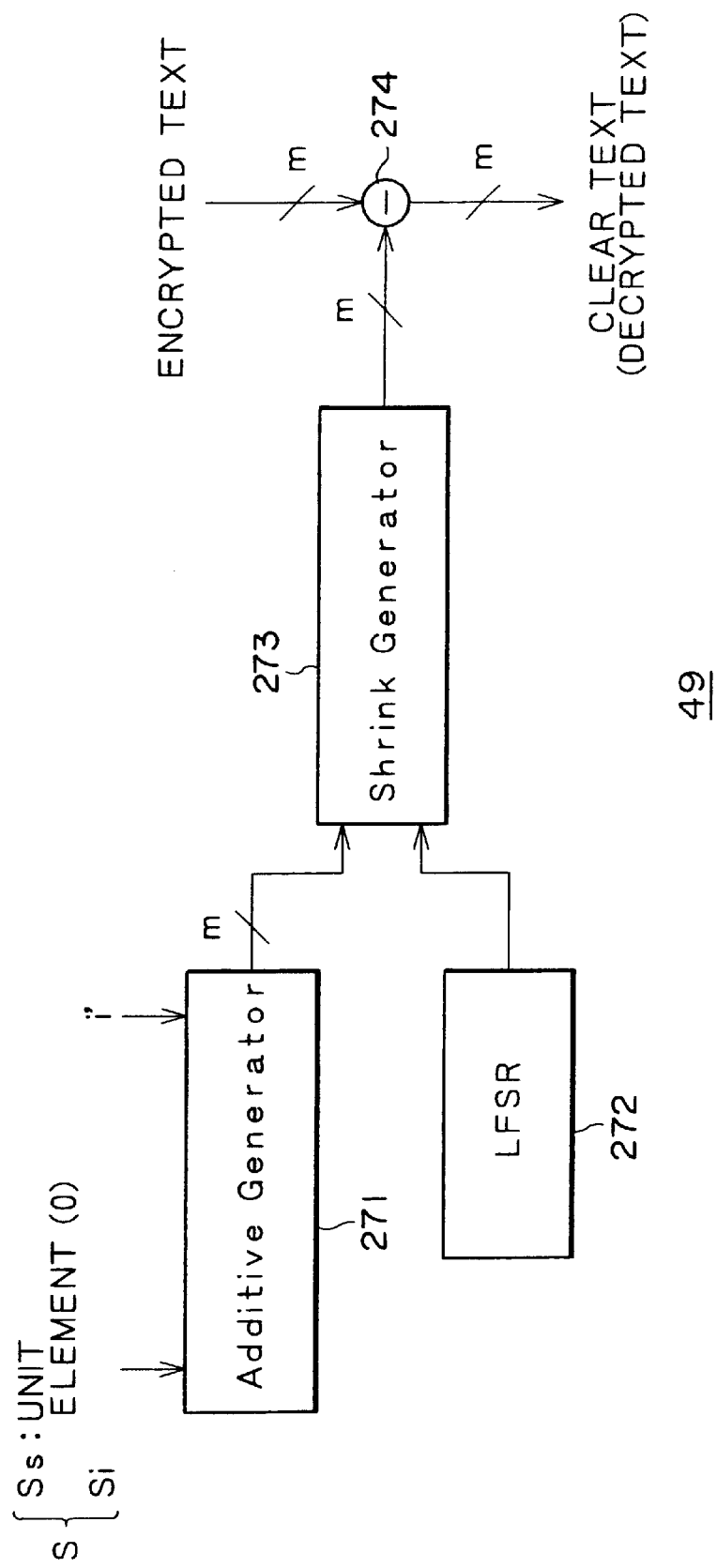
FIG. 17 is a block diagram showing a typical configuration of a 1394 interface unit 49 employed in a personal computer 2 serving as another sink in the system shown in FIG. 10.

FIG. 17 is a diagram showing a typical configuration of the 1394 interface unit 49 employed in the personal computer 2 for decrypting the encrypted data or the encrypted text received from the DVD player 1 by way of the 1394 serial bus 11 by means of hardware. As shown in the figure, much like the 1394 interface unit 36 employed in the optical magnetic disc apparatus 3 shown in FIG. 15 and the 1394 interface unit 26 employed in the DVD player 1 shown in FIG. 11, the configuration comprises an additive generator 271, an LFSR (Linear Feedback Shift Register) 272, a shrink generator 273 and a subtractor 274 which correspond to the additive generator 171, the LFSR (Linear Feedback Shift Register) 172, the shrink generator 173 and the subtractor 174 shown in FIG. 15 respectively. The key i' for generating the time variable key i and the derangement key Si of the session key S for deranging the time variable key i input to the 1394 unit 49 shown in FIG. 17 from the license manager 62 are the same as the key i' and the derangement key Si input to the 1394 interface unit 36 shown in FIG. 15 from the firmware 30. However, all bits of the initial value key Ss of the session key S input to the 1394 unit 49 shown in FIG. 17 are reset to 0.

Figure 18:
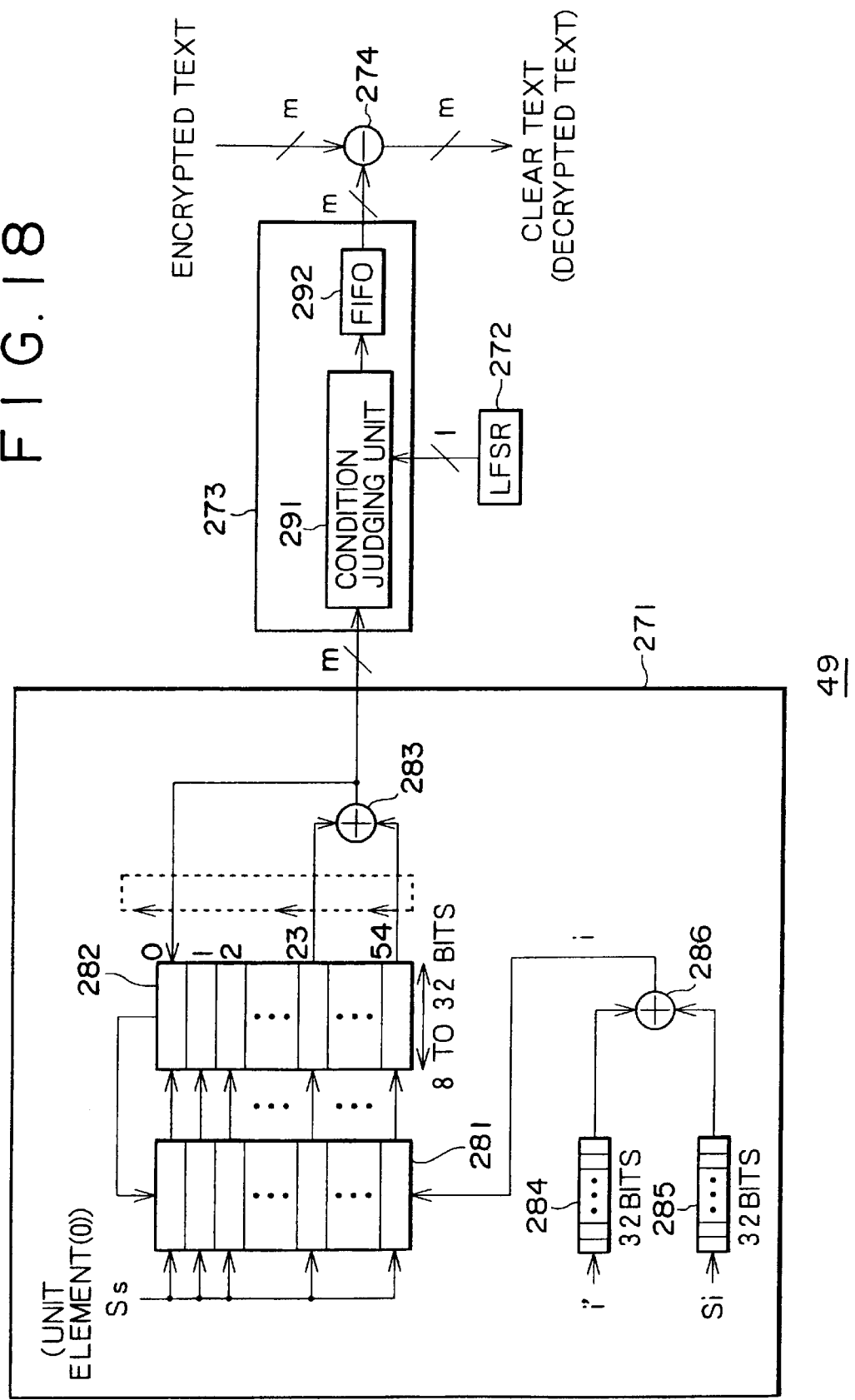
FIG. 18 is a block diagram showing a typical detailed configuration of the 1394 interface unit 49 shown in FIG. 17.

FIG. 18 is a diagram showing a detailed configuration of the 1394 interface unit 49 which is shown in FIG. 17 in a simple and plain manner. It is also obvious that the configuration of the 1394 interface unit 49 employed in the personal computer 2 shown in FIG. 18 is basically identical with that of the 1394 interface unit 26 employed in the DVD player 1 shown in FIG. 12 and the 1394 interface unit 36 employed in the optical magnetic disc apparatus 3 shown in FIG. 16 except that, in the case of the 1394 interface unit 49 shown in FIG. 18, since all bits of the initial value key Ss of the session key S input to the 1394 unit 49 shown in FIG. 17 are reset to 0, in essence, the decryption key is generated only from the time variable key i which is generated from the key i' and the derangement key Si as if the initial value key Ss were not available. As a result, at the subtractor 274, the encrypted data or the encrypted text is decrypted by using only the time variable key i. Since the initial value key Ss has not been used in the decryption yet, a completely clear text has not been obtained yet as a result of the decryption. That is to say, the result of the decryption is still in an encrypted state. Thus, data resulting from the decryption can not be used as it is even if the data is copied from the internal bus 51 to a hard disc mounted on the hard disc drive 47 or another recording medium.

Figure 19:
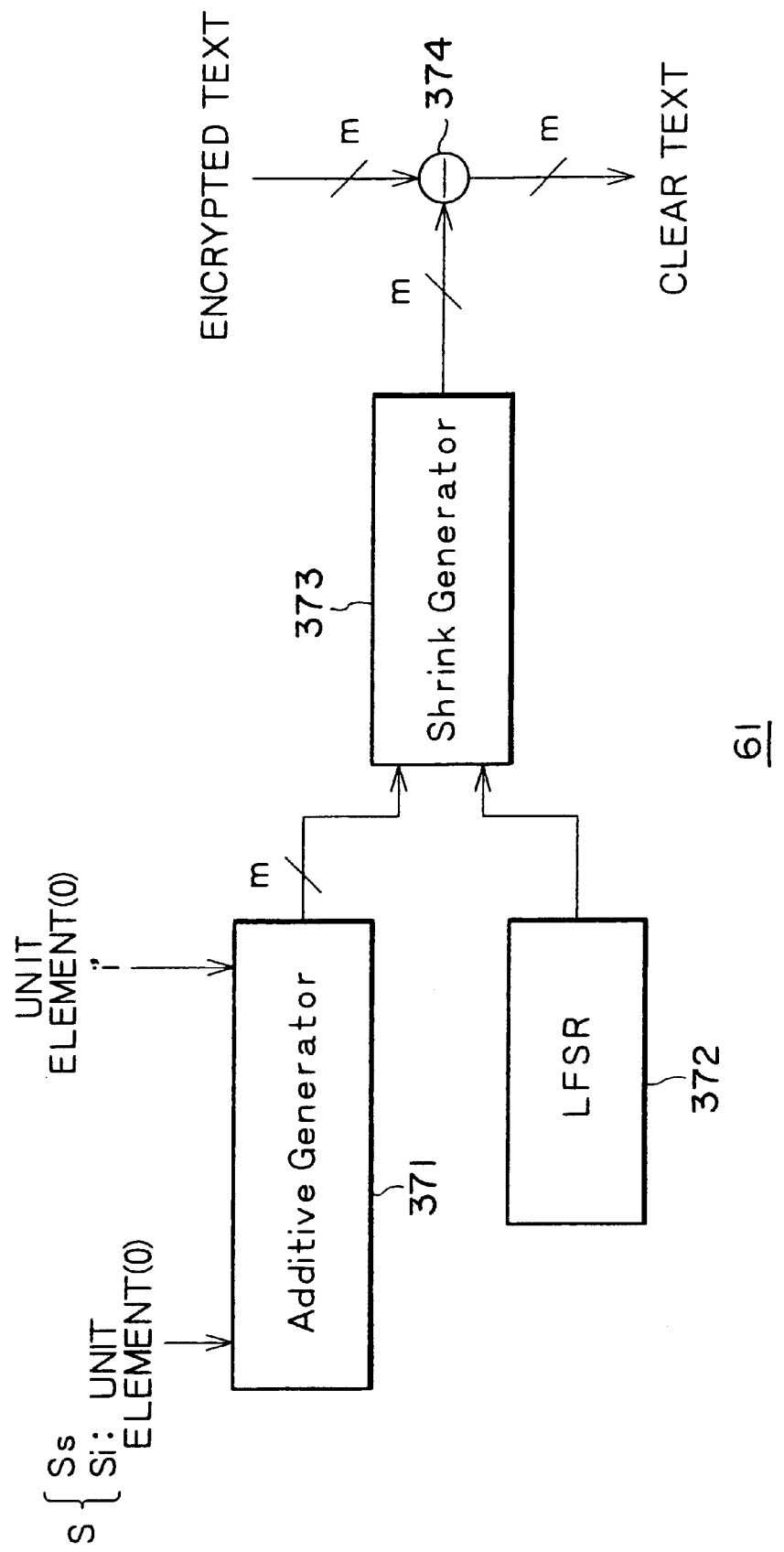
FIG. 19 is a block diagram showing a typical configuration of an application module 61 employed in the personal computer 2 serving as the other sink in the system shown in FIG. 10.

Then, the data or the text decrypted by hardware in the 1349 interface unit 49 by using the time variable key i is further decrypted by software in the application module 61. FIG. 19 is a diagram showing a typical configuration of the application module 61. Basically resembling the 1394 interface unit 26 employed in the DVD player 1 shown in FIG. 11, the 1394 interface unit 36 employed in the optical magnetic disc apparatus 3 shown in FIG. 15 and the 1394 interface unit 49 employed in the personal computer 2 shown in FIG. 17, the application module 61 shown in FIG. 19 comprises an additive generator 371, an LFSR (Linear Feedback Shift Register) 372, a shrink generator 373 and a subtractor 374 which have configurations identical with the additive generator 171, the LFSR (Linear Feedback Shift Register) 172, the shrink generator 173 and the subtractor 174 shown in FIG. 15 respectively.

It should be noted, however, that while the initial value key Ss of the session key S is supplied to the application module 61 as is the case with the 1394 interface unit 26 employed in the DVD player 1 shown in FIG. 11 and the 1394 interface unit 36 employed in the optical magnetic disc apparatus 3 shown in FIG. 15, the derangement key Si of the session key S for deranging the time variable key i and the key i' are each a unit element will all bits thereof reset to 0.

Figure 20:
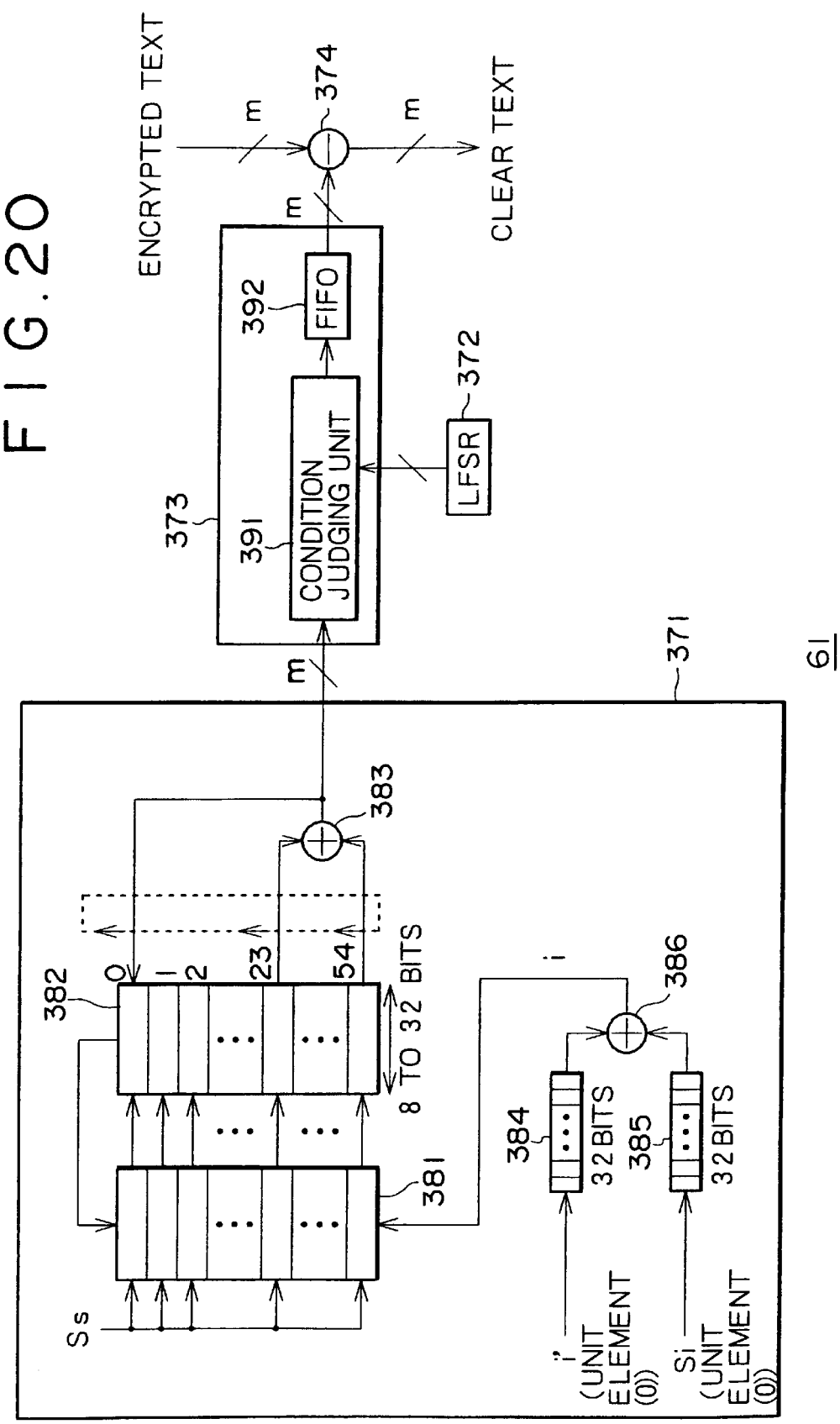
FIG. 20 is a block diagram showing a typical detailed configuration of the application module 61 shown in FIG. 19.

FIG. 20 is a diagram showing a detailed configuration of the application module 61 which is shown in FIG. 19 in a simple and plain manner. It is also obvious that the configuration of the application module 61 is basically identical with that of the 1394 interface unit 26 employed in the DVD player 1 shown in FIG. 12, the 1394 interface unit 36 employed in the optical magnetic disc apparatus 3 shown in FIG. 16 and the 1394 interface unit 49 employed in the personal computer 1 shown in FIG. 18. Components employed in the application module 61 shown in detail in FIG. 20, from the adder 381 employed in the additive generator 371 to the FIFO unit 392 employed in the shrink generator 373, correspond to the components employed in the 1394 interface unit 36 shown in FIG. 16, from the adder 181 employed in the additive generator 171 to the FIFO unit 192 employed in the shrink generator 173 respectively. Since all the bits of the key i' held in a register 384 and the derangement key Si held in a register 385 are 0, however, the bits of the time variable key i generated by the adder 386 are all 0. As a result, the application module 61 in essence operates as if the time variable key i were not present. That is to say, the generation of a decryption key is based only on the initial value key Ss. Then, a subtractor 374 decrypts the encrypted data or by using the decryption key generated in this way to produce a clear text. As described above, the encrypted data is a result of the decryption carried out by the 1394 interface unit 49 based on the time variable key i, which is generated from the key i' and the derangement key Si, at the so called 1st stage of decryption. On the other hand, the decryption carried out by the application module 61 based on the initial value key Ss is called a 2nd stage of decryption for producing a final completely clear text.

When the decryption of the encrypted text described above is completed at the optical magnetic disc 3, the CPU 31 supplies the decrypted data to the drive 35 for recording the data onto an optical magnetic disc.

In the personal computer 2, on the other hand, the CPU 41 supplies the decrypted data resulting from the 1st stage of decryption carried out by the 1394 interface unit 49 typically to the hard disc drive 47 for recording the data by way of the internal bus 51. It should be noted that, in the personal computer 2, a predetermined board can be connected to the input/output interface unit 44 as the expansion board 48 for monitoring data transmitted through the internal bus 51 as described earlier. Nevertheless, it is only the application module 61 that is capable of finally decrypting data transmitted through the internal bus 51. Thus, even if the expansion board 48 is capable of monitoring encrypted data resulting from the decryption carried out by the 1394 interface unit 49 based on the time variable key i, the encrypted data is not the completely clear text because the data has not been decrypted by the application module 61 by using the initial value key Ss of the session key S. As a result, it is possible to prevent a completely clear text from being copied illegally provided that the completely clear text resulting from the final decryption carried out by the application module 61 is never transmitted through the internal bus 51.

Typically, adoption of the Diffie-Hellman technique allows the session key S to be shared by a source and sinks.

It is worth noting that there are cases in which the 1394 interface unit 49 or the application module 61 employed in the personal computer 2 has a relatively low processing power so that it is not capable of carrying out decryption of data. In order to cope with such a problem, either of the initial value key Ss of the session key S and the time variable key i or both can be generated in the source as a unit element. By the same token, by using either or both of the keys as a unit element in the sink, data can virtually be transmitted from the source to the sink without using the initial value key Ss of the session key S and the time variable key i. With such a scheme, however, it is more quite within the bounds of possibility that the data is copied illegally.

If the application module 61 itself is an illegal copy, it is much to be feared that the clear text resulting from decryption carried out by the application module 61 will also be copied illegally. In order to solve this problem, the license manager 62 may authenticate the application module 61 prior to decryption as described earlier.

As a method for authenticating the application module 61, a digital signature based on a disclosed encryption key encryption method can be adopted in addition to the common session key encryption/decryption technique described earlier.

The configurations shown in FIGS. 11, 12 and 15 to 20 satisfy a homomorphism relation. Thai is to say, if keys $K_1$ and $K_2$ are elements of a Galois field G, a group processing result $K_1 \cdot K_2$ of the two elements is also an element of the Galois field G. In addition, with respect to a predetermined function H, the following equation holds true.

$$H(K_1 \cdot K_2) = H(K_1) \cdot H(K_2)$$

Figure 21:
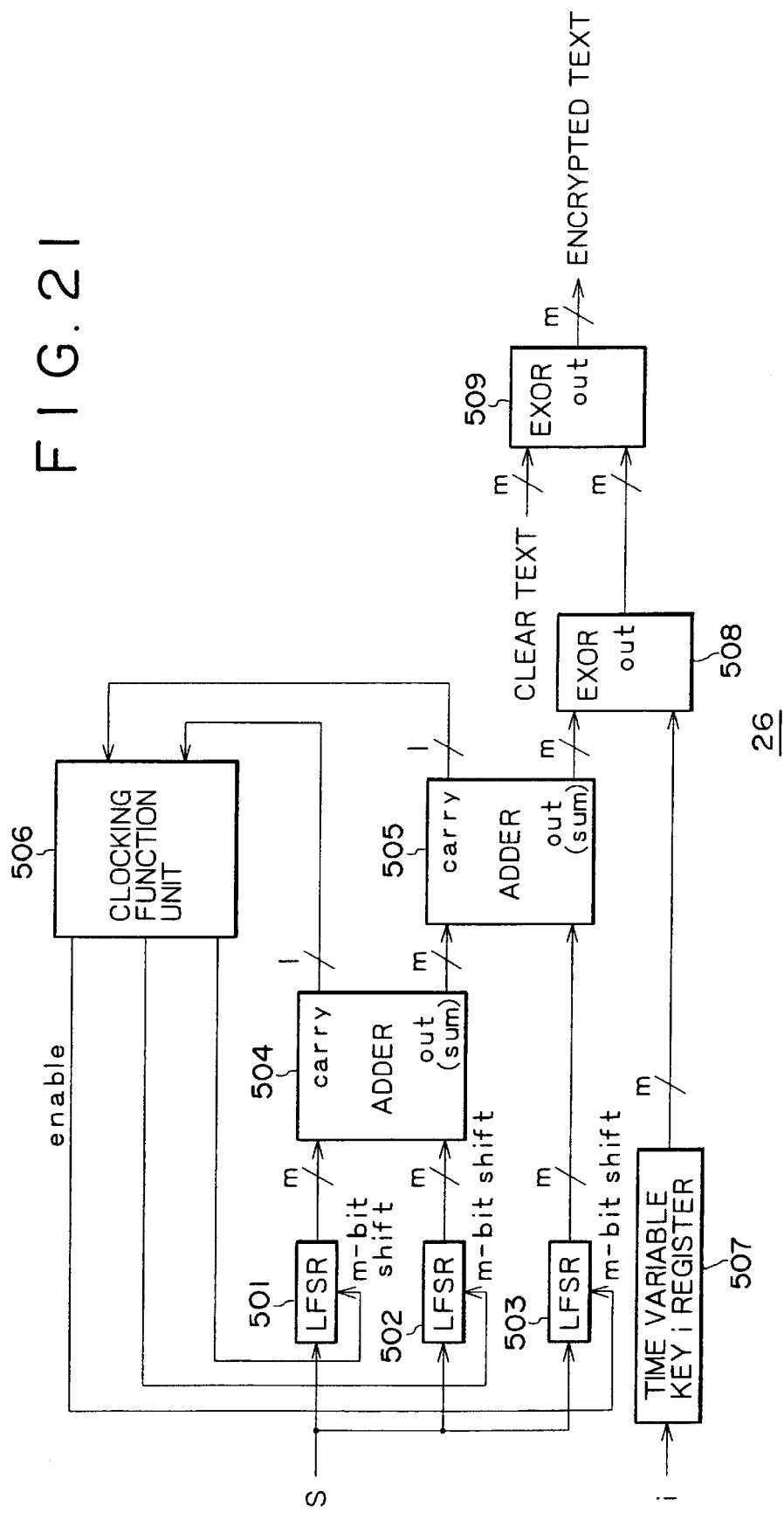
FIG. 21 is a block diagram showing another typical detailed configuration of the 1394 interface unit 26 employed in the DVD player 1 serving as the source in the system shown in FIG. 10.

FIG. 21 is a diagram showing another typical detailed configuration of the 1394 interface unit 26 employed in the DVD player 1. As shown in the figure, the initial value key Ss of the session key S is supplied to LFSRs 501 to 503 to be set therein as initial values. The widths of the LFSRs 501 to 503 are $n_1$ to $n_3$ bits respectively which are of the order of 20 bits. The LFSRs 501 are 503 are designed so that their widths $n_1$ to $n_3$ form an element in conjunction with each other. That is to say, for example, the high order $n_1$ bits, the intermediate order $n_2$ bits and the low order $n_3$ bits of the initial value key Ss of the session key S are set in the LFSRs 501, 502 and 503 respectively each as an initial value.

When an enable signal with the logic value 1 is supplied to the LFSRs 501 to 503 from a clocking function unit 506, the LFSRs 501 to 503 each shift the contents thereof by m bits, outputting m-bit data. The value of m can be set typically at 8, 16, 32 or 40.

The data output by the LFSR 501 is added to the data output by the LFSR 502 by an adder 504. A carry of the result of the addition carried out by the adder 504 is supplied to the clocking function unit 506 and the result of the addition itself is added to the data output by the LFSR 503 by an adder 505. A carry of the result of the addition carried out by the adder 504 is also supplied to the clocking function unit 506 and the result of the addition itself is supplied to an exclusive logical sum computing circuit 508.

The combination of the carries supplied by the adders 504 and 505 to the clocking function unit 506 is either 00, 01, 10 or 11. The clocking function unit 506 outputs data representing one of combinations 000 to 111 to the LFSRs 501 to 503 in accordance with the combination of the carries received from the adders 504 and 505. As described above, when the enable signal with the logic value 1 is supplied to the LFSRs 501 to 503 from the clocking function unit 506, the LFSRs 501 to 503 each shift the contents thereof by m bits, outputting new m-bit data. When the enable signal with the logic value 0 is supplied to the LFSRs 501 to 503 from the clocking function unit 506, on the other hand, the LFSRs 501 to 503 do not shift the contents thereof, outputting the same m-bit data as the data output right before.

The exclusive logical sum computing circuit 508 receives the result of addition carried out by the adder 505 and the time variable key i stored in the register 507, calculating an exclusive logical sum of the inputs. An exclusive logical sum computing circuit 509 calculates another exclusive logical sum of the exclusive logical sum output by the exclusive logical sum computing circuit 508 and an input clear text, outputting the other exclusive logical sum as an encrypted text.

Figure 22:
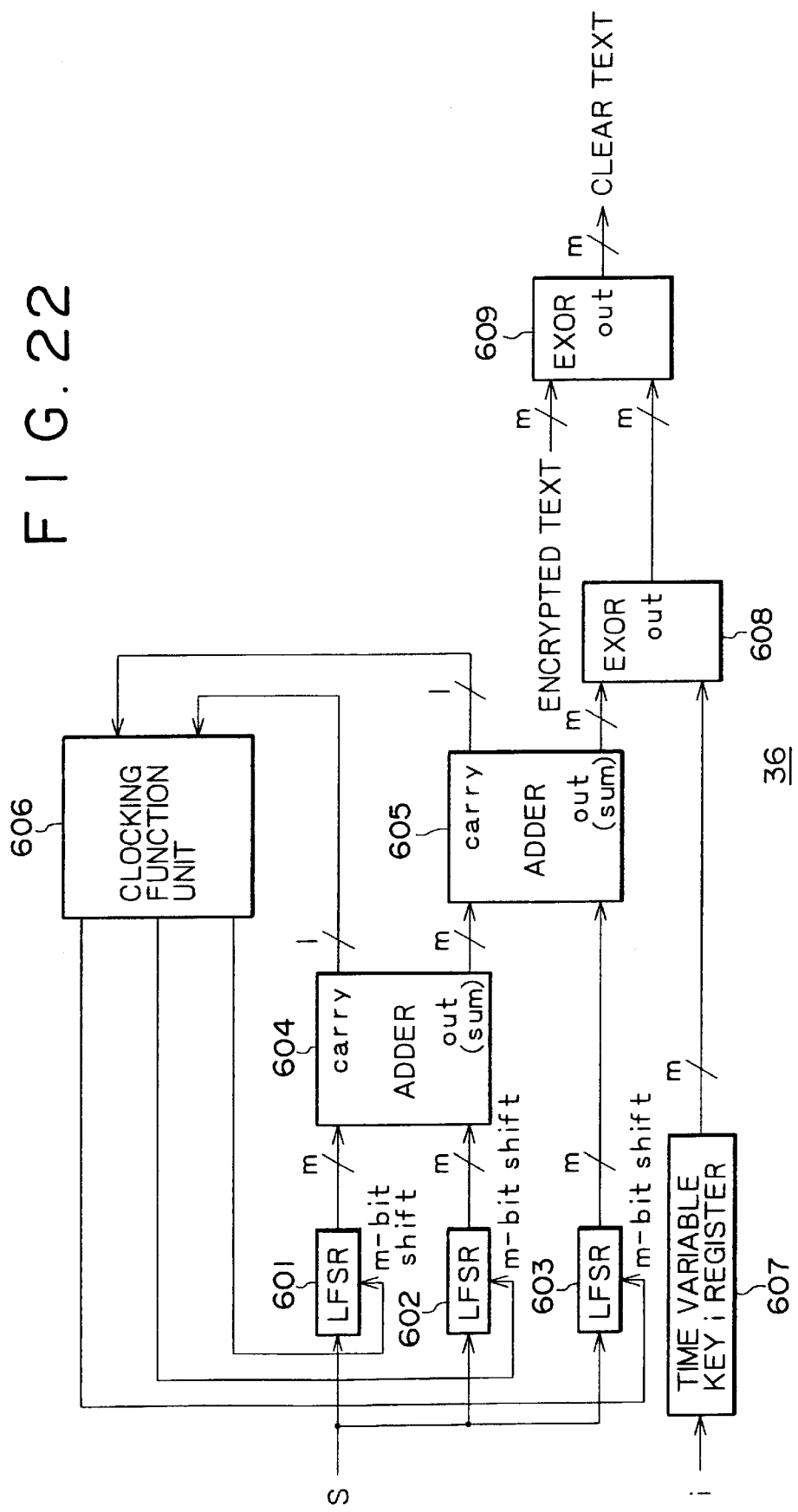
FIG. 22 is a block diagram showing another typical detailed configuration of the 1394 interface unit 36 employed in the optical magnetic disc apparatus 3 serving as the sink in the system shown in FIG. 10.

FIG. 22 is a diagram showing another typical detailed configuration of the 1394 interface unit 36 employed in the optical magnetic disc apparatus 3. As shown in the figure, all components employed in the 1394 interface unit 36, from an LFSR 601 to an exclusive logical sum computing circuit 609, have the same configurations as the corresponding components employed in the 1394 interface unit 26 shown in FIG. 21, from the LFSR 501 to the exclusive logical sum computing circuit 509. Thus, since their operations are basically also the same, the explanation of their operations is not repeated. The only difference between the 1394 interface unit 36 employed in the optical magnetic disc apparatus 3 shown in FIG. 22 and the 1394 interface unit 26 employed in the DVD player 1 shown in FIG. 21 is that the exclusive logical sum computing circuit 609 employed in the former decrypts an encrypted text while the exclusive logical sum computing circuit 509 employed in the latter encrypts a clear text.

Figure 23:
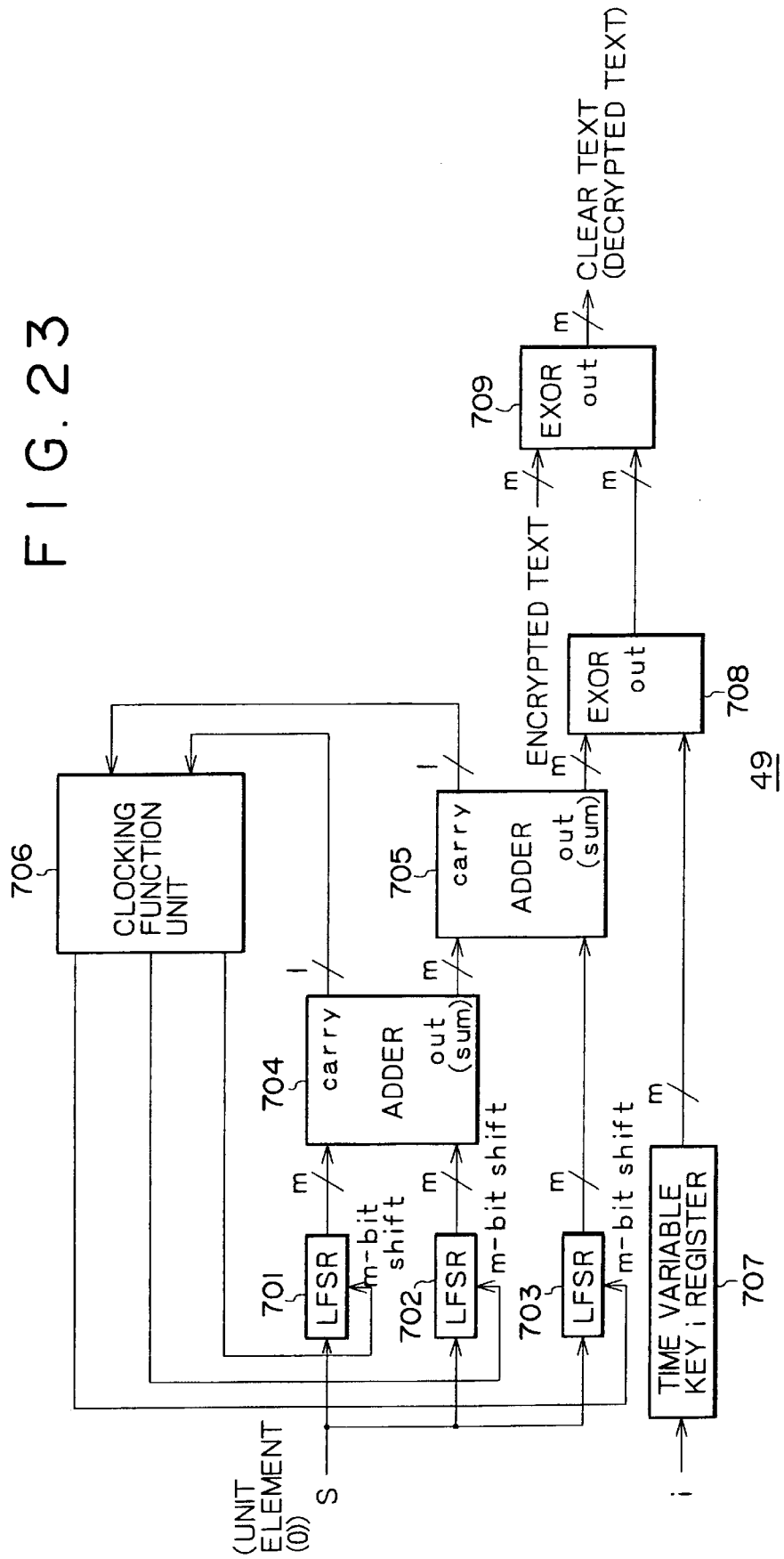
FIG. 23 is a block diagram showing another typical detailed configuration of the 1394 interface unit 49 employed in the personal computer 2 serving as the other sink in the system shown in FIG. 10.

FIG. 23 is a diagram showing another typical detailed configuration of the 1394 interface unit 49 employed in the personal computer 2. As shown in the figure, all components employed in the 1394 interface unit 49, from an LFSR 701 to an exclusive logical sum computing circuit 709, have the same configurations as the corresponding components employed in the 1394 interface unit 36 shown in FIG. 22, from the LFSR 601 to the exclusive logical sum computing circuit 609. The only difference between the 1394 interface unit 36 employed in the optical magnetic disc apparatus 3 shown in FIG. 22 and the 1394 interface unit 49 employed in the personal computer 2 shown in FIG. 23 is that the initial value key Ss of the session key S supplied to the LFSRs 701 to 703 employed in the latter is a unit element will all bits thereof reset to 0. Thus, in the case of the 1394 interface unit 49 employed in the personal computer 2 shown in FIG. 23, the decryption of an encrypted text is in essence based only on the time variable key i in the register 707 which is generated from the key i' and the derangement key Si of the session key S.

Figure 24:
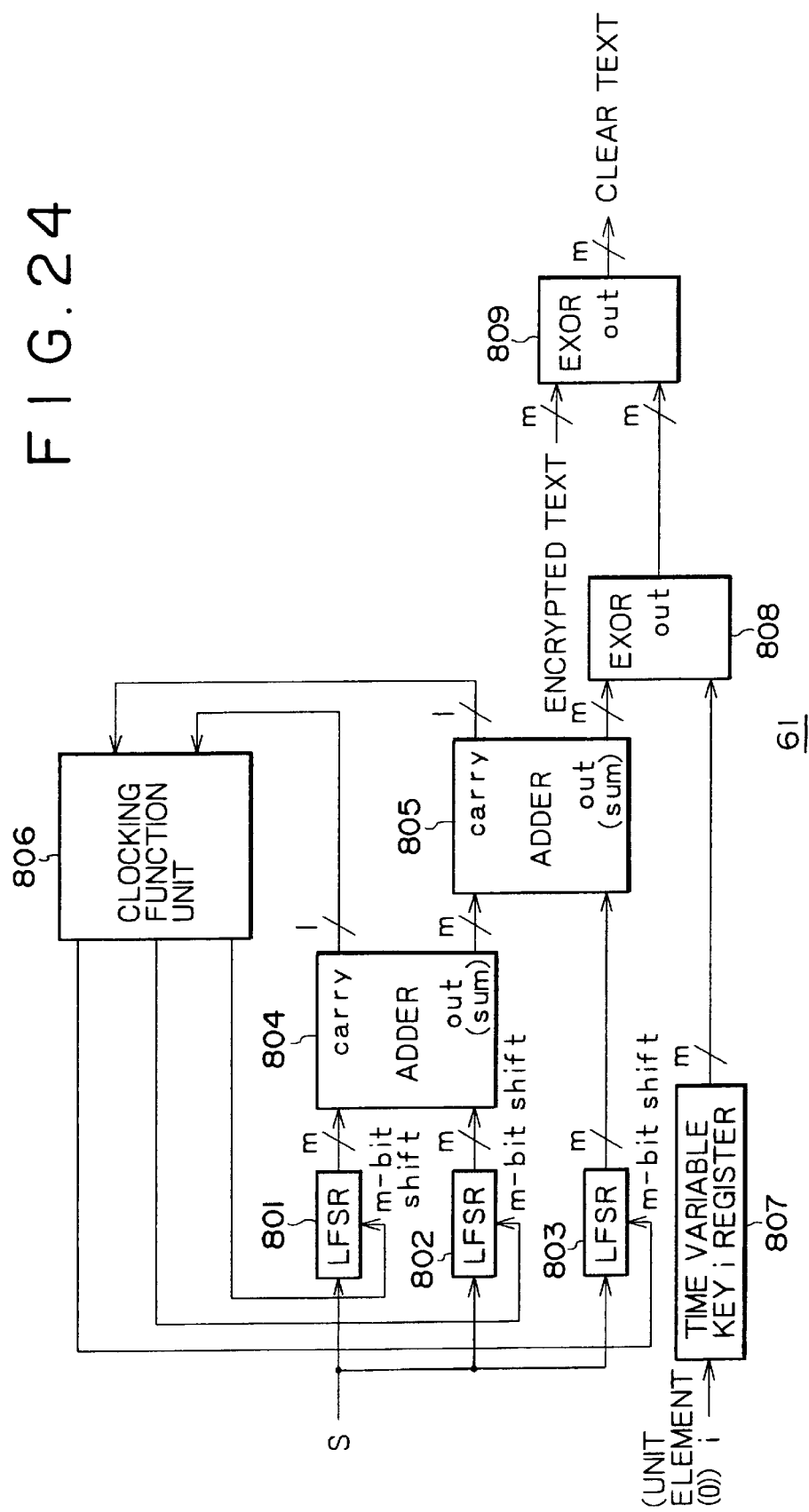
FIG. 24 is a block diagram showing another typical configuration of the application module 61 employed in the personal computer 2 serving as the other sink in the system shown in FIG. 10.

FIG. 24 is a diagram showing another typical detailed configuration of the application module 61 of the personal computer 2. As shown in the figure, all components employed in the application module 61, from an LFSR 801 to an exclusive logical sum computing circuit 809, have the same configurations as the corresponding components employed in the 1394 interface unit 36 shown in FIG. 22, from the LFSR 601 to the exclusive logical sum computing circuit 609. The only difference between the 1394 interface unit 36 employed in the optical magnetic disc apparatus 3 shown in FIG. 22 and the application module 61 of the personal computer 2 shown in FIG. 24 is that the time variable key i supplied to the register 807 employed in the latter is a unit element will all bits thereof reset to 0. Thus, in the case of the application module 61 employed in the personal computer 2 shown in FIG. 24, the decryption of encrypted data is in essence based only on the initial value key Ss of the session key S.

It should be noted that the decryption processing in each of the configurations shown in FIGS. 19, 20 and 24 is carried out by the application module 61 which is typically implemented by software.

By the way, a license key can be changed or updated, if necessary, should the license key be stolen for some reasons by any chance. It is needless to say that a license key can also be changed once a predetermined period of time even if the license key is not stolen should it be quite within the bounds of possibility that the license key is stolen. In this case, the version of a license key representing the term of validity is recorded on a DVD. In the case of the present embodiment, the term of validity of a license key is represented by the number of times the hash function is to be applied to generate the license key. If an information receiving apparatus for receiving information transmitted through a satellite instead of information played back from a DVD player is an object being operated, only information of a valid version is transmitted to the information receiving apparatus by way of the satellite.

Figure 25:
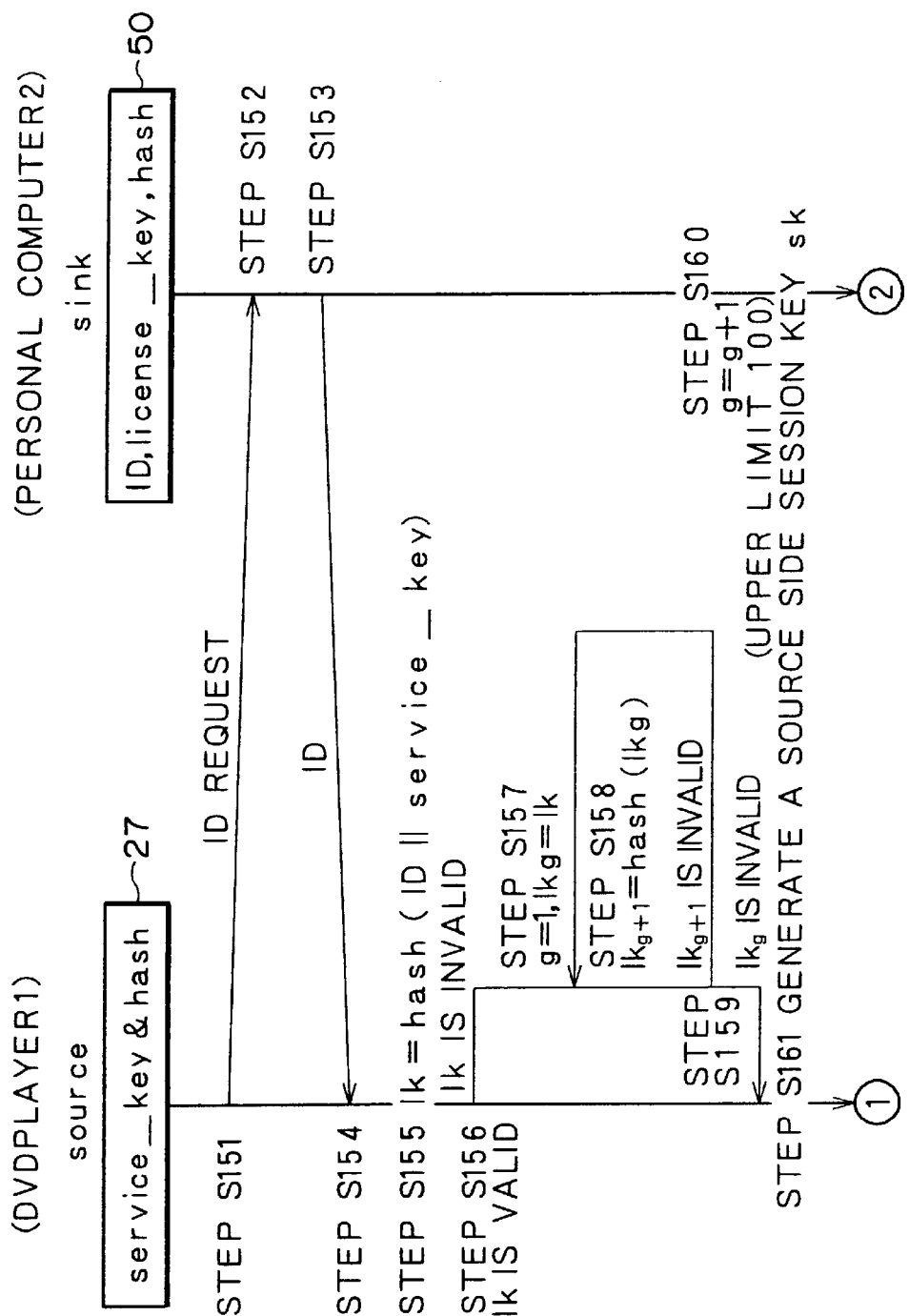
FIG. 25 is a diagram showing a still further embodiment implementing the authentication procedure.
Figure 26:
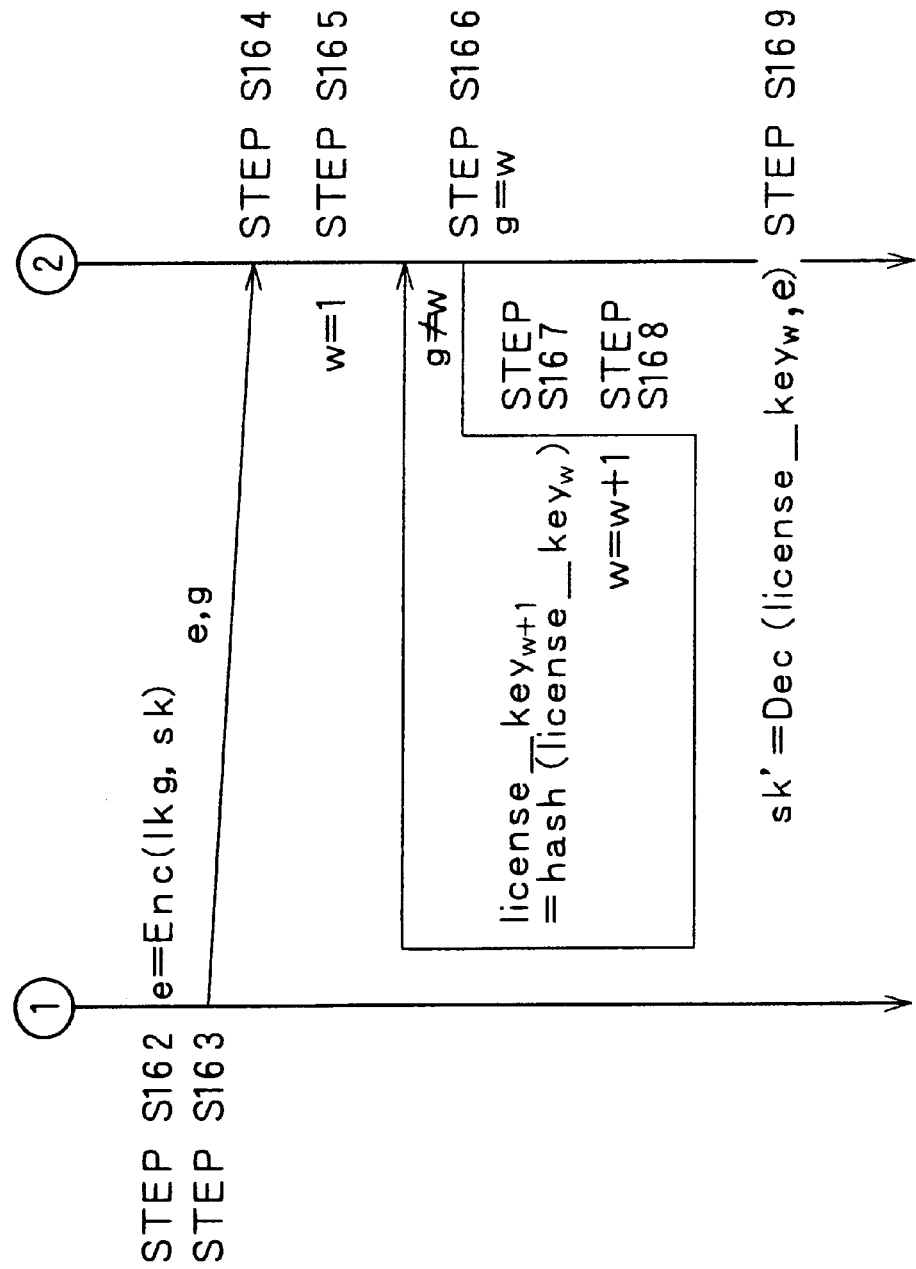
FIG. 26 is a diagram showing a continuation procedure to the authentication procedure shown in FIG. 25.

FIGS. 25 and 26 are diagrams showing an embodiment implementing a procedure for generating a source side common session key sk in the DVD player 1 and a sink side common session key sk' in the personal computer 2 by using an updated license key. It should be noted that, in addition to the fact that various pieces of information are stored in the EEPROM unit 27 employed in the DVD player 1 and the EEPROM unit 50 employed in the personal computer 2 of the embodiment shown in FIG. 4, the hash function is also stored not only in the EEPROM unit 26, but also in the EEPROM unit 50 in the case of the present embodiment.

As shown in FIG. 25, the procedure begins with a step S151 at which the DVD player 1 serving as a source makes a request to the personal computer 2 serving as a sink for the ID thereof. Then, the procedure goes on to a step S152 at which the personal computer 2 receives the request for the ID. The procedure then proceeds to a step S153 at which the personal computer 2 transmits the ID to the DVD player 1. Then, the procedure continues to a step S154 at which the DVD player 1 receives the ID.

Subsequently, the procedure goes on to a step S155 at which the DVD player 1 concatenates the ID received from the personal computer 2 with a service key stored in the EEPROM unit 27 to form data (ID ∥ service_key). Then, a license key lk is computed by applying the hash function to the data (ID ∥ service_key) as shown in the following equation:

$$lk = \text{hash (ID∥service\_key)}$$

The pieces of processing performed at the steps S151 to S155 as described above are the same as those carried out at the steps S1 to S5 of the procedure shown in FIG. 4.

The procedure then goes on to a step S156 at which the DVD player 1 forms a judgment as to whether or not the license key lk generated at the step S155 has a valid version, that is, whether or not the license key lk has been generated by applying the hash function a number of times equal to a predetermined value recorded on the DVD. As described above, the present valid version of a license key lk is recorded as the predetermined value representing the number of times the hash function is to be applied to generate the license key lk. Assume that the predetermined value recorded on the DVD is greater than one. Since the number of times the hash function has been applied to generate the license key lk at the step S155 is 1, the license key lk is judged to be invalid. In this case the procedure proceeds to a step S157 at which the DVD player 1 initializes a variable g indicating the number of times the hash function has been applied to generate the license key lk at 1 and stores the generated license key lk in a variable $lk_g$. Then, the procedure continues to a step S158 at which the hash function is applied to the contents of the variable $lk_g$ to find a new license key $lk_{g+1}$ according to the following equation:

$$lk_{g+1} = \text{hash } (lk_g)$$

Subsequently, the procedure goes on to a step S159 to form a judgment as to whether or not the license key $lk_{g+1}$ generated at the step S158 has a valid version. If the license key $lk_{g+1}$ does not have a valid version, that is, if the variable g has not reached the predetermined value in the case of the present embodiment, the procedure proceeds to a step S160 at which the DVD player 1 increments the value of the variable g by 1 and stores $lk_{g+1}$ in the variable $lk_g$. The procedure then returns to the step S158 at which the hash function is again applied to the contents of the variable $lk_g$.

The steps S158 and S159 are executed repeatedly till the value of the variable g, that is, the number of times the hash function has been applied to generate the license key, reaches the predetermined value recorded on the DVD as a version of the license key.

It should be noted that the predetermined value serving as an upper limit of the number of times the hash function can be applied to generate the license key is set typically at 100.

If the outcome of the judgment formed at the step S159 indicates that the number of times the hash function has been applied to generate the license key has reached the predetermined value recorded on the DVD as a version of the license key, that is, if the outcome of the judgment indicates that a valid license key $lk_{g+1}$ has been obtained at the step S158, or if the outcome of the judgment formed at the step S156 indicates that the license key lk generated at the step S155 is valid, that is, if the number of times the hash function is to be applied to generate the license key is 1, on the other hand, the procedure proceeds to a step S161 at which the DVD player 1 generates a source side common session key sk in the same way as the procedure of FIG. 4 described earlier.

Then, the procedure continues to a step S162 at which the DVD player 1 encrypts the source side common session key sk generated at the step S161 by using the license key $lk_g$ computed at the step S155 or S158 as a key to produce an encrypted source side common session key e in accordance with the following equation:

$$e = Enc(lk_g, sk)$$

Subsequently, the procedure goes on to a step S163 at which the DVD player 1 transmits the encrypted source side common session key e generated at the step S162 along with the value of the variable g indicating the number of times the hash function has been applied to generate the license key $lk_g$ to the personal computer 2. The procedure then proceeds to a step S164 at which the personal computer 2 receives the encrypted source side common session key e and the value of the variable g. Then, the procedure proceeds to a step S165 at which the personal computer 2 initializes a variable w representing the number of times the hash function has been applied to generate a license key in the personal computer 2 at 1. The procedure then continues to a step S166 to form a judgment as to whether or not the value of the variable g received at the step S164 is equal to the value of the variable w set at the step S165. If they are not equal to each other, the procedure goes on to a step S167 at which the hash function stored in the EEPROM unit 50 employed in the personal computer 2 is applied to license_$\text{key}_w$, the license key also stored in the EEPROM unit 50, to generate license_$\text{key}_{w+1}$, a new license key in accordance with the following equation:

$$\text{license\_key}_{w+1} = \text{hash (license\_key}_w)$$

Then, the procedure continues to a step S168 at which the personal computer 2 increments the variable w by 1 and substitutes license_$\text{key}_{w+1}$ for license_$\text{key}_w$. The procedure then returns to the step S166 to again form a judgment as to whether or not the value of the variable g is equal to the value of the variable w. The steps S166 to S168 are executed repeatedly till the value of the variable w representing the number of times the hash function has been applied to generate the license key becomes equal to the value of the variable g.

If the outcome of the judgment formed at the step S166 indicates the value of the variable w is equal to the value of the variable g, that is, if currently valid license_$\text{key}_w$ has been obtained, the procedure goes on to a step S169 at which the personal computer 2 decrypts the encrypted source side common session key e to produce a sink side common session key sk' in accordance with the following equation:

$$sk' = Dec(\text{license\_key}_w, e)$$

By appropriately repeating the application of the hash function to generate the license key as described above, the information security can be further enhanced.

Figure 27:
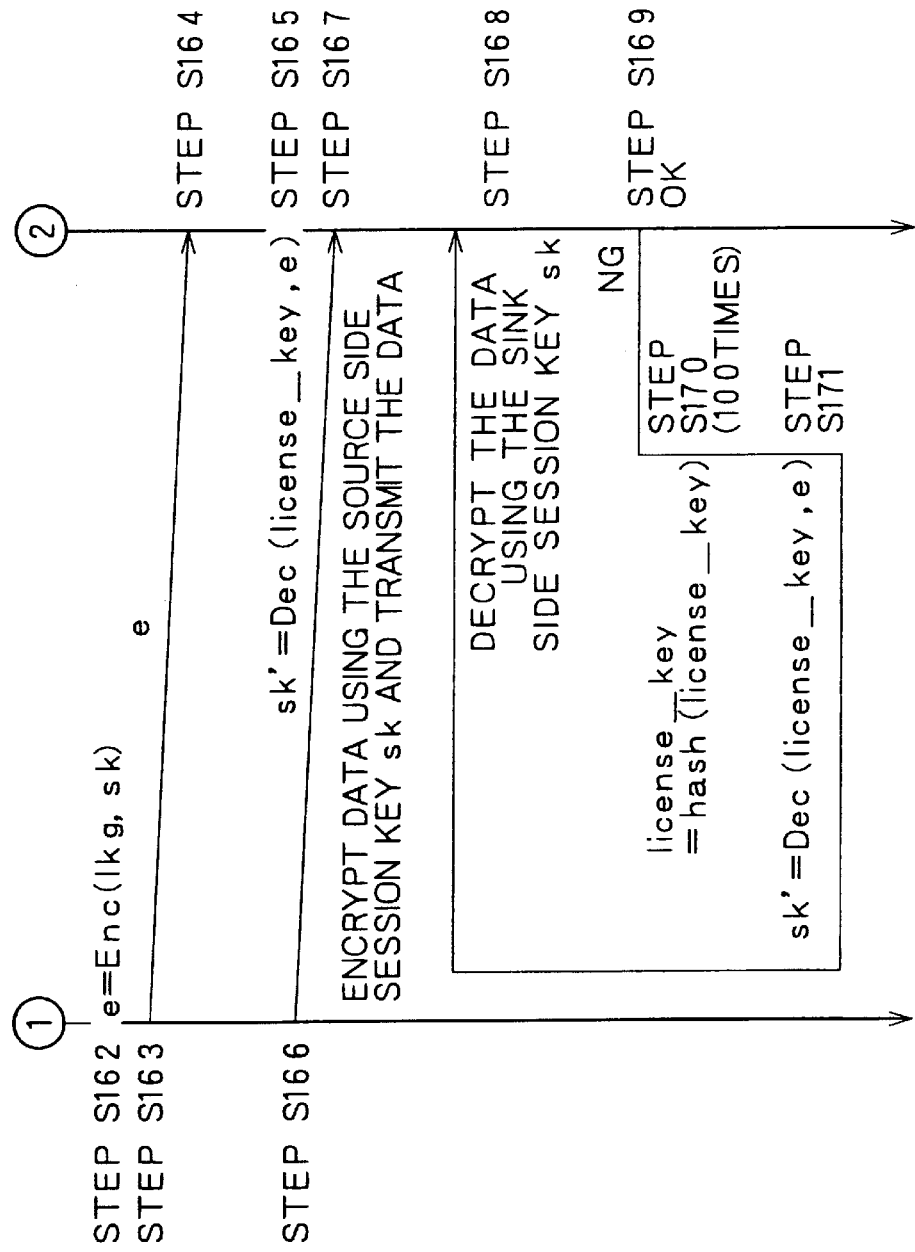
FIG. 27 is a diagram showing an alternative continuation procedure to the authentication procedure shown in FIG. 25.

According to the procedure shown in FIGS. 25 and 26, the value of the variable g representing the version of a license key is transmitted by the source to the sink. It should be noted, however, that the application of the hash function to generate the license key can be repeated as many times as is required without the need to transmit the version as is the case with an embodiment implementing a procedure shown in FIG. 25 and continued to FIG. 27 instead of FIG. 26.

That is to say, in the case of this embodiment, only the encrypted source side common session key e is transmitted by the DVD player 1 to the personal computer 2 at the step S163. At that time, the value of the variable g representing the version of a license key is not transmitted. The procedure then proceeds to a step S164 at which the personal computer 2 receives the encrypted source side common session key e. Then, the procedure goes on to a step S165 at which the personal computer 2 decrypts the encrypted source side common session key e to produce a sink side common session key sk' using the license_key stored in the EEPROM unit 50 in accordance with the following equation:

$$sk'32\ Dec(\text{license\_key}, e)$$

In the mean time, at a step S166, the DVD player 1 encrypts data to be transmitted to the personal computer 2 by using, among other keys, the source side common session key sk generated at the step S161 and transmits the encrypted data to the computer 2. The procedure then goes on to a step S167 at which the personal computer 2 receives the encrypted data and then to a step S168 to decrypt the encrypted data by using, among other keys, the sink side common session key sk' generated at the step S165. Then, the procedure proceeds to a step S169 at which the personal computer 2 forms a judgment as to whether or not data resulting from the decryption carried out at the step S168 is correct. For example, data received as a TS (Transport Stream) packet of the MPEG system has a code for synchronization with a hexadecimal value of 47 in the head of the packet. In this case, the judgment as to whether or not data is correct can be formed by checking whether or not the synchronization code is perfect.

If correct decrypted data was not resulted in at the step S168, the procedure goes on to a step S170 at which the personal computer 2 updates the license key in accordance with the following equation:

license_key=hash (license_key)

Then, the procedure proceeds to a step S171 at which the personal computer 2 again decrypts the encrypted source side common session key e received at the step S164 to produce a new sink side common session key sk' using the updated license key generated at the step S170 in accordance with the following equation:

sk'=Dec(license_key, e)

Subsequently, the procedure returns to the step S168 to again decrypt the encrypted data received at the step S167 by using, among other keys, the sink side common session key sk' generated at the step S171. Then, the procedure proceeds to a step S169 at which the personal computer 2 forms a judgment as to whether or not data resulting from the decryption carried out at the step S168 is correct. As such, the steps S170, S171, S168 and S169 are executed repeatedly till the outcome of the judgment formed at the step S169 indicates that correct decrypted data was obtained at the step S168.

In this way, the license key is updated to produce correct encrypted data.

As indicated by the procedure described above, in the source, the source side common session key sk has to be generated before data to be transmitted to the sink is encrypted by using the source side common session key sk. In the sink, on the other hand, the decryption of the encrypted data received from the source needs to be synchronized with the decryption of the encrypted source side common session key e received from the source. To be more specific, the procedure on the sink side can not go on from the step S165 to decrypt the encrypted source side common session key e to the step S168 to decrypt the decrypted data till the step S167 to receive the encrypted data is completed.

In addition, the decryption of an encrypted source side common session key e and an encrypted text carried out by the sink must be synchronized with the encryption of a source side common session key sk and a clear text performed by the source. That is to say, a decryption key generated by the components composing the 1394 interface unit 36 employed in the optical magnetic disc apparatus 3 shown in FIG. 22, from the LFSR 601 to the exclusive logical sum computing circuit 608, has to correspond to an encryption key generated by the components composing the 1394 interface unit 26 employed in the DVD player 1 shown in FIG. 21, from the LFSR 501 to the exclusive logical sum computing circuit 508, and encrypted data decrypted by using the decryption key must be data resulting from encryption of a clear text by using the encryption key. As described above, the encryption key has thus to be generated by the 1394 interface unit 26 shown in FIG. 21 in synchronization with (that is, prior to) the encryption of the input clear text and the decryption key must therefore be generated by the 1394 interface unit 36 shown in FIG. 22 in synchronization with (that is, prior to) the decryption of the received encrypted text even though the synchronization is not explicitly shown in FIGS. 21 and 22.

Figure 28:
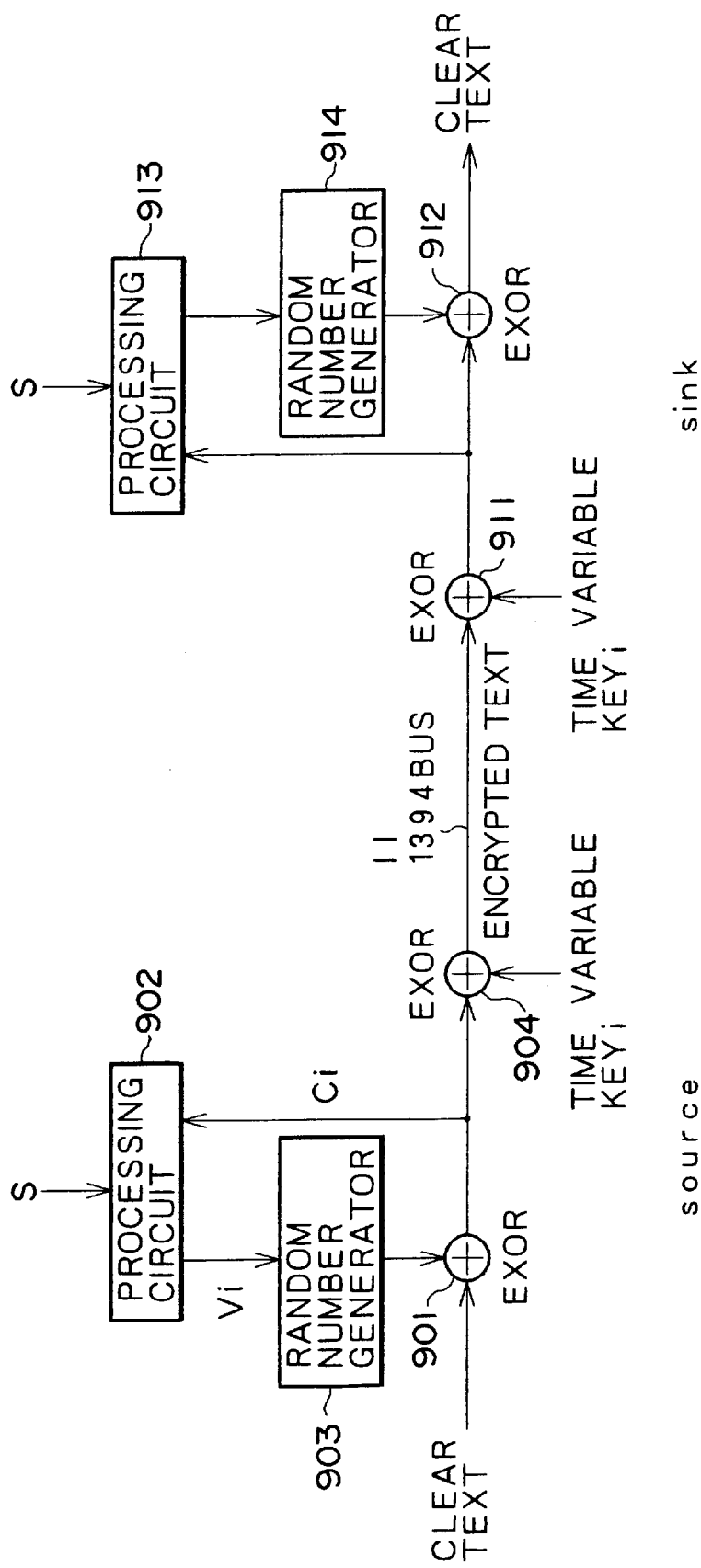
FIG. 28 is a block diagram showing the configuration of another embodiment implementing an information processing system to which the present invention is applied wherein a source transmits encrypted data to a sink.

Accordingly, if a bit is missing for some reasons from a packet composing an encrypted text transmitted from a source to a sink by way of the 1394 serial bus 11, a phase representing a timing relation between a clear text and an encryption key in the source can not be sustained as a phase representing a timing relation between an encrypted text and a decryption key in the sink. However, this problem can be solved by updating or reinitializing the phase representing a timing relation between an encrypted text and a decryption key in the sink periodically. FIG. 28 is a diagram showing a typical configuration of an embodiment implementing a source/sink system for updating or reinitializing the phase representing a timing relation between an encrypted text and a decryption key in the sink periodically.

As shown in the figure, in the source, an exclusive logical sum computing circuit 901 computes an exclusive logical sum Ci of a random number generated by a random number generator 903 and an input clear text and outputs the exclusive logical sum Ci to an exclusive logical sum computing circuit 904 and a processing circuit 902 which also receives the initial value key Ss of a session key S. The processing circuit 902 carries out predetermined processing on the initial value key Ss of the session key S and the exclusive logical sum Ci output by the exclusive logical sum computing circuit 901, outputting a result Vi of the processing to the random number generator 903 as an initial value.

The exclusive logical sum computing circuit 904 computes the exclusive logical sum of the exclusive logical sum Ci generated by the exclusive logical sum computing circuit 901 and a time variable key i to generate an encrypted text which is transmitted to the sink through the 1394 serial bus 11.

The sink carries out operations in the reversed order of those performed by the source. To be more specific, an exclusive logical sum computing circuit 911 computes an exclusive logical sum Ci of the encrypted text received from the source through the 1394 serial bus 11 and the time variable key i, outputting the exclusive logical sum Ci to an exclusive logical sum computing circuit 912 and a processing circuit 913 which also receives the initial value key Ss of the session key S. The processing circuit 913 carries out predetermined processing on the initial value key Ss of the session key S and the exclusive logical sum Ci output by the exclusive logical sum computing circuit 911, outputting a processing result Vi to a random number generator 914. The random number generator 914 generates a random number with the processing result vi from the processing circuit 913 used as an initial value. The exclusive logical sum computing circuit 912 computes a final exclusive logical sum of the random number generated by the random number generator 914 and the exclusive logical sum Ci generated by the exclusive logical sum computing circuit 911, outputting the final exclusive logical sum as a clear text.

Figure 29:
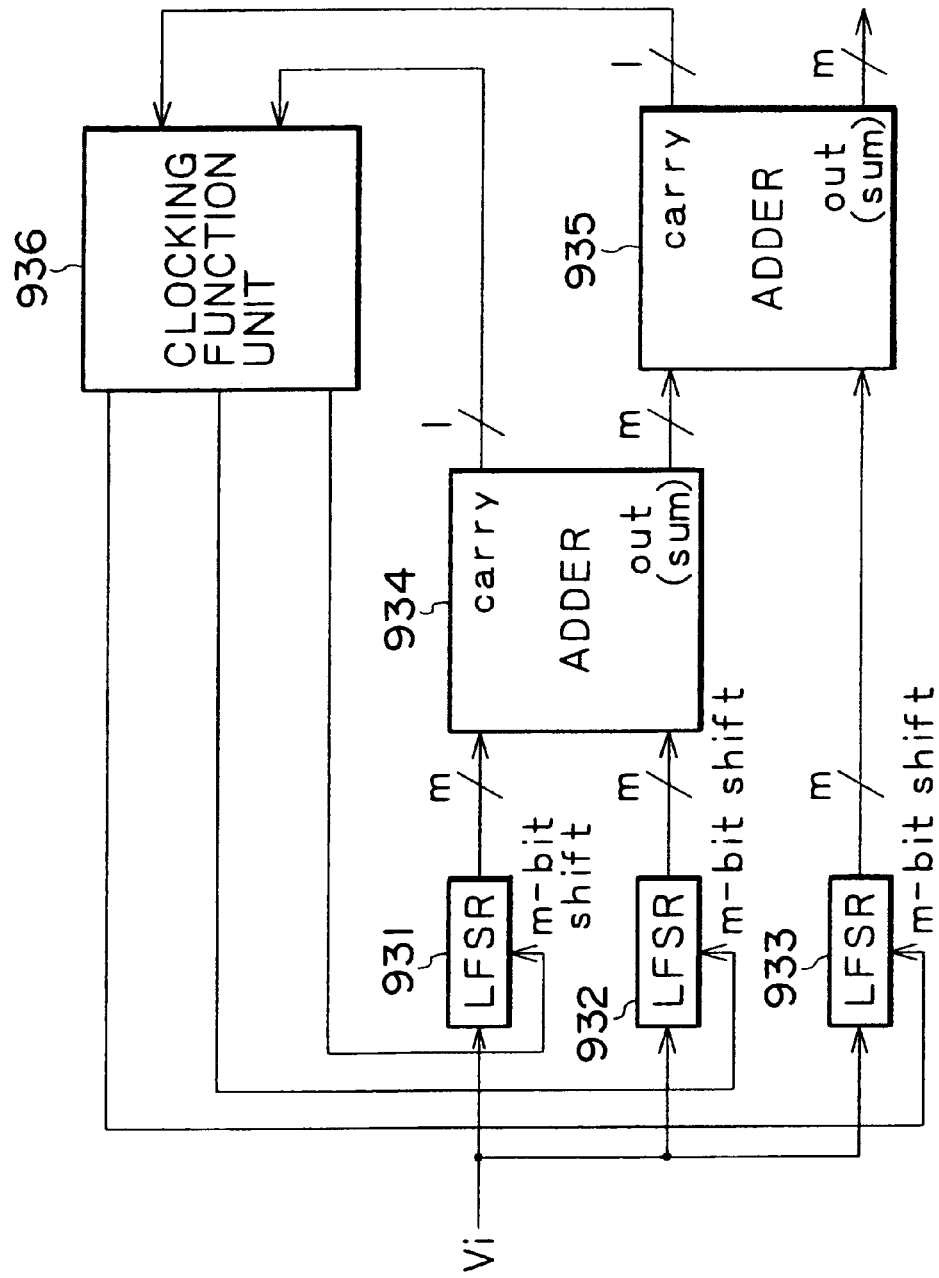
FIG. 29 is a block diagram showing a random number generator 903 or 914 employed in the source or the sink respectively in the system shown in FIG. 28.

FIG. 29 is a diagram showing a typical configuration of the random number generator 903. As shown in the figure, the random number generators 903 comprises components, from an LFSR 931 to a clocking function unit 936. Each of the components shown in the figure has a function identical with the corresponding LFSR 501 etc., the adder 504 etc. or the clock functioning unit 506 etc. of the embodiments shown in FIGS. 21 to 24.

It should be noted that the random number generator 914 has the same configuration as the random number generator 903 shown in FIG. 29. Therefore, it is not necessary to show the configuration of former in a separate figure.

Figure 30:
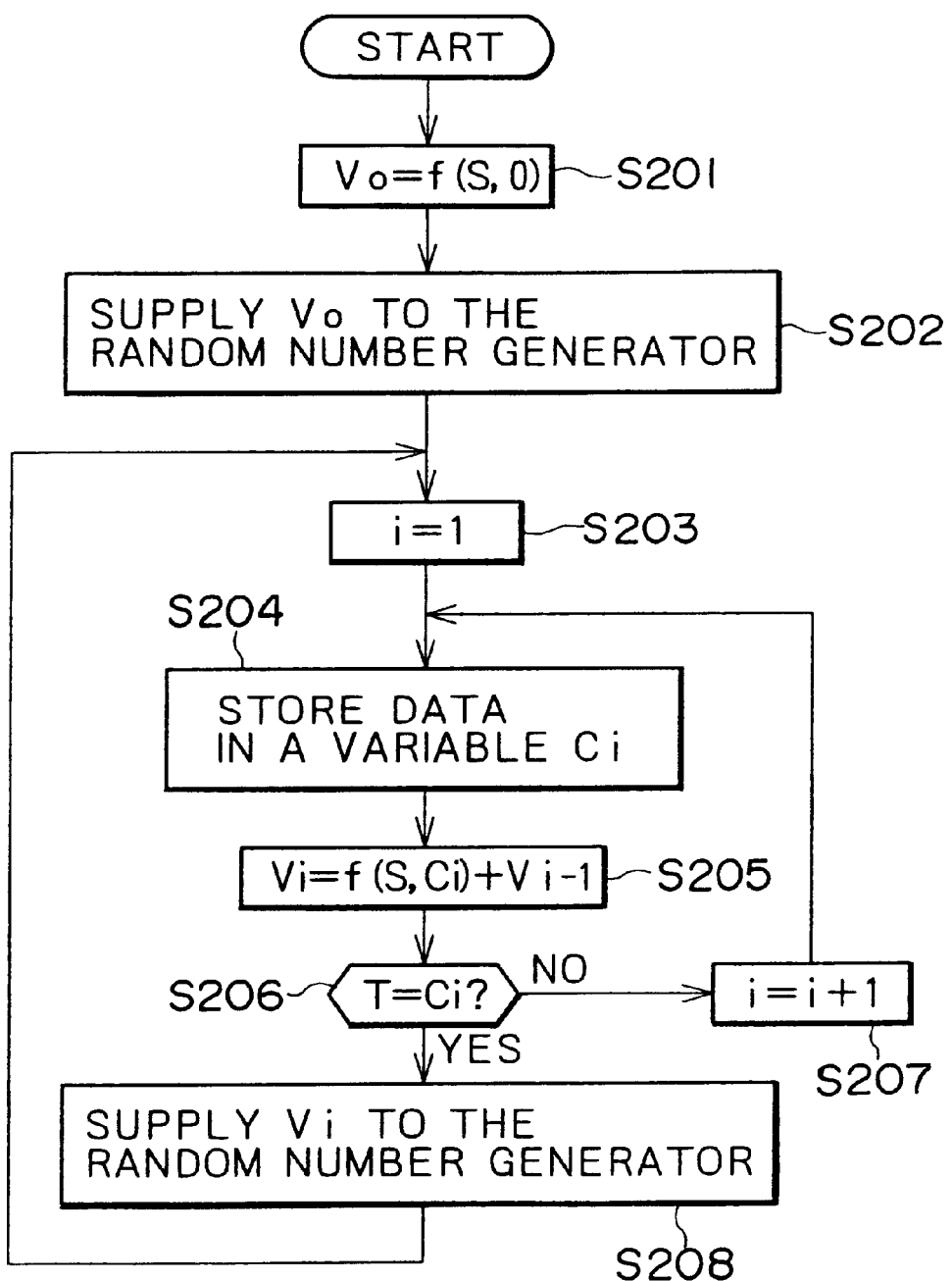
FIG. 30 shows a flowchart representing operations carried out by a processing circuit 902 or 913 employed in the source or the sink respectively in the system shown in FIG. 28.

FIG. 30 shows a flowchart representing operations carried out by each of the processing circuits 902 and 913 on the source and sink sides respectively.

The operations are explained by referring to the flowchart shown in FIG. 30 as follows.

The processing circuit 902 on the source side has a function f expressed by an equation given below to compute a value Vi from an input Ci supplied thereto by the exclusive logical sum computing circuit 901 and the initial value key Ss of a session key S.

$$Vi = f(Ss, Ci)$$

As shown in the figure, the flowchart begins with a step S201 at which the processing circuit 902 uses the value 0 as an initial value of the input Ci to compute a value Vi=f (Ss, Ci) as follows:

$$V_0 = f(Ss, 0)$$

The operational flow then goes on to a step S202 at which the value $V_0$ computed at the step S201 is supplied to the random number generator 903 shown in FIG. 29. In the random number generator 903, the value $V_0$ output by the processing circuit 902 is supplied to the LFSR 931 to 933 as an initial value. By using the same technique as the 1394 interface unit 26 shown in FIG. 21 and the other embodiments shown in FIGS. 22 to 24, a random number is generated and output by the adder 935 employed in the random number generator 903 to the exclusive logical sum computing circuit 901 shown in FIG. 28. The exclusive logical sum computing circuit 901 computes an exclusive logical sum Ci of the random number generated by the random number generator 903 and an input clear text, outputting the exclusive logical sum Ci back to the processing circuit 902.

In the mean time, the operational flow shown in FIG. 30 proceeds to a step S203 at which the processing circuit 902 sets a variable i at 1. The operational flow then continues to a step S204 at which the exclusive logical sum Ci received from the exclusive logical sum computing circuit 901 is stored in a variable C.

Then, the operational flow goes on to a step S205 at which the processing circuit 902 carries out processing in accordance with the following equation:

$$Vi = f(Ss, Ci) + V_{i-1}$$

where Ci is the contents of the variable C.

Since the value of the variable i is 1 at the present time, the above equation can be rewritten as follows:

$$V1 = f(Ss, C_1) + V_0$$

where $V_0$ is a value computed at the step S201.

Subsequently, the operational procedure goes on to a step S206 at which the processing circuit 902 forms a judgment as to whether or not the contents of the variable C, that is, $C_1$ in this case, are equal to a predetermined value T set in advance. In the mean time, the exclusive logical sum computing circuit 901 outputs other exclusive logical sum Ci to the processing circuit 902. If the exclusive logical sum Ci is found unequal to the value T at the step S206, the operational flow proceeds to a step S207 at which the contents of the variable i are incremented by 1 before returning to the step S204 at which the other exclusive logical sum Ci received from the exclusive logical sum computing circuit 901, that is, $C_2$ since i=2, is stored in the variable C.

Then, the operational flow goes on to the step S205 at which the processing circuit 902 carries out processing in accordance with the following equation:

$$V_2 = f(Ss, C_2) + V_1$$

where V1 is a value computed at the step S205 in the immediately previous iteration.

Subsequently, the operational procedure goes on to the step S206 at which the processing circuit 902 forms a judgment as to whether or not the input exclusive logical sum Ci, that is, $C_2$ in this case, is equal to the predetermined value T. If the input exclusive logical sum Ci is found unequal to the value T, the operational flow proceeds to the step S207 at which the contents of the variable i are incremented by 1 before returning to the step S204. In this way, the steps S204 to S207 are executed repeatedly till the input exclusive logical sum Ci becomes equal to the value T.

If the input exclusive logical sum Ci is found equal to the value T at the step S206, on the other hand, the operational flow proceeds to the step S208 at which the value Vi (that is, $V_1$ in this case) computed at the step S205 is output to the random number generator 903 as the value $V_0$ computed at the step S201 was output to the random number generator 903 at the step S202. In the random number generator 903, the value V1 output by the processing circuit 902 is supplied to the LFSR 931 to 933 as an initial value. A random number for the initial value is generated and output by the adder 935 employed in the random number generator 903 to the exclusive logical sum computing circuit 901 shown in FIG. 28. The exclusive logical sum computing circuit 901 computes an exclusive logical sum Ci of the random number generated by the random number generator 903 and an input clear text, outputting the exclusive logical sum Ci back to the processing circuit 902.

In the mean time, after the processing circuit 902 outputs the value Vi at the step S208 to the random number generator 903, the operational flow shown in FIG. 30 returns to the step S203 at which the processing circuit 902 resets the variable i at 1. Thereafter, the steps S203 to S208 are executed repeatedly.

Assume that the value T is 8 bits in width and the generation probability of the value of Ci is uniform. In this case, the probability of the Ci value's being equal to T is 1/256 where 256 is the eighth power of 2. That is to say, the generation of the exclusive logical sum Ci having a value equal to T occurs at a rate of once per 256 sequential operations carried out by the exclusive logical sum computing circuit 901 to generate the exclusive logical sum Ci. As a result, the initial value used in the random number generator 903 for generating a random number is updated at a rate of once per 256 sequential operations carried out by the exclusive logical sum computing circuit 901 to generate the exclusive logical sum Ci.

The exclusive logical sum Ci output by the exclusive logical sum computing circuit 901 is also supplied to the exclusive logical sum computing circuit 904 for computing the exclusive logical sum of the exclusive logical sum Ci and the time variable key i. The exclusive logical sum computed by the exclusive logical sum computing circuit 904 is output to the 1394 serial bus 11 as an encrypted text.

In the sink, the exclusive logical sum computing circuit 911 computes an exclusive logical sum Ci of the encrypted text received from the source through the 1394 serial bus 11 and the time variable key i, outputting the exclusive logical sum Ci to the exclusive logical sum computing circuit 912 and the processing circuit 913 which also receives the initial value key Ss of the session key S. Much like the processing circuit 902 on the source side, the processing circuit 913 carries out predetermined processing on the initial value key Ss of the session key S and the exclusive logical sum Ci output by the exclusive logical sum computing circuit 911, outputting a processing result Vi to the random number generator 914 at a rate of once per 256 sequential operations to generate the exclusive logical sum Ci. The random number generator 914 generates a random number with the processing result Vi used as an initial value. The exclusive logical sum computing circuit 912 computes a final exclusive logical sum of the random number generated by the random number generator 914 and the exclusive logical sum Ci generated by the exclusive logical sum computing circuit 911 and outputs the final exclusive logical sum as a clear text.

As described above, the processing circuit 913 outputs the processing result Vi to the random number generator 914 at a rate of once per 256 sequential operations carried out by the exclusive logical sum computing circuit 911 to generate the exclusive logical sum Ci. As a result, a phase representing a timing relation between an encrypted text transmitted from a source to a sink by way of the 1394 serial bus 11 and a random number used as a decryption key in the sink can be recovered in the event of a bit missing for some reasons from a packet composing the encrypted text at the time the processing circuit 913 outputs the processing result Vi to the random number generator 914 at a rate of once per 256 sequential operations to generate the exclusive logical sum Ci.

It should be noted that, since the processing circuit 902 or 913 outputs the processing result Vi to the random number generator 914 when the exclusive logical sum Ci becomes equal to the value T (Ci=T), the processing circuit 913 does not output the processing result Vi to the random number generator 914 periodically. Instead, nothing more can be said more than the fact that the processing circuit 913 outputs the processing result Vi to the random number generator 914 at a probability of once per 256 sequential operations to generate the exclusive logical sum Ci on the average.

It is worth noting that the rate at which the processing circuits 902 and 913 output the processing result Vi to the random number generators 903 and 914 can also be based on the number of pieces of encrypted data transmitted by the source and received by the sink. When a piece of data is missing in the course of transmission through the 1394 serial bus 11, however, this method will have a problem that the data piece count on the source side will be different from the data piece count on the sink side, making it no longer possible to establish synchronization between the source and the sink. It is thus desirable to adopt the synchronization technique implemented by the embodiment described above.

As an initial value used in the random number generator 903 or 914, the exclusive logical sum Ci output by the exclusive logical sum computing circuit 901 or 911 can be supplied to the random number generator 903 or 914 respectively as it is. In this case, however, transmitted through the 1394 serial bus 11, it is much to be feared that the exclusive logical sum Ci is stolen. That is why the exclusive logical sum Ci is not used directly as an initial value. Instead, by using a value Vi resulting from predetermined processing carried out on the exclusive logical sum Ci as an initial value, the data security can be further improved.

By the way, there are 2 methods of transferring data through the IEEE 1394 serial bus 11. One of them is an asynchronous transfer method whereas the other is an isochronous transfer method. In the asynchronous transfer method, data is transferred between two apparatuses. In the isochronous transfer method, on the other hand, data is broadcasted from one apparatus to all others connected to the 1394 serial bus. Thus, the communications for authentication of sinks and the key sharing protocols of the embodiments shown in FIG. 4 and the other figures are normally accomplished by adopting the asynchronous transfer method since there is no need for broadcasting information from the source to all sinks.

In the authentication and the key sharing protocol of the embodiment shown in FIG. 4, the personal computer 2 is capable of acquiring an encrypted source side common session key e from the DVD player 1 even if the personal computer 2 is an unauthorized apparatus which does not have the correct license key. As described earlier, the encrypted source side common session key e is an encrypted text resulting from encryption of a source side common session key sk using the license key lk. Since the personal computer 2 is an unauthorized apparatus which does not have the correct license key, the personal computer 2 is not capable of obtaining the correct sink side common session key sk' by decryption of the encrypted source side common session key e. It is much to be feared, nevertheless, that the encrypted source side common session key e can be used directly in decryption of encrypted information as it is.

If the personal computer 2 also receives the source side common session key sk (a clear text) in addition to the encrypted source side common session key e (an encrypted text resulting from encryption of the source side common session key. sk using the license key lk) for some reasons, both the clear text and the corresponding encrypted texts are obtained. In this case, it is much to be feared that the clear and encrypted texts are used for finding the license key that the personal computer 2 does not have. It should be noted that, in general, the more the pairs of clear and encrypted texts known by an attacker, the easier the reverse method adopted by the attacker to know the license key used to produce the encrypted texts from the clear texts.

In addition, an unauthorized personal computer 2 may transmit a false ID to the DVD player 1 which uses the false ID for computing the license key lk. The license key lk is in turn used for encrypting the source side common session key sk to produce the encrypted source side common session key e which is then transmitted to the personal computer 2. Assume that the personal computer 2 is allowed to make a request for the transmission of an encrypted source side common session key e during a session by transmitting an ID. If such a request is made several times, a plurality of license keys are generated by the DVD player 1 from different IDs received from the personal computer 2. As a result, a plurality of encrypted source side common session keys e resulting from encryption of the source side common session key sk for the session are received by the personal computer 2. That is to say, once the personal computer 2 obtains the source side common session key sk, the personal computer 2 is capable of knowing a plurality of pairs each comprising the source side common session key sk and one of the encrypted source side common session keys e.

Figure 31:
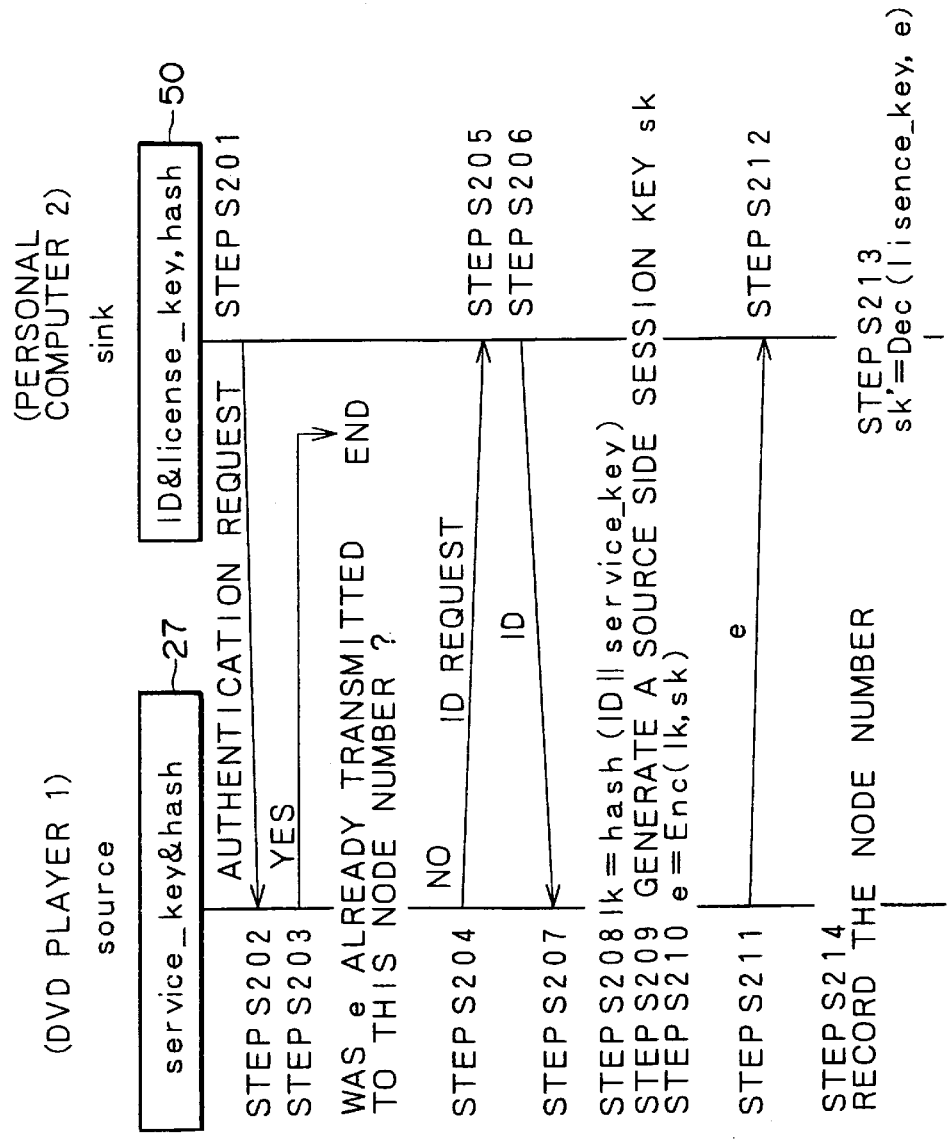
FIG. 31 is a diagram showing a still further embodiment implementing the authentication procedure.

An embodiment implementing an authentication procedure shown in FIG. 31 addresses the problem described above. The procedure prevents an unauthorized sink from receiving a plurality of encrypted source side common session keys e resulting from encryption of a source side common session key sk by using different license keys lk. The procedure shown in the figure is basically the same as the one shown in FIG. 4 except that, prior to a request for an ID made by the source to the sink, some pieces of processing are carried out.

To put it in detail, as shown in the procedure of the figure, at a step S201, the personal computer 2 serving as the sink transmits a request for authentication, that is, a request for the start of an authentication protocol, to the DVD player 1 serving as the source. This request for authentication is transferred by using the asynchronous transfer method as is the case with the other transfers in the protocol.

Apparatuses connected to the IEEE 1394 serial bus 11 each have a unique node number assigned thereto at a bus reset time. The node number is used to specify and identify an information transmitting or receiving apparatus.

Figure 32:
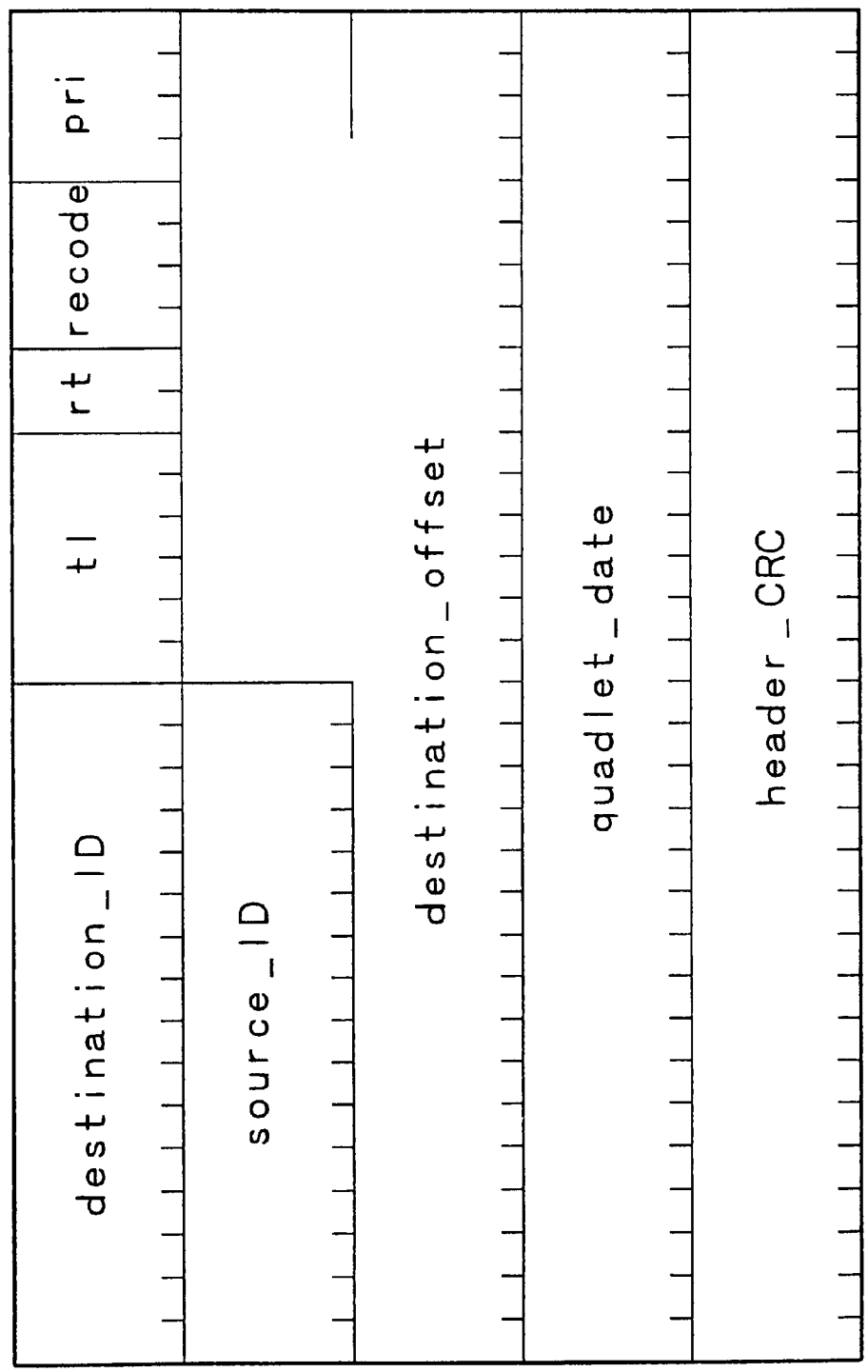
FIG. 32 is a diagram showing the format of a packet.

FIG. 32 is a diagram showing the format of a write request for a data quadlet packet, one of asynchronous packets. The destination ID field of the format is the node number of an information receiving apparatus and the source ID field of the format is the node number of an information transmitting apparatus. In the case of a packet conveying a request for authentication, data indicating that the packet is a request for authentication is included in the quadlet data field.

Receiving the asynchronous packet conveying a request for authentication at a step S202, the DVD player 1 fetches the source ID, that is, the node ID of an information transmitting apparatus transmitting the packet. The procedure then goes on to a step S203 at which the DVD player 1 forms a judgment as to whether or not an encrypted source side common session key e resulting from encryption of the source side common session key sk for the present session has been transmitted to the information receiving apparatus identified by the node number. If the outcome of the judgment formed at the step S203 indicates that an encrypted source side common session key e resulting from encryption of the source side common session key sk for the present session has been transmitted to the information receiving apparatus identified by the node number, the processing of the authentication protocol for the personal computer 2 is terminated. If the outcome of the judgment formed at the step S203 indicates that an encrypted source side common session key e resulting from encryption of the source side common session key sk for the present session has not been transmitted to the information receiving apparatus identified by the node number, on the other hand, the procedure goes on to a step S204 to start execution of the authentication protocol.

Pieces of processing carried out at the steps S204 to S213 of the procedure shown in FIG. 31 are the same as those of the steps Si to Si0 of the procedure shown in FIG. 4.

After the above pieces of processing are carried out, at a step S214, the DVD player 1 records the node number of the personal computer 2 fetched at the step S213 into the EEPROM unit 27. The node number is kept therein as long as the DVD player 1 uses the source side common session key sk of the present session. As another source session key sk is generated for a next session, the node number is deleted from the EEPROM unit 27.

With the protocol described above, only one encrypted source side common session key e is transmitted to a sink. As a result, security of transmitted information can be improved.

By the way, at the step S7 of the authentication protocol shown in FIG. 4, a source side common session key sk is encrypted by the source using a license key lk to produce an encrypted source side common session key e which is then transmitted to the sink. As an encryption algorithm, a block encryption is used widely. In the block encryption, a clear text is encrypted in fixed length block units. A DES encryption is a generally known block encryption. The DES encryption is an encryption algorithm for transforming each 64 bit block of a clear text into a 64 bit encrypted text.

Assume that an n-bit block encryption is an encryption algorithm used at the step S7 of the procedure shown in FIG. 4 to transform an n-bit clear text into an n-bit encrypted text and the number of bits in the source side common session key sk is n. Also assume that an n-bit result obtained from application of the encryption algorithm to the n-bit source side common session key sk and the license key lk is used as it is as an encrypted source side common session key sk e.

Assume that the source makes an attempt to transmit another encrypted source side common session key e to a sink after a previous encrypted source side common session key e in the same session. Also assume that the previous encrypted source side common session key e has been stolen by an unauthorized person. Since the transaction is done in the same session, the source side common session key sk remains unchanged. In addition, since the same encryption algorithm is adopted in producing the other encrypted source side common session key e from the source side common session key sk and the same license key lk is used in the algorithm, the other encrypted source side common session key e is the same as the previous encrypted source side common session key e. It is quite within the bounds of possibility that the other encrypted source side common session key e is also stolen by an unauthorized person. If the other encrypted source side common session key e is also stolen by the unauthorized person by any chance, the person will know that the same source side common session key sk is still being used, causing a problem.

Figure 33:
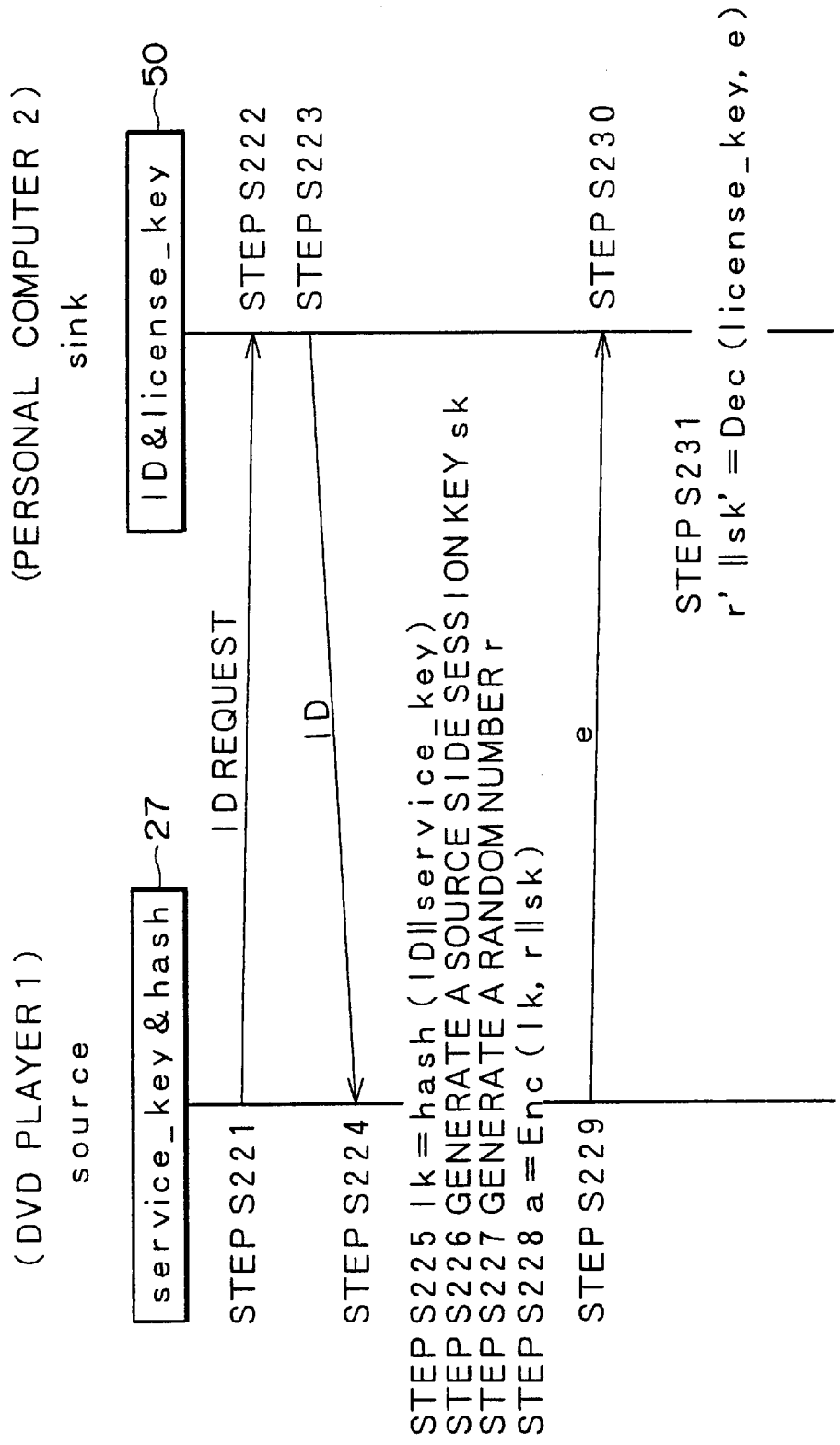
FIG. 33 is a diagram showing a still further embodiment implementing the authentication procedure.

An embodiment implementing an authentication procedure shown in FIG. 33 addresses the problem described above. Since pieces of processing carried out at steps S221 to S226 of the procedure shown in the figure are the same as those of the steps S1 to S6 of the procedure shown in FIG. 4, their explanation is not repeated.

At a step S227, the source generates an n-bit random number r. The procedure then goes on to a step S228 at which a concatenation of the random number r with the source side common session key sk is encrypted by using the license key lk as follows:

$$e=Enc(lk, r\|sk)$$

Figure 34:
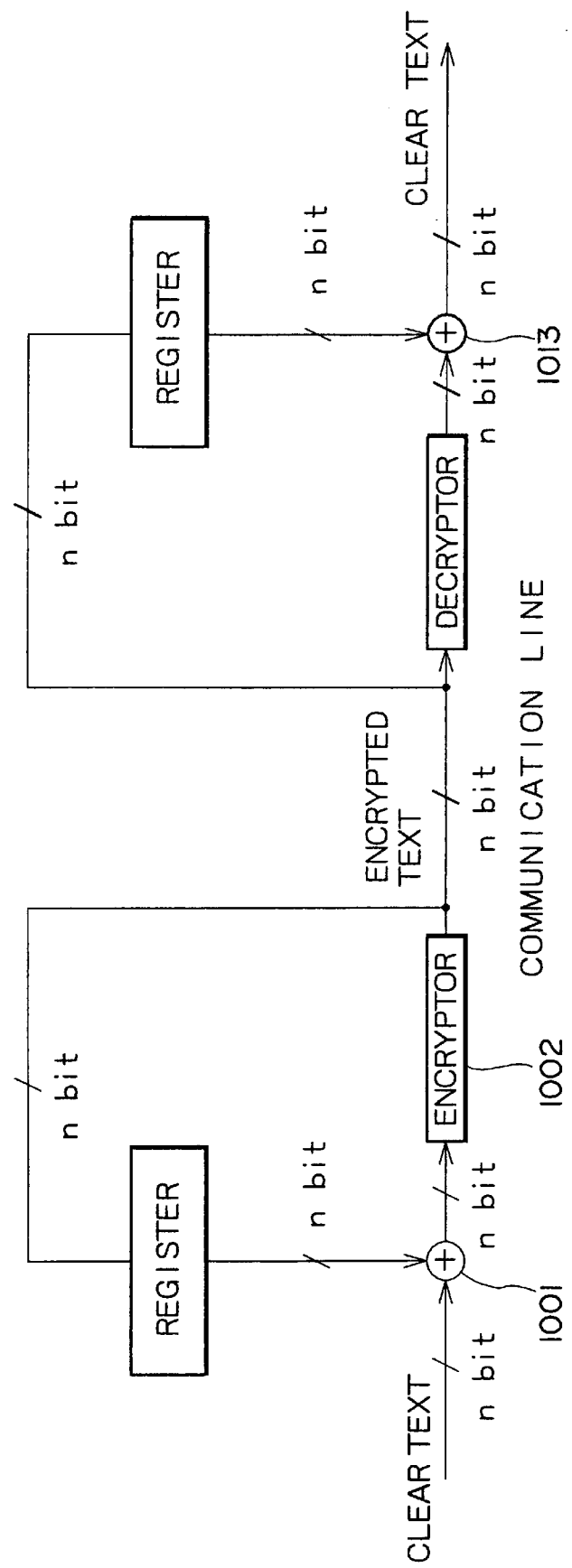
FIG. 34 is a block diagram showing a typical configuration of a CBC mode.

The encryption is carried out in an encryption mode called a CBC mode. FIG. 34 is a diagram showing the configuration of a system implementing the CBC mode. The left hand side half and the right hand side half of the figure represent encryption and decryption respectively. The same initial values IV are stored in registers 1003 and 1012. The initial value IV is fixed throughout the entire system.

In the encryption processing, first of all, an exclusive logical sum processing circuit 1001 computes an exclusive logical sum of a 1st n-bit block of a clear text and the initial value IV stored in the register 1003. The exclusive logical value is supplied to an encryptor 1002. An n-bit encrypted text produced by the encryptor 1002 is output to a communication line as a 1st block and fed back to the register 1003.

When a 2nd n-bit block of the clear text is supplied, the exclusive logical sum processing circuit 1001 computes an exclusive logical sum of the 2nd n-bit block of the clear text and the 1st block of the encrypted text stored in the register 1003. The exclusive logical value is supplied to the encryptor 1002 to be encrypted therein. An n-bit encrypted text produced by the encryptor 1002 is output to the communication line as a 2nd block and fed back to the register 1003. The operations described above are carried out repeatedly.

On the decryption side, on the other hand, the 1st block of the encrypted text transmitted through the communication line is decrypted by a decryptor 1011. An exclusive logical sum processing circuit 1013 computes an exclusive logical sum of the output of the decryptor 1011 and the initial value IV stored in a register 1012 to produce the 1st block of the clear text.

The 1st block of the encrypted text received through the communication line is also stored in the register 1012. Then, the 2nd block of the encrypted text transmitted through the communication line is received and decrypted by the decryptor 1011. The exclusive logical sum processing circuit 1013 computes an exclusive logical sum of the 2nd block of the decryption result output by the decryptor 1011 and the 1st block of the encrypted text stored in the register 1012 to produce the 2nd block of the clear text.

The 2nd block of the encrypted text received through the communication line is also stored in the register 1012.

The operations described above are carried out repeatedly to accomplish decryption processing.

It should be noted that, the CBC mode is described in detail in the second edition of the reference with the title "Applied Cryptography" authored by Bruce Schneider.

Refer back to the procedure shown in FIG. 33. At the step S228, the n-bit random number r and the source side common session key sk are used in the encryption algorithm as 1st and 2nd blocks of the clear text. That is to say, the exclusive logical sum processing circuit 1001 computes an exclusive logical sum of the random number r, that is, the 1st n-bit block of the clear text, and the initial value IV stored in the register 1003. The exclusive logical value is supplied to the encryptor 1002 to be encrypted therein by using the license key lk. Thus, the encryptor 1002 produces Enc (lk, r (+) IV).

The output of the encryptor 1002 is stored in the register 1003. When the source side common session key sk, that is, the 2nd block of the clear text, is received, the exclusive logical sum processing circuit 1001 computes an exclusive logical sum of the 2nd block of the clear text and the output of the encryptor stored in the register 1003. As a result, the encryptor 1002 produces Enc (lk, sk (+) Enc (lk, r (+) IV)).

At a step S229, the source concatenates the two blocks with each other to produce e which is transmitted to the sink according to the following equation:

$$e = Enc(lk, r(+)IV) \| Enc(lk, sk(+)Enc(lk, r(+)IV))$$

On the sink side, the output e of the encryptor 1002 is received at a step S230. The procedure then goes on to a step S231 at which the encrypted source side common session key e is decrypted by using the license key stored in the EEPROM unit 50. A result of decryption comprises a 1st block r' and a 2nd block sk', the sink side common session key.

In the encryption and decryption described above, only the use of the correct license key by the sink will result in sk=sk'. As a result, the source and the sink are allowed to share a common session key.

The equation of the encrypted source side common session key e given above means that, each time the source side common session key sk is encrypted, a different encrypted source side common session key e is resulted in even if the value of the session key sk remains unchanged. This is because the random number r involved in the encryption changes. As a result, it is difficult for a person who stole different values of the encrypted source side common session key sk to determine whether or not the values are generated in the same session.

It should be noted that, in addition to the CBC mode described above, generally known use modes of the block encryption include an ECB mode, a CFB mode and an OFB mode. Since the last two modes each include a feedback loop, they can be applied to the processing shown in FIG. 33. As a matter of fact, any encryption modes can be applied to the processing shown in FIG. 33 as long as they include a feedback loop. Use modes of the block encryption are also described in detail in the second edition of the reference with the title "Applied Cryptography" authored by Bruce Schneider.

Figure 35:
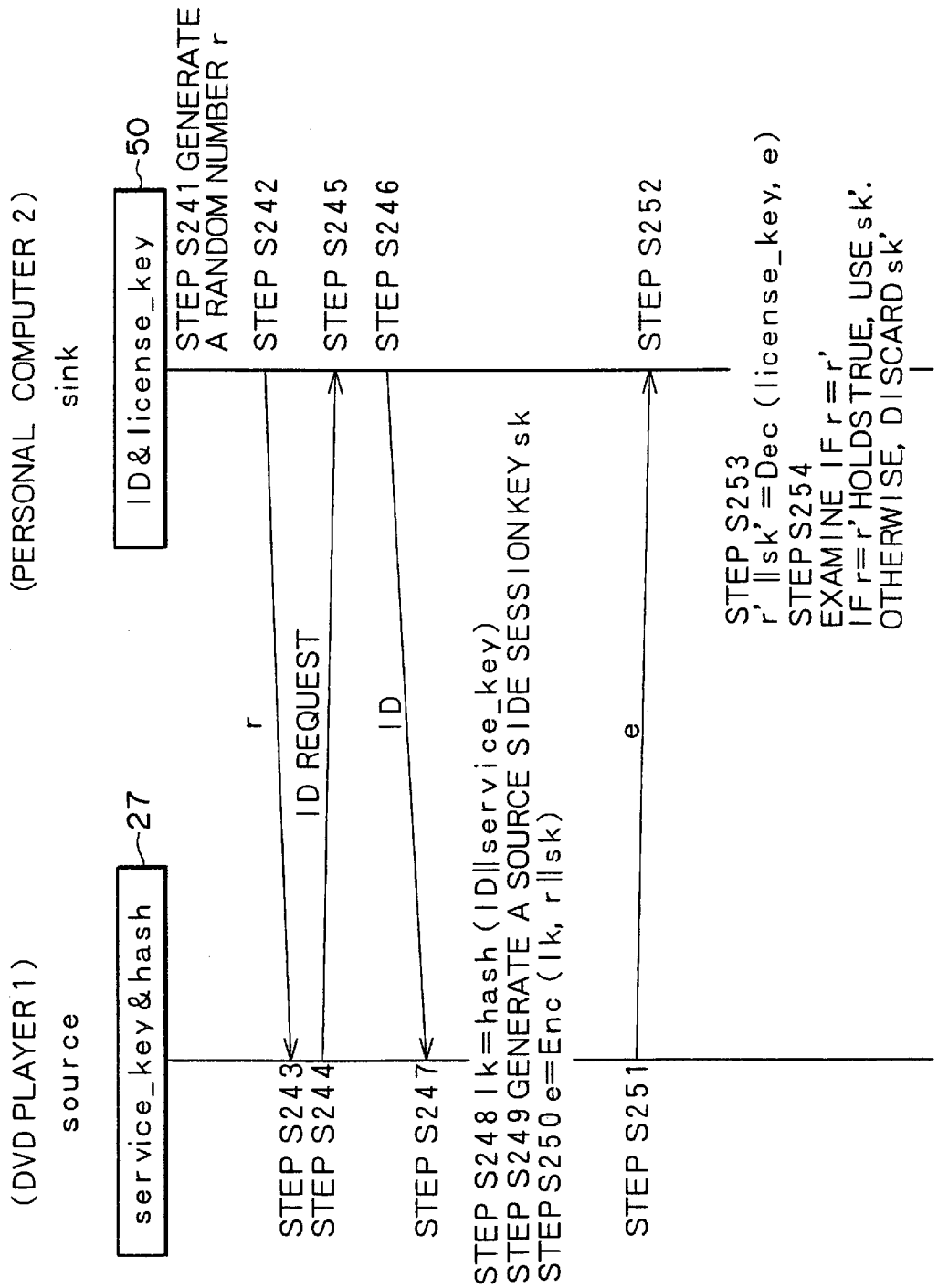
FIG. 35 is a diagram showing a still further embodiment implementing the authentication procedure.

By the way, in the processing implemented by the embodiment shown in FIG. 4, the source encrypts a source side common session key sk and transmits an encrypted source side common session key e to the sink. Since only an authorized sink is capable of correctly decrypting the encrypted source side common session key e to produce a sink side common session key sk' having the same value as the source side common session key sk, in essence, the embodiment is a system wherein the sink is authenticated by the source. In this procedure, however, the source itself is not authenticated. As a result, even if an unauthorized source transmits haphazard data as an encrypted source side common session key to a sink, it is quite within the bounds of possibility that the sink accepts a result of decryption of the encrypted source side common session key e as a sink side common session key sk'. In order to solve this problem, an embodiment implementing the authentication procedure as shown in FIG. 35 is provided.

As shown in the figure, the authentication procedure begins with a step S241 at which the personal computer 2 serving as the sink generates a random number r having a predetermined number of bits. In the embodiment, the number of bits is 64, a typical value. The procedure then goes on to a step S242 at which the random number is transmitted to the DVD player 1 serving as the source. Then, the procedure proceeds to a step S243 at which the DVD player 1 receives the random number r. Subsequently, the procedure continues to a step S244 at which the DVD player 1 makes a request for an ID to the personal computer 2. The procedure then goes on to a step S245 at which the personal computer 2 receives the request. Then, the procedure proceeds to a step S246 at which the personal computer 2 reads out the requested ID from the EEPROM unit 50 and transmits the ID to the DVD player 1. Subsequently, the procedure continues to a step S247 at which the DVD player 1 receives the ID.

The procedure then goes on to a step S248 at which the DVD player 1 generates a license key lk by using the following equation.

$$lk = hash (ID \| service\_key)$$

Then, the procedure proceeds to a step S249 at which the DVD player 1 generates a source side common session key sk.

Subsequently, the procedure continues to a step S250 at which the DVD player 1 generates an encrypted source side common session key e by using the following equation:

$$e = Enc(lk, r \| sk)$$

The procedure then goes on to a step S251 at which the DVD player 1 transmits the encrypted source side common session key e to the personal computer 2.

It should be noted that any encryption mode including a feedback loop such as the CBC mode is adopted in the encryption carried out at the step S250.

Then, the procedure proceeds to a step S252 at which the personal computer 2 receives the encrypted source side common session key e. Subsequently, the procedure continues to a step S253 at which the personal computer 2 decrypts the encrypted source side common session key e by using the license key to produce r'||sk', a concatenation of r' with sk'.

The number of bits included in r' is the same as that of the random number r generated at the step S241 which is determined in advance.

The procedure then goes on to a step S254 at which the personal computer 2 examines if r=r' holds true. If r=r' holds true, the personal computer 2 authenticates the DVD player1 as a valid source and accepts the source side common session key sk' as a correct session key. This is because only an apparatus capable of generating a correct license key lk is capable of generating such an encrypted source side common session key e that a result r' of decryption of the encrypted source side common session key e using the license key is equal to the random number r.

If r=r' does not hold true, on the other hand, the personal computer 2 does not authenticate the DVD player1 as a valid source and, hence, discards the source side common session key sk'.

By providing an embodiment for implementing an authentication procedure as described above, the sink is capable of authenticating the source. In addition, the authentication procedure also retains the feature that only an authorized sink is capable of generating a correct sink side common session key sk' as is the case with the embodiment shown in FIG. 4.

Figure 36:
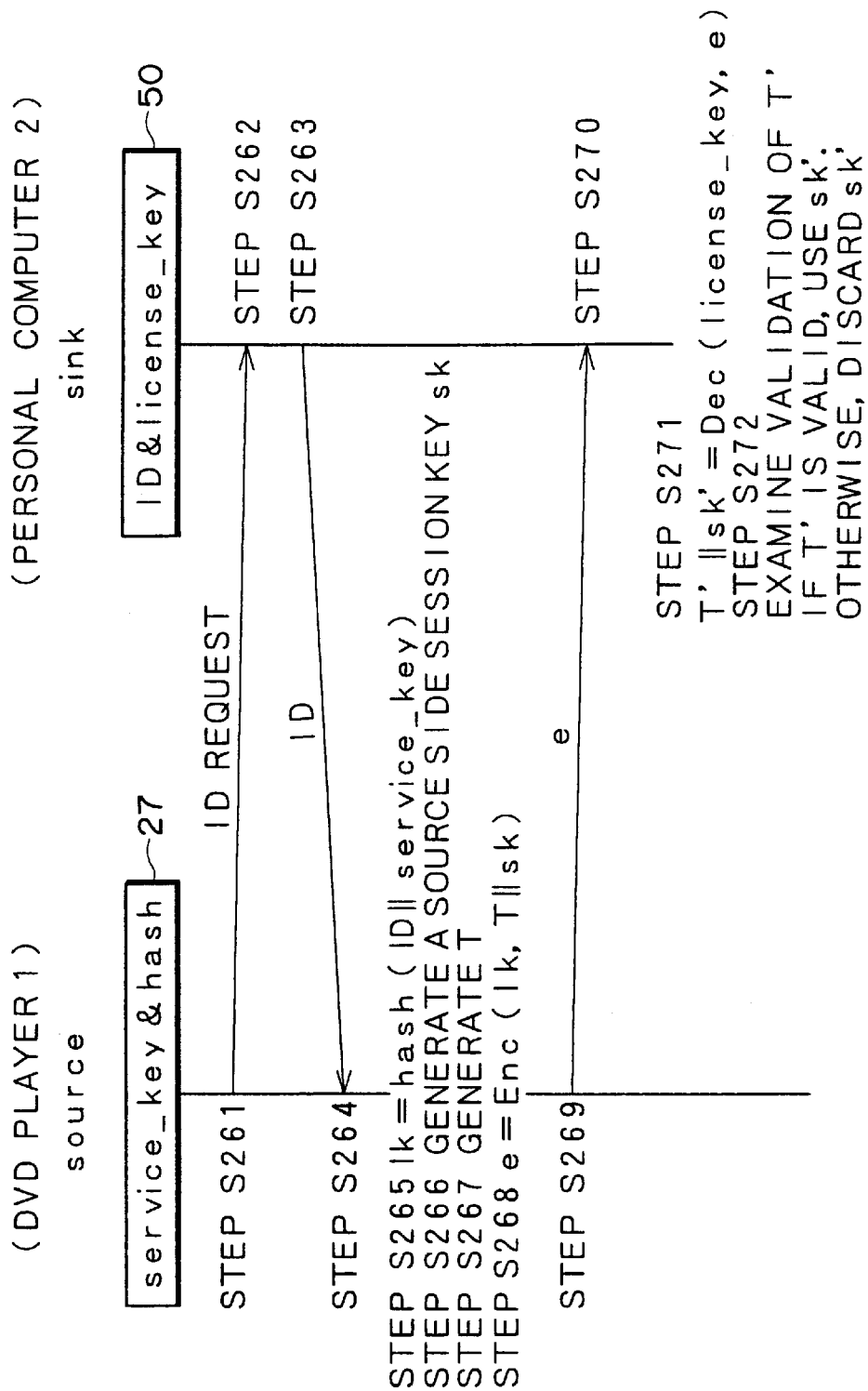
FIG. 36 is a diagram showing a still further embodiment implementing the authentication procedure.

FIG. 36 is a diagram showing another embodiment implementing an authentication procedure whereby the sink is capable of authenticating the source. Since pieces of processing carried out at steps S261 to S266 of the procedure shown in the figure are the same as those of the steps S1 to S6 of the procedure shown in FIG. 4, their explanation is not repeated.

At a step S267, the DVD player 1 picks up time information T. To put it concretely, the contents of a 32-bit cycle-time register prescribed by the IEEE 1394 specifications are typically used as time information. The cycle_time registers are used to make time information of apparatuses connected to the IEEE 1394 serial bus 11 uniform. The cycle_time registers of the apparatuses are updated uniformly by a packet broadcasted by a cycle master, an apparatus on the 1394 serial bus 11. The contents of each of the cycle_time registers are incremented by one by a common clock signal with a frequency of 24.576 MHz or incremented once for every about 40 nanoseconds through the 1394 serial bus 11. In this way, the times of the apparatuses connected to the 1394 serial bus 11 are adjusted to agree with each other.

The procedure then goes on to a step S268 at which the DVD player 1 encrypts T || sk to produce an encrypted source side common session key e. Then, the procedure proceeds to a step S269 to transmit the encrypted source side common session key e to the personal computer 2. It should be noted that any encryption mode including a feedback loop such as the CBC mode is adopted as an encryption mode.

Then, the procedure proceeds to a step S270 at which the personal computer 2 receives the encrypted source side common session key e. Subsequently, the procedure continues to a step S271 at which the encrypted source side common session key e is decrypted by using the license key to produce a result of decryption T'||sk'. The T' portion in the result of decryption is 32 bits in width.

The procedure then goes on to a step S272 to examine the validity of T' by comparing T' with the contents of the cycle time register of the personal computer 2 itself. If the difference is smaller than a typical predetermined value of 100 milliseconds, for example, T' is judged to be valid. If the difference is greater than the predetermined value, on the other hand, T' is judged to be invalid.

If T' passes the validity test, the personal computer 2 judges the DVD player 1 to be a valid apparatus and hence accepts the sink side common session key sk'. If T' does not pass the validity test, on the other hand, the personal computer 2 judges the DVD player 1 to be an invalid apparatus. In this case, the sink side common session key sk' is discarded. This is because only an apparatus capable of generating a correct license key lk is capable of generating such an encrypted source side common session key e that the result T' of decryption of the encrypted source side common session key e using the license key is equal to the contents of the cycle_time register.

By providing an embodiment for implementing an authentication procedure as described above, the sink is capable of authenticating the source. In addition, the authentication procedure also retains the feature that only an authorized sink is capable of generating a correct sink side common session key sk' as is the case with the embodiment shown in FIG. 4.

In the processing implemented by the embodiment shown in FIG. 4, only an authorized sink having the license key is capable of correctly decrypting the encrypted source side common session key e to produce a sink side common session key sk' which is equal to the source side common session key sk. Thus, in essence, the embodiment is a system wherein the source authenticates the sink. In this system, however, even an unauthorized sink is capable of obtaining an encrypted source side common session key e resulting from encryption of a source side common session key sk using a license key lk. It is thus quite within the bounds of possibility that the unauthorized sink decrypts the encrypted source side common session key e in an attempt to obtain a sink side common session key sk' which is equal to the source side common session key sk.

Figure 37:
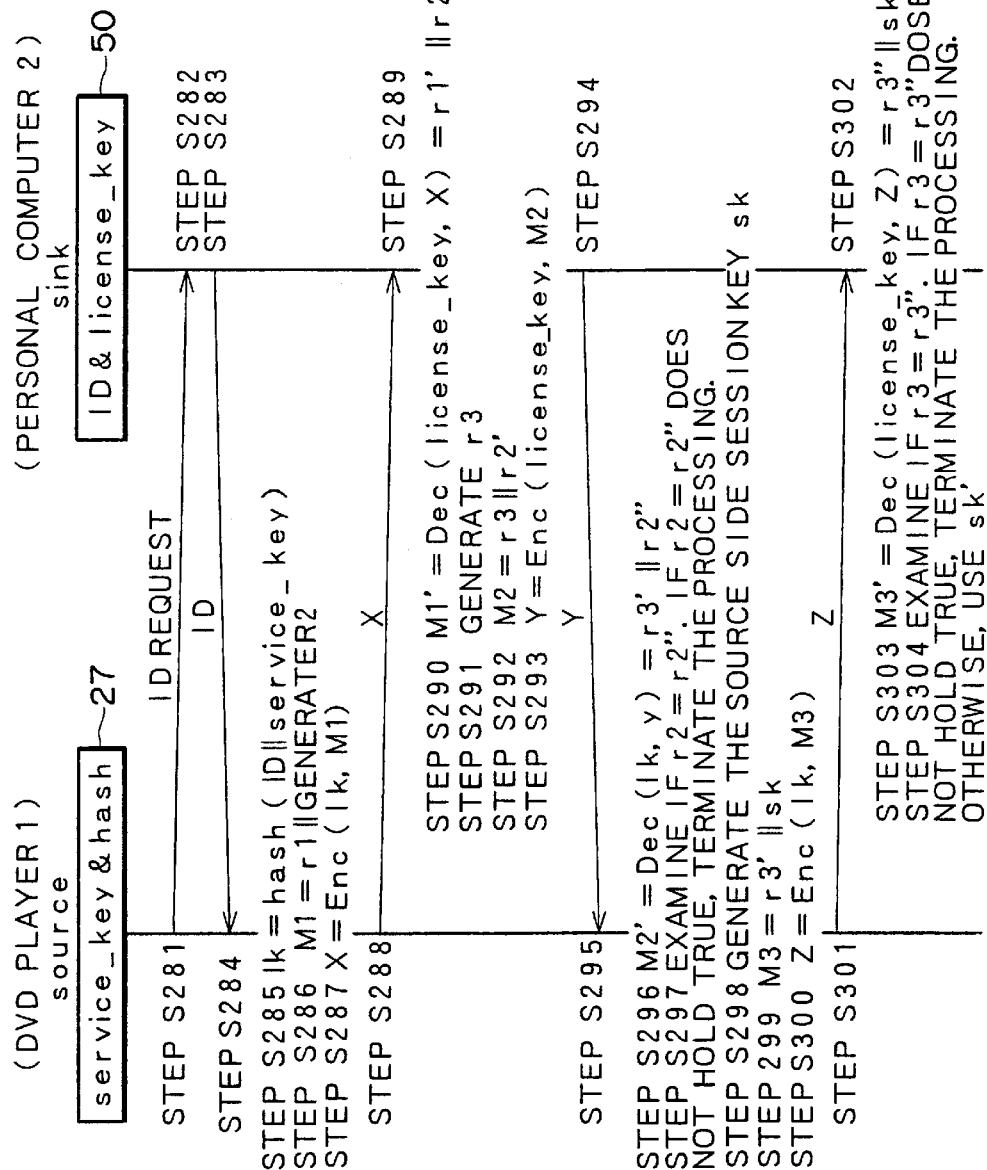
FIG. 37 is a diagram showing a still further embodiment implementing the authentication procedure.

FIG. 37 is a diagram showing an embodiment implementing an authentication procedure for solving the problem described above whereby the source transmits an encrypted text resulting from encryption of the source side common session key sk only after the source has authenticated the sink as a valid apparatus. The procedure is explained below by referring to FIG. 37. In this embodiment, any encryption mode including a feedback loop such as the CBC mode can be adopted as an encryption mode.

Since pieces of processing carried out at steps S281 to S285 of the procedure shown in the figure are the same as those of the steps S1 to S5 of the procedure shown in FIG. 4, their explanation is not repeated. At a step S286, the DVD player 1 generates random numbers r1 and r2 each having a number of bits determined in advance at typically 64 and concatenates them to form M1. The procedure then goes on to a step S287 at which the DVD player 1 encrypts M1 by using the license key lk to generate X which is then transmitted to the personal computer 2 at a step S288.

The personal computer 2 receiving X at a step S289 decrypts X by using the license key at a step S290 to produce M' which is regarded as r1'||r2', a concatenation of r1' and r2' each comprising a predetermined number of bits, typically, 64 bits. Then, the procedure proceeds to a step S291 to generate a random number r3 having a predetermined number of bits, typically, 64. Subsequently, the procedure continues to a step S292 at which r3 is concatenated with r2' to form M2. The procedure then goes on to a step S293 at which M2 is encrypted by using the license key to generate Y which is then transmitted to the DVD player 1 at a step S294.

The DVD player 1 receiving Y at a step S295 decrypts Y by using the license key lk at a step S296 to form M2' which is regarded as r3'||r2", a concatenation of r3' and r2" each comprising a predetermined number of bits, typically, 64 bits. The procedure then goes on to a step S297 at which r2" is compared with r2 generated at the step S286 to check if they are equal to each other. If r2" is found unequal to r2, the DVD player 1 judges the personal computer 2 to be an unauthorized apparatus and hence terminates the authentication protocol. If r2" is found equal to r2, on the other hand, the procedure proceeds to a step S298 at which the DVD player 1 generates a source side common session key sk. The procedure then continues to a step S299 at which r3' is concatenated with sk to produce M3. Then, the procedure goes on to a step S300 at which M3 is encrypted by using the license key lk to produce an encrypted text Z which is then transmitted to the personal computer 2 at a step S301.

The personal computer 2 receiving Z at a step S302 decrypts Z by using the license key at a step S303 to produce M3' which is regarded as r3"||sk', a concatenation of r3" and sk' each comprising a predetermined number of bits, typically, 64 bits. The procedure then goes on to a step S304 to check if r3" is equal to r3 generated at the step S291. If r3" is found unequal to r3, the personal computer 2 judges the DVD player 1 to be an unauthorized apparatus and, hence, terminates the authentication protocol. If r3" is found equal to r3, on the other hand, the personal computer 2 accepts the sink side common session key sk' produced at the step S303 as the source side common session key sk.

With the authentication protocol implemented by the embodiment described above, after the DVD player 1 serving as a source has authenticated the personal computer 2 as an authorized sink, the DVD player 1 transmits the encrypted text Z resulting from encryption of the source side common session key sk to the sink. On the top of that, much like the embodiment shown in FIG. 33, in the case of the present embodiment, even if the source side common session key sk from which the source produces an encrypted text Z by using the license key lk remains unchanged in a session, Z varies from encryption to encryption during the session due to the fact that r3', a variable number, is involved in each encryption. As a result, the present embodiment offers a feature that makes it difficult for an unauthorized person to steal transmitted information.

However, the embodiment shown in FIG. 37 has a problem if r1, r2, r3 and sk are each n bits in width due to the fact that an n-bit encryption algorithm is adopted. This is because, if the first n bits of Y received at the step S295 are used as the first n bits of Z at the step S300 as they are, the source will pass the validity test carried out by the sink at the step S303 even if the source is an unauthorized apparatus.

Figure 38:
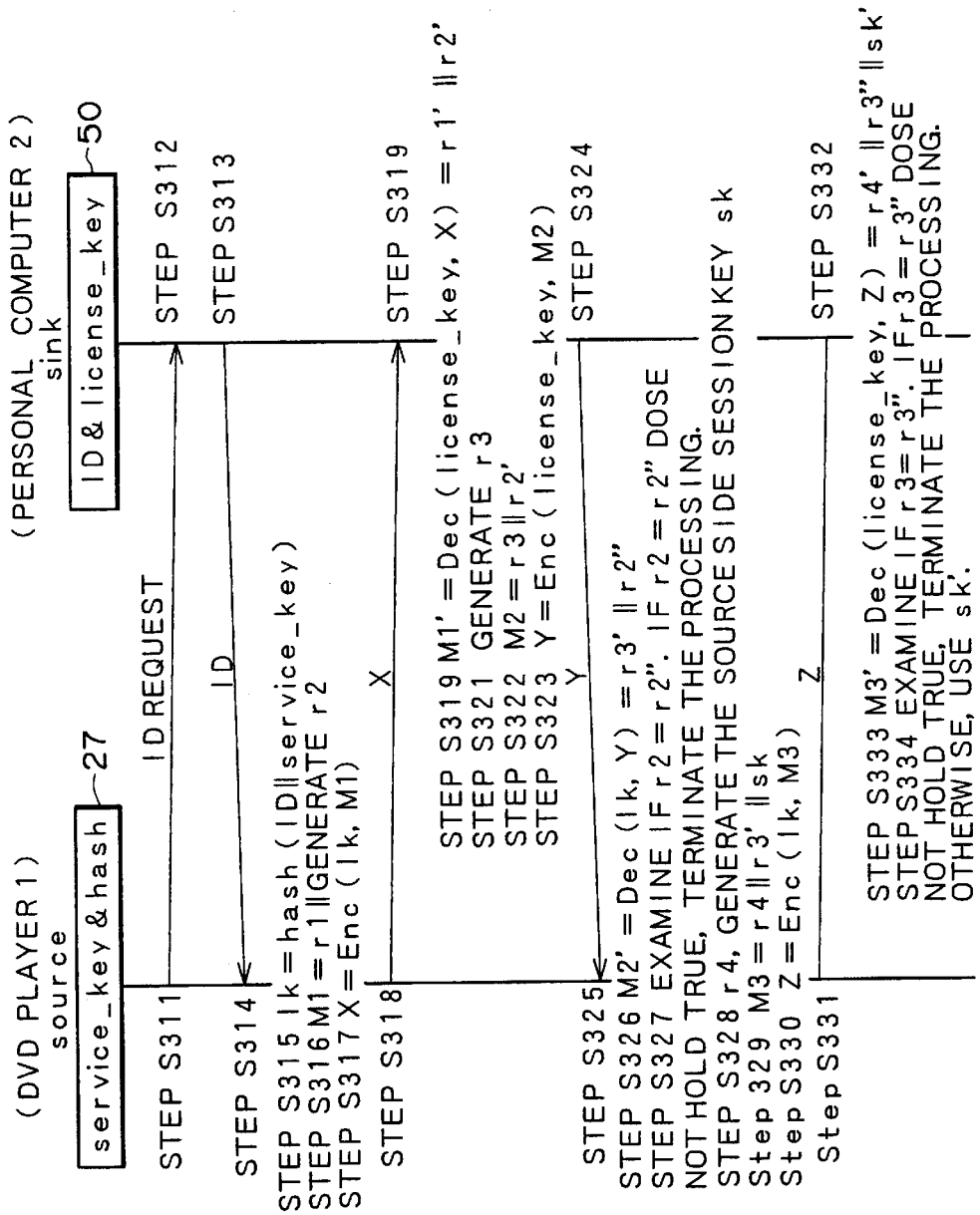
FIG. 38 is a diagram showing a still further embodiment implementing the authentication procedure.
Figure 39:
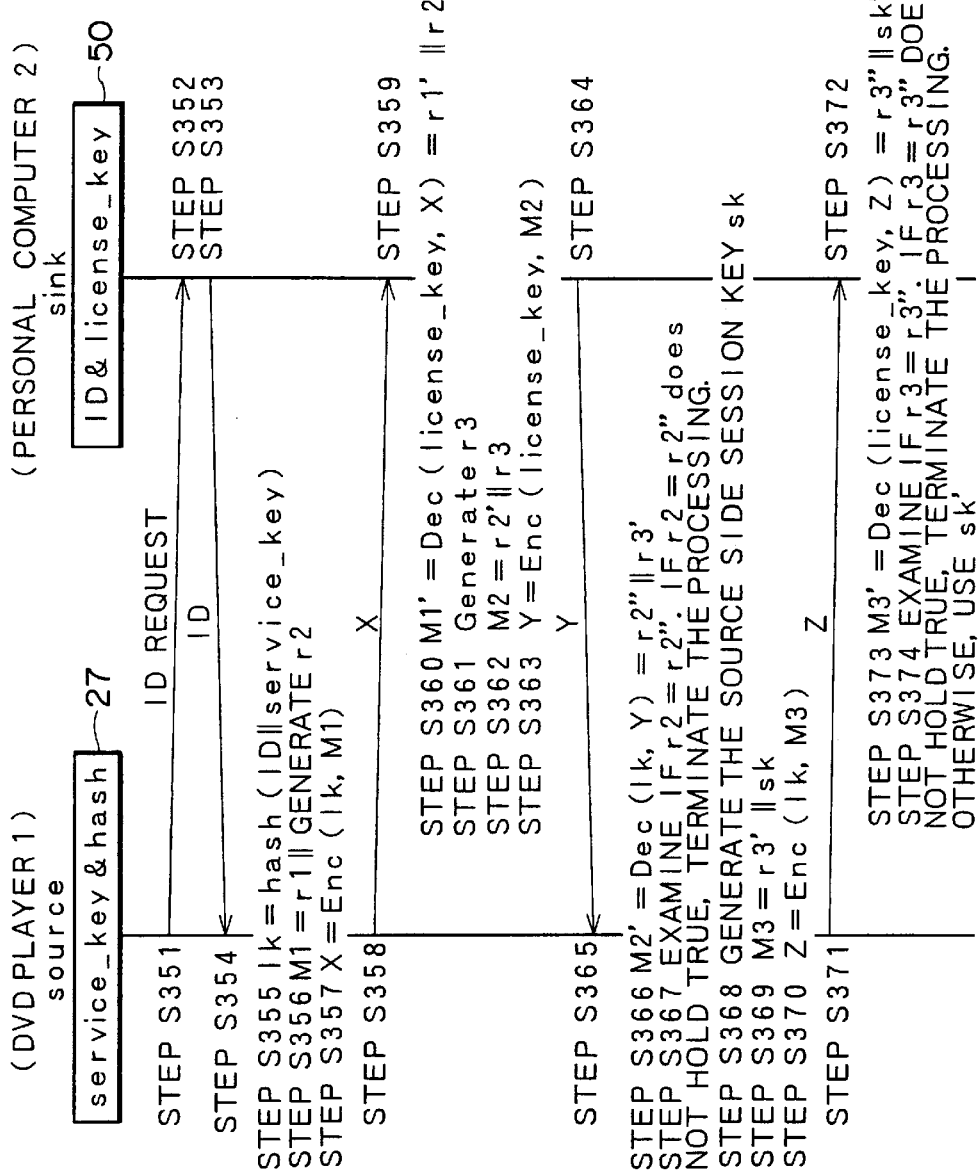
FIG. 39 is a diagram showing a still further embodiment implementing the authentication procedure.
Figure 40:
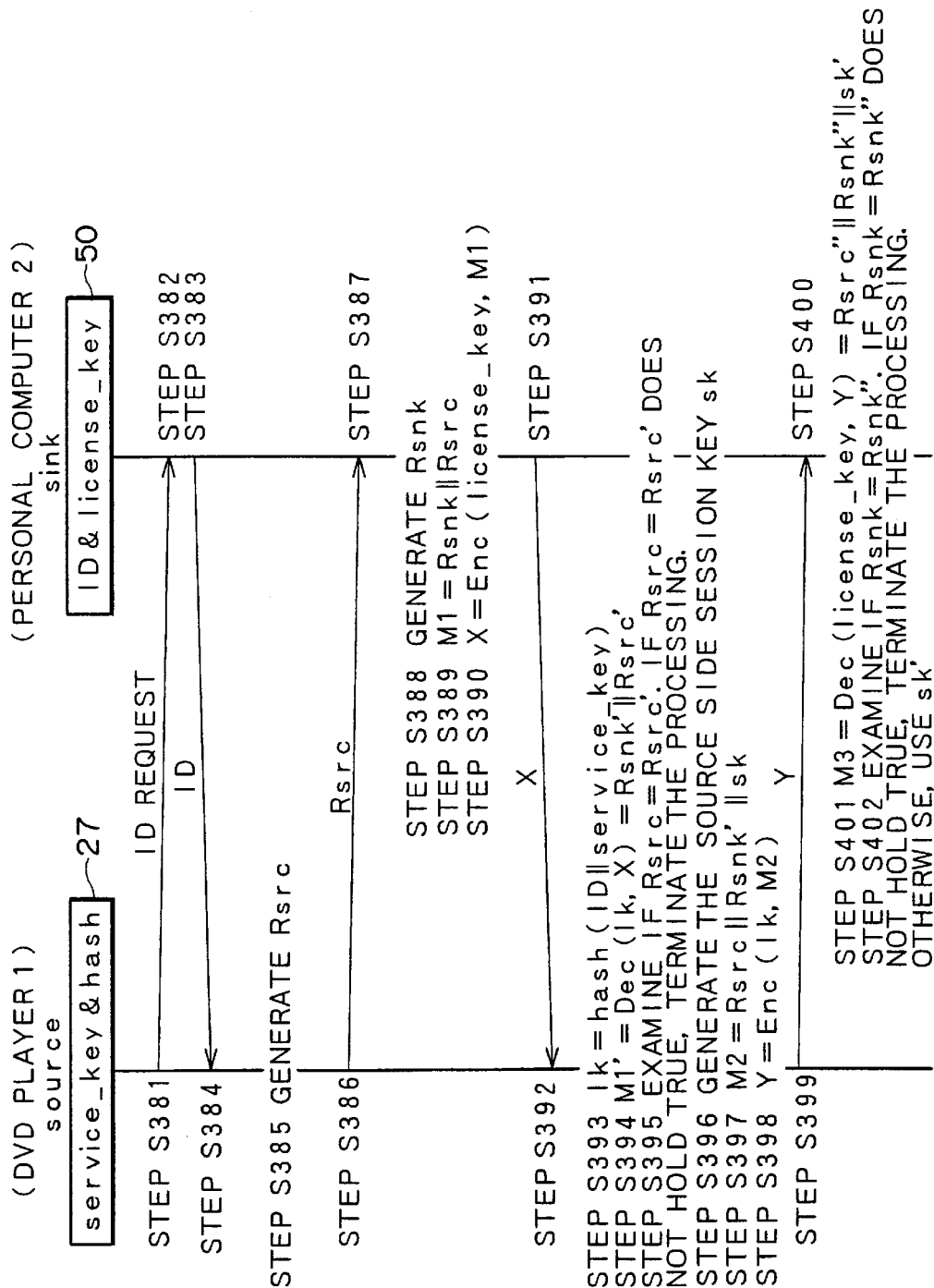
FIG. 40 is a diagram showing a still further embodiment implementing the authentication procedure.
Figure 41:
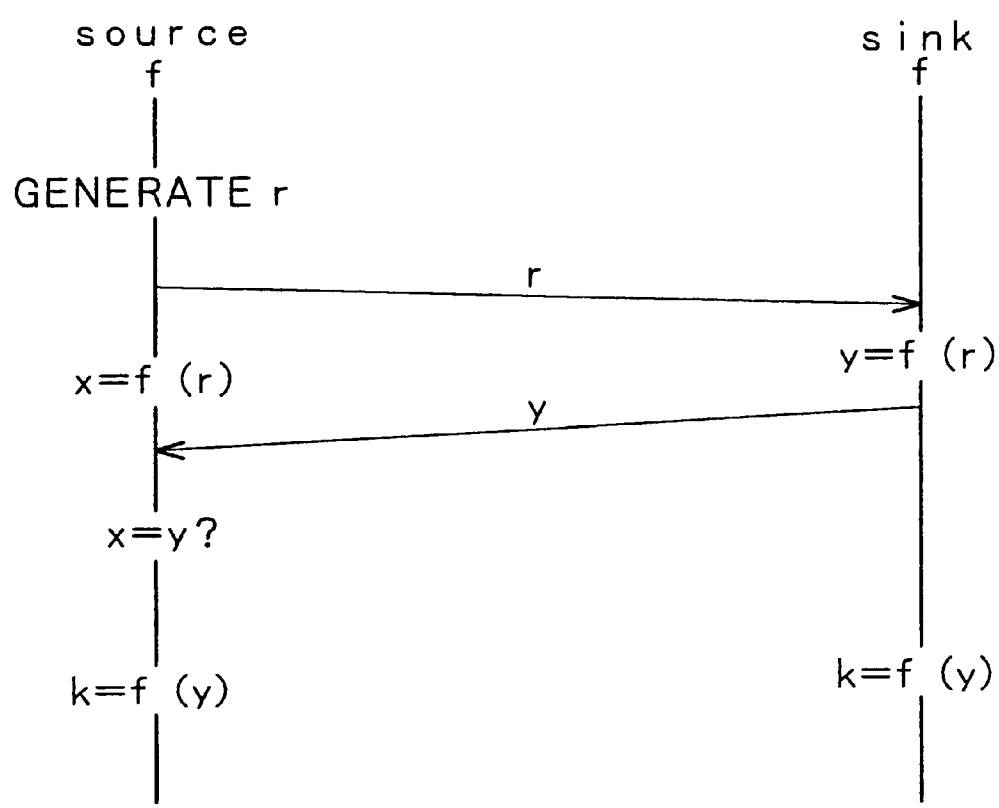
FIG. 41 is a diagram showing the ordinary authentication procedure.

Addressing the problem described above, the present invention provides other embodiments shown in FIGS. 38 to 40, diagrams each showing an authentication protocol whereby, not only does the source transmit an encrypted text resulting from encryption of a source side common session key sk after verifying the validity of the sink, but the sink is also capable of authenticating the source. The procedures shown in FIGS. 38 and 39 are each a typical modification of the embodiment shown in FIG. 37.

First of all, the embodiment implementing an authentication protocol of FIG. 38 is explained. In this embodiment, any encryption mode including a feedback loop such as the CBC mode can be adopted as an encryption mode.

Since pieces of processing carried out at steps S311 to S327 of the procedure shown in the figure are the same as those of the steps S281 to S297 of the procedure shown in FIG. 37, their explanation is not repeated. At a step S328, the DVD player 1 generates a random number r4 and a sources side common session key sk each having a number of bits determined in advance at typically 64. The procedure then goes on to a step S329 at which r4 is concatenated with r3' and sk to produce M3. Then, the procedure proceeds to a step S330 at which M3 is encrypted by using the license key lk to produce Z which is then transmitted to the personal computer 2 at a step S331.

The personal computer 2 receiving Z at a step S332 decrypts Z by using the license key at a step S333 to produce M3' which is regarded as r4'||r3"||sk', a concatenation of r4', r3" and sk' each comprising a predetermined number of bits, typically, 64 bits. The procedure then goes on to a step S334 to check if r3" is equal to r3 generated at the step S321. If r3" is found unequal to r3, the personal computer 2 judges the DVD player 1 to be an unauthorized apparatus and, hence, terminates the authentication protocol. If r3" is found equal to r3, on the other hand, the personal computer 2 accepts the sink side common session key sk' produced at the step S333 as the source side common session key sk.

In the embodiment implementing the authentication protocol described above, not only does the source transmit an encrypted text resulting from encryption of a source side common session key after verifying the validity of the sink, but the sink is also capable of authenticating the source.

Much like the procedure of FIG. 38 described above, the procedure shown in FIG. 39 is also a typical modification of the embodiment shown in FIG. 37. In this embodiment, any encryption mode including a feedback loop such as the CBC mode can be adopted as an encryption mode.

Since pieces of processing carried out at steps S351 to S361 of the procedure shown in FIG. 39 are the same as those of the steps S281 to S291 of the procedure shown in FIG. 37, their explanation is not repeated. At a step S362, the personal computer 2 generates r2'||r3 as M2. The procedure then goes on to a step S363 at which the personal computer 2 encrypts M2 by using the license key to produce Y which is then transmitted to the DVD player 1 at a step S364.

The DVD player 1 receiving Y at a step S365 decrypts Y by using the license key lk at a step S366 to produce M2+which is regarded as r2"||r3, a concatenation of r2" and r3 each comprising a predetermined number of bits, typically, 64 bits. The procedure then goes on to a step S367 to check if r2" is equal to r2 generated at the step S356. If r2" is found unequal to r2, the DVD player 1 judges the personal computer 2 to be an unauthorized apparatus and, hence, terminates the authentication protocol. If r2" is found equal to r2, on the other hand, the procedure goes on to a step S368 at which the DVD player 1 generates a source side common session key sk. The procedure then proceeds to a step S369 at which sk is concatenated with r3' to produce M3. Then, the procedure continues to a step S370 at which M3 is encrypted by using the license key lk to produce an encrypted text Z which is then transmitted to the personal computer 2 at a step S371.

The personal computer 2 receiving Z at a step S372 decrypts z by using the license key at a step S373 to produce M3' which is regarded as r3"‖sk', a concatenation of r3" and sk' each comprising a predetermined number of bits, typically, 64 bits. The procedure then goes on to a step S374 to check if r3" is equal to r3 generated at the step S361. If r3" is found unequal to r3, the personal computer 2 judges the DVD player 1 to be an unauthorized apparatus and, hence, terminates the authentication protocol. If r3" is found equal to r3, on the other hand, the personal computer 2 accepts the sink side common session ke' sky produced at the step S373 as the source side common session key sk.

In the embodiment implementing the authentication protocol as described above, the source transmits an encrypted text resulting from encryption of a source side common session key sk to the sink after verifying the validity of the sink and, in addition, the sink is also capable of authenticating the source. On the top of that, much like the embodiment shown in FIG. 33, in the case of the present embodiment, even if the source side common session key sk from which the source produces an encrypted text Z by using the license key lk remains unchanged in a session, Z varies from encryption to encryption during the session due to the fact that r4, a variable number generated by the DVD player 1, is involved in each encryption. As a result, the present embodiment offers a feature that makes it difficult for an unauthorized person to steal transmitted information.

FIG. 40 is a diagram showing an embodiment implementing an authentication protocol having the same functions as those shown in FIGS. 38 and 39. Also in the present embodiment, any encryption mode including a feedback loop such as the CBC mode can be adopted as an encryption mode. Since pieces of processing carried out at steps S381 to S384 of the procedure shown in the figure are the same as those of the steps S1 to S4 of the procedure shown in FIG. 4, their explanation is not repeated. At a step S385, the DVD player 1 generates a random number Rsrc having a predetermined number of bits, typically, 64 bits. The procedure then goes on to a step S386 at which the random number Rsrc is transmitted to the personal computer 2.

Then, the procedure proceeds to a step S387 at which the personal computer 2 receives the random number Rsrc. Subsequently, the procedure continues to a step S388 at which the personal computer 2 generates a random number Rsnk having a predetermined number of bits, typically, 64 bits. The procedure then goes on to a step S389 at which the random number Rsrc is concatenated with the random number Rsnk to generate M1. Then, the procedure proceeds to a step S390 at which M1 is encrypted by using the license key to produce X which is then transmitted to the DVD player 1 at a step S391.

At a step S392, the DVD player 1 receives X. The procedure then goes on to a step S393 at which a license key lk is computed from an ID assigned to the personal computer 2 and a service key. At a step S394, the license key lk is used for decrypting X to produce M1' which is regarded as Rsnk'‖Rsrc', a concatenation of Rsnk' and Rsrc' each comprising a predetermined number of bits, typically, 64 bits. Then, the procedure proceeds to a step S395 to check if Rsrc'=Rsrc. If Rsrc' is found unequal to Rsrc, the personal computer 2 is judged to be an unauthorized apparatus in which case the authentication protocol is terminated. If Rsrc' is found equal to Rsrc, on the other hand, the procedure proceeds to a step S396 at which the DVD player 1 generates a source side common session key sk. Subsequently, the procedure continues to a step S397 at which Rsrc is concatenated with Rsnk' and sk to generate M2. The procedure then goes on to a step S398 at which M2 is encrypted by using the license key lk to produce Y which is then transmitted to the personal computer 2 at a step S399.

The personal computer 2 receiving Y at a step S400 decrypts Y by using the license key at a step S401 to produce M3 which is regarded as Rsrc"‖Rsnk"‖sk', a concatenation of Rsrc", Rsnk" and sk' each comprising a predetermined number of bits, typically, 64 bits. The procedure then goes on to a step S402 to check if Rsnk" is equal to Rsnk generated at the step S388. If Rsnk" is found unequal to Rsnk, the personal computer 2 judges the DVD player 1 to be an unauthorized apparatus in which case the sink side common session key sk' is discarded. If Rsnk" is found equal to Rsnk, on the other hand, sk' is accepted as a common session key.

In the embodiment implementing the authentication protocol as described above, the source transmits an encrypted text resulting from encryption of a source side common session key sk to the sink after verifying the validity of the sink and, in addition, the sink is also capable of authenticating the source. On the top of that, much like the embodiment shown in FIG. 33, in the case of the present embodiment, even if the source side common session key sk from which the source produces an encrypted text Y by using the license key lk remains unchanged in a session, Y varies from encryption to encryption during the session due to the fact that Rsrc, a variable number generated by the DVD player 1, is involved in each encryption. As a result, the present embodiment offers a feature that makes it difficult for an unauthorized person to steal transmitted information.

In the embodiments described above, the DVD player 1 serves as a source while the personal computer 2 and the optical magnetic disc apparatus 3 each serve as a sink. It should be noted that the description is not intended to be construed in a limiting sense. That is to say, any arbitrary electronic apparatus can be used as a source or a sink.

In addition, while the 1394 serial bus 11 is used as an external bus for connecting the electronic apparatuses composing a data processing system to each other, the scope of the present embodiment is not limited to such embodiments. That is, a variety of buses can be used as an external bus and electronic apparatuses connected to each other by the external bus are not limited to those employed in the embodiments described above. Any arbitrary electronic apparatuses can be used to compose the data processing system.

It is also worth noting that a variety of programs consisting of instructions to be executed by CPUs are presented to the user through providing media such a magnetic disc, a CD-ROM disc and a network and can be used, if necessary, by storing the programs in a RAM unit or a hard disc incorporated in the electronic apparatus.

In an information processing apparatus, an information processing method and a recording medium provided by the present invention, a 1st key LK is generated on the basis of identification data received from another information processing apparatus and a 2nd key SVK representing predetermined information to undergo predetermined processing. As a result, security of transmitted information can be assured with a high degree of reliability.

In addition, in another information processing apparatus, another information processing method and another recording medium provided by the present invention, a 1st key SVK representing predetermined information to undergo predetermined processing and a predetermined function are stored in advance. A 2nd key LK is generated by application of the predetermined function to identification data received from another information processing apparatus and the 1st key SVK. A 3rd key SK is further generated, encrypted by using the 2nd key LK and transmitted to the other information processing apparatus. As a result, it is possible to allow only another authenticated information processing apparatus to carry out predetermined processing on information transmitted thereto, further assuring the security of the information.

With an information processing system, a further information processing method and a further recording medium provided by the present invention, in the 1st information processing apparatus, a 1st key SVK associated with information to be transmitted to the 2nd information processing apparatus and a predetermined function are stored in advance. A 2nd key LK1 is generated by application of the predetermined function to identification data assigned to and received from the 2nd information processing apparatus and the 1st key SVK. A 3rd key SK1 is further generated, encrypted by using the 2nd key LK2 and transmitted to the 2nd information processing apparatus. In the second information processing apparatus, on the other hand, identification data assigned to the 2nd information processing apparatus, that is, the 2nd information processing apparatus' own identification data unique to the 2nd information processing apparatus, and a 4th key LK2 representing a permission to carry out predetermined processing on predetermined information received from the 1st information processing apparatus are stored in advance. The encrypted 3rd key received from the 1st information processing apparatus is decrypted back into the 3rd key SK1 by using the 4th key LK2. As a result, an information processing system offering a high security of transmitted information can be implemented.

On the top of that, according to a still further information processing apparatus, a still further information processing method and a still further recording medium provided by the present invention, a 1st key LK, a 2nd key LK' and a predetermined function G are stored in advance. The 2nd key LK' is generated in advance on the basis of the 1st key LK and the inverse function $G^{-1}$ of the predetermined function G. As a result, security of transmitted information can be assured with a high degree of reliability.

Furthermore, according to a still further information processing apparatus, a still further information processing method and a still further recording medium provided by the present invention, data H is generated by application of a predetermined function to identification data assigned to and received from another information processing apparatus and a 1st key SVK. A 2nd key SK is then encrypted by using a pseudo random number pRNG (H) generated from the data H and transmitted to the other information processing apparatus. As a result, an information processing apparatus offering a high security of transmitted information can be implemented.

In addition, with a still further information processing system, a still further information processing method and a still further recording medium provided by the present invention, in the 1st information processing apparatus, data H is generated by application of a 1st function h to identification data assigned to and received from the 2nd information processing apparatus and a 1st key SVK. A 2nd key SK is encrypted by using a pseudo random number pRNG (H) generated from the data H and transmitted to the 2nd information processing apparatus. In the 2nd information processing apparatus, on the other hand, a 3rd key LK, a 4th key LK' and a predetermined function G are stored in advance. The 4th key LK' is generated on the basis of the 3rd key LK and the inverse function $G^{-1}$ of the predetermined function G. As a result, an information processing system offering a high security of transmitted information can be implemented.

What is claimed is:

1. A data transmitting apparatus wherein data is transmitted after predetermined processing based upon said apparatus' own ID code and an ID code received from partner apparatus has been carried out, said apparatus comprising:

a signal receiving means for receiving a signal from a partner apparatus;

a signal transmitting means for transmitting a signal to a partner apparatus; and a signal encrypting means for carrying out predetermined encryption on a signal to be transmitted, wherein said signal encrypting means examines information indicating a signal transmitting source received from said signal receiving means and, if encrypted text generated by encrypting a session key is found already transmitted to said signal transmitting source, said encrypted text is not transmitted again to said signal transmitting source;

whereby said ID code received from said partner apparatus is stored in a storage means while said session key is used for a current session, and said ID code received from said partner apparatus is deleted from said storage means when another session key is used for a next session; and whereby said session key is encrypted according to a license key that is generated by concatenating said ID code received from said partner apparatus with a service key unique to the data to be transmitted and applying a hash function to the concatenation.

2. A data transmitting apparatus according to claim 1 wherein:

said signal transmitting means transmits an ID requesting signal and an encrypted text;

said signal receiving means receives an ID; and said signal encrypting means generates an encrypted text from a predetermined key.

3. A data transmitting method whereby:

data is transmitted after predetermined processing based upon an own ID code and an ID code received from other equipment has been carried out; and an authentication requesting signal from a partner apparatus is received and examined and, if an encrypted text generated by encrypting a session key is found already transmitted to said partner apparatus, said encrypted text is not encrypted and transmitted again to said partner apparatus but, if said encrypted text has not been transmitted yet to said partner apparatus, said encrypted text is encrypted and transmitted to said partner apparatus;

whereby said ID code received from said partner apparatus is stored in a storage means while said session key is used for a current session, and said ID code received from said partner apparatus is deleted from said storage means when another session key is used for a next session; and whereby said session key is encrypted according to a license key that is generated by concatenating said ID code received from said partner apparatus with a service key unique to the data to be transmitted and applying a hash function to the concatenation.

4. A data transmitting method according to claim 3 whereby said encrypted text is generated from information stored in advance and received information.

5. A computer readable recording medium for storing a program executed by a computer for performing a data transmitting method comprising the steps of:

transmitting data after predetermined processing based upon an own ID code and an ID code received from partner apparatus; and receiving an authentication requesting signal from a partner apparatus and examining said authentication requesting signal and, if a encrypted text generated by encrypting a session key is found already transmitted to said partner apparatus, said encrypted text is not encrypted and transmitted again to said, partner apparatus but, if said encrypted text has not been transmitted yet to said partner apparatus, said encrypted text is encrypted and transmitted to said partner apparatus;

whereby said ID code received from said partner apparatus is stored in a storage means while said session key is used for a current session, and said ID code received from said partner apparatus is deleted from said storage means when another session key is used for a next session; and whereby said session key is encrypted according to a license key that is generated by concatenating said ID code received from said partner apparatus with a service key unique to the data to be transmitted and applying a hash function to the concatenation.

6. A computer readable recording medium according to claim 5 wherein said encrypted text is generated from information stored in advance and received information.

7. A data transmitting apparatus wherein data is transmitted after predetermined processing based upon said apparatus' own ID code and an ID code received from partner apparatus has been carried out, said apparatus comprising:

a signal receiver;

a signal encrypter coupled with said signal receiver; and a signal transmitter coupled with said signal encrypter;

wherein said signal encrypter examines a signal received by said signal receiver to determine information indicating a signal transmitting source while carrying out predetermined encryption on a signal to be transmitted and, if it is determined that a encrypted text generated by encrypting a session key has already been transmitted to said signal transmitting source, said signal is not transmitted by said signal transmitter again to said signal transmitting source;

whereby said ID code received from said partner apparatus is stored in a storage means while said session key is used for a current session, and said ID code received from said other equipment is deleted from said storage means when another session key is used for a next session; and whereby said session key is encrypted according to a license key that is generated by concatenating said ID code received from said partner apparatus with a service key unique to the data to be transmitted and applying a hash function to the concatenation.

* * * * *